US012811730B2

(12) United States Patent
Xin et al.

(10) Patent No.: US 12,811,730 B2
(45) Date of Patent: Nov. 24, 2026

(54) COMMUNICATION METHOD AND DEVICE

(71) Applicant: Huawei Technologies Co., Ltd., Shenzhen (CN)

(72) Inventors: Yan Xin, Kanata (CA); Jung Hoon Suh, Ottawa (CA); Sara Norouzi, Vancouver (CA); Mahmoud Hasabelnaby, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 18/889,172

(22) Filed: Sep. 18, 2024

(65) Prior Publication Data

US 2026/0019200 A1 Jan. 15, 2026

Related U.S. Application Data

(60) Provisional application No. 63/670,540, filed on Jul. 12, 2024.

(51) Int. Cl.
*H04L 5/00* (2006.01)

(52) U.S. Cl.
CPC ............ *H04L 5/001* (2013.01); *H04L 5/0035* (2013.01); *H04L 5/0094* (2013.01)

(58) Field of Classification Search
CPC ..... H04L 5/001; H04L 5/0035; H04L 5/0094; H04L 5/0044
USPC .......................................................... 370/329
See application file for complete search history.

(56) References Cited

U.S. PATENT DOCUMENTS

| | | | | |
|---|---|---|---|---|
| 10,965,413 B2 * | 3/2021 | Suh | H04L 5/0048 | |
| 2017/0338928 A1 * | 11/2017 | Park | H04L 5/0051 | |
| 2021/0289500 A1 * | 9/2021 | Yang | H04L 5/0044 | |
| 2023/0035113 A1 * | 2/2023 | Shellhammer | H04L 5/0044 | |
| 2023/0209525 A1 * | 6/2023 | Hu | H04W 72/0453 | 370/329 |

(Continued)

OTHER PUBLICATIONS

S. Crozier et al., "High-Performance Low-Memory Interleaver Banks for Turbo-Codes," IEEE 54th Vehicular Technology Conference. VTC Fall 2001. Proceedings—Atlantic City, NJ, USA (Oct. 7-11, 2001), total 5 pages.

(Continued)

*Primary Examiner* — Chi Tang P Cheng
*Assistant Examiner* — Michael Wayne Maddox
(74) *Attorney, Agent, or Firm* — Slater Matsil, LLP

(57) ABSTRACT

A communication method includes: determining a plurality of resource units (RUs) of a physical layer protocol data unit (PPDU) with a first bandwidth; and transmitting a signal to a device using one or more RUs of the plurality of RUs. Locations of the plurality of RUs are determined based on a first-level tone distribution and a second-level tone distribution; the first-level tone distribution is used to indicate a mapping relationship between distributed subcarrier indices of 26-tone RU, 52-tone RU and 106-tone RU and subcarrier indices of 242-tone RU in each 20 MHz subchannel, the second-level tone distribution is used to indicate a distribution of subcarrier indices of 242-tone RU in the PPDU with the first bandwidth, all null subcarriers in a 20 MHz subchannel are allocated exclusively in left and right bands, with no null subcarrier allocated between any consecutive RUs in a 20 MHz subchannel.

20 Claims, 41 Drawing Sheets

(56) References Cited

U.S. PATENT DOCUMENTS

| | | | |
|---|---|---|---|
| 2024/0154748 | A1 | 5/2024 | Lu et al. |
| 2024/0259242 | A1* | 8/2024 | Park ...................... H04W 72/04 |
| 2024/0365320 | A1* | 10/2024 | Yang ..................... H04L 5/0041 |

OTHER PUBLICATIONS

J. Liu et al., "UHR Feature to Overcome PSD Limitations: Distributed-Tone Resource Units," IEEE 802.11-23-0037r0, IEEE, Dec. 10, 2022, total 9 pages.
IEEE P802.11-REVme/D4.1, Chapter 27.3.2, IEEE, Oct. 2023, total 12 pages.
"IEEE Draft Standard for Information technology—Telecommunications and information exchange between systems Local and metropolitan area networks—Specific requirements—Part 11: Wireless LAN Medium Access Control (MAC) and Physical Layer (PHY) Specifications Amendment: Enhancements for Extremely High Throughput (EHT)," IEEE P802.11be/D5.0, Chapter 36.3.2.1, IEEE, Nov. 2023, total 12 pages.
S. Hu et al., "DRU Tone Plan for 11bn," IEEE 802.11-24-0468r1, IEEE, Mar. 8, 2024, total 31 pages.
S. Hu et al., "High-Level Perspectives on Distributed Tone RU for 11bn," IEEE 802.11-23/2020r0, IEEE, Nov. 2, 2023, total 19 pages.
E. Park et al., "Distribution Bandwidth within 80 MHz for DRU," IEEE 802.11-24-0766r2, IEEE, May 12, 2024, total 14 pages.
Y. Xin et al., "Tone distribution in DRUs," IEEE 802.11-24-0814r0, IEEE, May 10, 2024, total 14 pages.

* cited by examiner

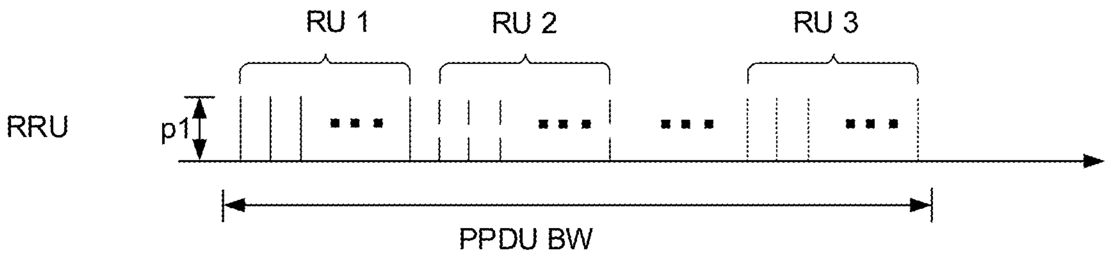
(A)
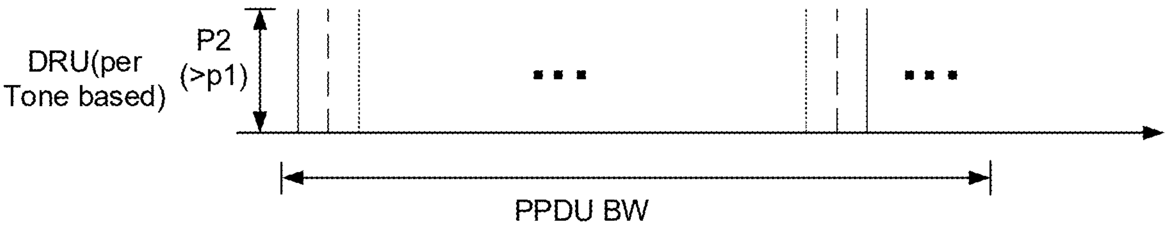
(B)
FIG. 8

| | | | | | | | | | | | | | | | |
|---|---|---|---|---|---|---|---|---|---|---|---|---|---|---|---|
| 26-tone | Null | RU1 | RU2 | Null | RU3 | RU4 | Null | RU5 | Null | RU6 | RU7 | Null | RU8 | RU9 | Null |
| | 0 | 1:26 | 27:52 | 53,54 | 55:80 | 81:106 | 107 | 108:133 | 134 | 135:160 | 161:186 | 187,188 | 189:214 | 215:240 | 241 |
| | | | | | | | | | | | | | | | |
| 52-tone | Null | RU1 | | Null | RU2 | | Null | | Null | RU3 | | Null | RU4 | | Null |
| | 0 | 1:52 | | 53,54 | 55:106 | | 107 | | 134 | 135:186 | | 187,188 | 189:240 | | 241 |
| | | | | | | | | | | | | | | | |
| 106-tone | Null | RU1 | | | | | Null | | Null | RU2 | | | | | Null |
| | 0 | 1:106 | | | | | 107 | | 134 | 135:240 | | | | | 241 |
| | | | | | | | | | | | | | | | |
| 242-tone | RU | | | | | | | | | | | | | | |
| | 0:241 | | | | | | | | | | | | | | |

FIG. 9

| | | | | | | |
|---|---|---|---|---|---|---|
| | RU1 [0:241] | Null | RU2 [0:241] | RU3 | Null | RU4 |
| 242-tone | [-500:-259] | [-258:-254] | [-253:-12] | [12:253] | [254:258] | [259:500] |

| | Null | RU1 [0:241] | RU2 [242:483] | RU3 [484:725] | RU4 [726:967] | Null |
|---|---|---|---|---|---|---|
| 242-tone | [-500:-496] | [-495:-254] | [-253:-12] | [12:253] | [254:495] | [496:500] |

FIG. 14

| DRU index mapping per 20 MHz | | | | | | | | | | | |
|---|---|---|---|---|---|---|---|---|---|---|---|
| 26-tone | Null | DRU1 | DRU2 | DRU3 | DRU4 | DRU5 | DRU6 | DRU7 | DRU8 | DRU9 | Null |
| | [0:3] | [4:9:229] | [9:9:234] | [6:9:231] | [11:9:236] | [8:9:233] | [5:9:230] | [10:9:235] | [7:9:232] | [12:9:237] | [238:241] |
| 52-tone | Null | DRU1 | | DRU2 | | | DRU3 | | DRU4 | | Null |
| | [0:3] | 26-tone [DRU1. DRU2] | | 26-tone [DRU3,DRU4] | | | 26-tone [DRU6,DRU7] | | 26-tone [DRU8,DRU9] | | [238:241] |
| | | | | | | | | | | | |
| 106-tone | Null | DRU1 | | | | | DRU2 | | | | Null |
| | [0,1] | [2, 52-tone DRU1,52-tone DRU2, 238] | | | | | [3, 52-tone DRU3,52-tone DRU4,239] | | | | [240,241] |
| | | | | | | | | | | | |
| 242-tone | RU [0:241] | | | | | | | | | | |

FIG. 15

| DRU index mapping per 20 MHz | | | | | | | | | | | |
|---|---|---|---|---|---|---|---|---|---|---|---|
| 26-tone | Null | DRU1 (13+13 tones) | DRU2 (13+13 tones) | DRU3 (13+13 tones) | DRU4 (13+13 tones) | DRU5 (13+13 tones) | DRU6 (13+13 tones) | DRU7 (13+13 tones) | DRU8 (13+13 tones) | DRU9 (13+13 tones) | Null |
| | [0:3] | [4:9:112, 121:9:229] | [9:9:117, 126:9:234] | [6:9:114, 123:9:231] | [11:9:119, 128:9:236] | [8:9:116, 125:9:233] | [5:9:113, 122:9:230] | [10:9:118, 127:9:235] | [7:9:115, 124:9:232] | [12:9:120, 129:9:237] | [238:241] |
| 52-tone | Null | DRU1 | | DRU2 | | | DRU3 | | DRU4 | | Null |
| | [0:3] | 26-tone [DRU1, DRU2] | | 26-tone [DRU3,DRU4] | | | 26-tone [DRU6,DRU7] | | 26-tone [DRU8,DRU9] | | [238:241] |
| | | | | | | | | | | | |
| 106-tone | Null | DRU1 | | | | | DRU2 | | | | Null |
| | [0,1] | [2, 52-tone DRU1,52-tone DRU2, 238] | | | | | [3, 52-tone DRU3,52-tone DRU4,239] | | | | [240,241] |
| | | | | | | | | | | | |
| 242-tone | RU [0:120, 121:241] | | | | | | | | | | |

FIG. 16

| DRU index mapping per 20 MHz | | | | | | | | | | | |
|---|---|---|---|---|---|---|---|---|---|---|---|
| 26-tone | Null | DRU1 (9+9+8 tones) | DRU2 (9+8+9 tones) | DRU3 (9+9+8) tones) | DRU4 (8+9+9 tones) | DRU5 (9+8+9 tones) | DRU6 (9+9+8 tones) | DRU7 (8+9+9 tones) | DRU8 (9+8+9 tones) | DRU9 (8+9+9 tones) | Null |
| | [0:3] | [4:9:76, 85:9:157, 166:9:229] | [9:9:81, 90:9:153, 162:9:234] | [6:9:78, 87:9:159, 168:9:231] | [11:9:74, 83:9:155, 164:9:236] | [8:9:80, 89:9:152, 161:9:233] | [5:9:77, 86:9:158, 167:9:230] | [10:9:73, 82:9:154, 163:9:235] | [7:9:79, 88:9:151, 160:9:232] | [12:9:75, 84:9:156, 165:9:237] | [238:241] |
| 52-tone | Null | DRU1 | | DRU2 | | | DRU3 | | DRU4 | | Null |
| | [0:3] | 26-tone [DRU1, DRU2] | | 26-tone [DRU3,DRU4] | | | 26-tone [DRU6,DRU7] | | 26-tone [DRU8,DRU9] | | [238:241] |
| | | | | | | | | | | | |
| 106-tone | Null | DRU1 | | | | | DRU2 | | | | Null |
| | [0,1] | [2, 52-tone DRU1,52-tone DRU2, 238] | | | | | [3, 52-tone DRU3,52-tone DRU4,239] | | | | [240,241] |
| | | | | | | | | | | | |
| 242-tone | RU [0:81, 82:159, 160:241] | | | | | | | | | | |

FIG. 17

| | | | | |
|---|---|---|---|---|
| 242-tone | DRU1 | DRU2 | DRU3 | DRU4 |
| | [0:4:480, 484:4:964] ⇔ [DRU1] | [2:4:482, 486:4:966] ⇔ [DRU1]+2 | [1:4:481, 485:4:965] ⇔ [DRU1]+1 | [3:4:483, 487:4:967] ⇔ [DRU1]+3 |

FIG. 18

| Combination of first- and second-level tone distribution for 242-tone DRU1 | | | | | | | | | | | |
|---|---|---|---|---|---|---|---|---|---|---|---|
| 26-tone | Null | DRU1_1 | DRU2_1 | DRU3_1 | DRU4_1 | DRU5_1 | DRU6_1 | DRU7_1 | DRU8_1 | DRU9_1 | Null |
| | [0:4:12] | [16:36:448, 484:36:916] ⇔ 26-tone [DRU1_1] | [36:36:468, 504:36:936] ⇔ 26-tone [DRU1_1]+20 | [24:36:456, 492:36:924] ⇔ 26-tone [DRU1_1]+8 | [44:36:476, 512:36:944] ⇔ 26-tone [DRU1_1]+28 | [32:36:464, 496:36:928] ⇔ 26-tone [DRU1_1]+16 | [20:36:452, 488:36:920] ⇔ 26-tone [DRU1_1]+4 | [40:36:472, 508:36:940] ⇔ 26-tone [DRU1_1]+24 | [28:36:460, 496:36:928] ⇔ 26-tone [DRU1_1]+12 | [48:36:480, 516:36:948] ⇔ 26-tone [DRU1_1]+32 | [952:4:964] |
| 52-tone | Null | DRU1_1 | | DRU2_1 | | | DRU3_1 | | DRU4_1 | | Null |
| | [0:4:12] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [952:4:964] |
| | | | | | | | | | | | |
| 106-tone | Null | DRU1 | | | | | DRU2 | | | | Null |
| | [0,4] | [8, 52-tone DRU1,52-tone DRU2, 452] | | | | | [12, 52-tone DRU3,52-tone DRU4,456] | | | | [960,964] |
| | | | | | | | | | | | |
| 242-tone | DRU1 [0:4:480, 484:4:964] | | | | | | | | | | |

FIG. 19

| | | | | | | |
|---|---|---|---|---|---|---|
| | Null | DRU1 [0:4:964] | DRU2 [2:4:966] | DRU3 [1:4:965] | DRU4 [3:4:967] | Null |
| 242-tone | [-500:-496] | [-495:4:-15, 12:4:492] ⇔ [DRU1] | [-493:4:-13, 14:4:494] ⇔ [DRU1] -> 2 | [-494:4:-14, 13:4:493] ⇔ [DRU1] -> 1 | [-492:4:-12, 15:4:495] ⇔ [DRU1] -> 3 | [496:500] |

FIG. 20

| DRUs related to the 242-tone DRU1 in 80 MHz PPDU | | | | | | | | | | | |
|---|---|---|---|---|---|---|---|---|---|---|---|
| 26-tone | Null | DRU1_1 | DRU2_1 | DRU3_1 | DRU4_1 | DRU5_1 | DRU6_1 | DRU7_1 | DRU8_1 | DRU9_1 | Null |
| | [-495:4:-483] | [-479:36:-47, 12:36:444] ⇔ 26-tone [DRU1_1] | [-459:36:-27, 32:36:464] ⇔ 26-tone [DRU1_1] -> 20 | [-471:36:-39, 20:36:452] ⇔ 26-tone [DRU1_1] -> 8 | [-451:36:-19, 40:36:472] ⇔ 26-tone [DRU1_1] -> 28 | [-463:36:-31, 28:36:460] ⇔ 26-tone [DRU1_1] -> 16 | [-475:36:-43, 16:36:448] ⇔ 26-tone [DRU1_1] -> 4 | [-455:36:-23, 36:36:468] ⇔ 26-tone [DRU1_1] -> 24 | [-467:36:-35, 24:36:456] ⇔ 26-tone [DRU1_1] -> 12 | [-447:36:-15, 44:36:476] ⇔ 26-tone [DRU1_1] -> 32 | [480:4:492] |
| 52-tone | Null | DRU1_1 | | DRU2_1 | | | DRU3_1 | | DRU4_1 | | Null |
| | [-495:4:-483] | 26-tone [DRU1_1, DRU2_1] | | 26-tone [DRU3_1, DRU4_1] | | | 26-tone [DRU6_1, DRU7_1] | | 26-tone [DRU8_1, DRU9_1] | | [480:4:492] |
| 106-tone | Null | DRU1_1 | | | | | DRU2_1 | | | | Null |
| | [-495,-491] | [-487, 52-tone DRU1_1,52-tone DRU2_1,480] | | | | | [-483, 52-tone DRU3_1,52-tone DRU4_1,484] | | | | [488,492] |
| 242-tone | DRU1 | | | | | | | | | | |
| | [-495:4:-15, 12:4:492] ⇔ [DRU_base] | | | | | | | | | | |

FIG. 21

| DRUs related to the second 242-tone in 80 MHz PPDU | | | | | | | | | | | |
|---|---|---|---|---|---|---|---|---|---|---|---|
| 26-tone | Null | DRU1_2 | DRU2_2 | DRU3_2 | DRU4_2 | DRU5_2 | DRU6_2 | DRU7_2 | DRU8_2 | DRU9_2 | Null |
| | [-493:4:-481] | [-477:36:-45 14:36:446] ⇔ 26-tone [DRU1_1] -> 2 | [-457:36:-25, 34:36:466] ⇔ 26-tone [DRU1_1] -> 22 | [-469:36:-37, 22:36:454] ⇔ 26-tone [DRU1_1] ->10 | [-449:36:-17, 42:36:474] ⇔ 26-tone [DRU1_1] -> 30 | [-461:36:-29, 30:36:462] ⇔ 26-tone [DRU1_1] -> 18 | [-473:36:-41, 18:36:450] ⇔ 26-tone [DRU1_1] -> 6 | [-453:36:-21, 38:36:470] ⇔ 26-tone [DRU1_1] -> 26 | [-465:36:-33, 26:36:458] ⇔ 26-tone [DRU1_1] -> 14 | [-445:36:-13, 46:36:478] ⇔ 26-tone [DRU1_1] -> 34 | [482:4:494] |
| 52-tone | Null | DRU1_2 | | DRU2_2 | | | DRU3_2 | | DRU4_2 | | Null |
| | [-493:4:-481] | 26-tone [DRU1_2, DRU2_2] | | 26-tone [DRU3_2,DRU4_2] | | | 26-tone [DRU6,DRU7] | | 26-tone [DRU8,DRU9] | | [482:4:494] |
| 106-tone | Null | DRU1_2 | | | | | DRU2_2 | | | | Null |
| | [-493,-489] | [-485, 52-tone DRU1_2,52-tone DRU2_2,482] | | | | | [-481, 52-tone DRU3_2,52-tone DRU4_2,486] | | | | [490,494] |
| 242-tone | DRU2 | | | | | | | | | | |
| | [-493:4:-13, 14:4:494] ⇔ [DRU_base] -> 2 | | | | | | | | | | |

FIG. 22

| DRUs related to the third 242-tone in 80 MHz PPDU | | | | | | | | | | | |
|---|---|---|---|---|---|---|---|---|---|---|---|
| 26-tone | Null | DRU1_3 | DRU2_3 | DRU3_3 | DRU4_3 | DRU5_3 | DRU6_3 | DRU7_3 | DRU8_3 | DRU9_3 | Null |
| | [-494:4:-482] | [-478:36:-46 13:36:445] ⇔ 26-tone [DRU1_1] -> 1 | [-458:36:-26, 33:36:465] ⇔ 26-tone [DRU1_1] -> 21 | [-470:36:-38, 21:36:453] ⇔ 26-tone [DRU1_1] -> 9 | [-450:36:-18, 41:36:473] ⇔ 26-tone [DRU1_1] -> 29 | [-462:36:-30, 29:36:461] ⇔ 26-tone [DRU1_1] -> 17 | [-474:36:-42, 17:36:449] ⇔ 26-tone [DRU1_1] -> 5 | [-454:36:-22, 37:36:469] ⇔ 26-tone [DRU1_1] -> 25 | [-466:36:-34, 25:36:457] ⇔ 26-tone [DRU1_1] -> 13 | [-446:36:-14, 45:36:477] ⇔ 26-tone [DRU1_1] -> 33 | [481:4:493] |
| 52-tone | Null | DRU1_3 | | DRU2_3 | | | DRU3_3 | | DRU4_3 | | Null |
| | [-494:4:-482] | 26-tone [DRU1_3, DRU2_3] | | 26-tone [DRU3_3,DRU4_3] | | | 26-tone [DRU6_3,DRU7_3] | | 26-tone [DRU8_3,DRU9_3] | | [481:4:493] |
| 106-tone | Null | DRU1_3 | | | | | DRU2_3 | | | | Null |
| | [-494,-490] | [-486, 52-tone DRU1_3,52-tone DRU2_3,481] | | | | | [-482, 52-tone DRU3_3,52-tone DRU4_3,485] | | | | [489,493] |
| 242-tone | DRU3 | | | | | | | | | | |
| | [-494:4:-14, 13:4:493] ⇔ [DRU_base] -> 1 | | | | | | | | | | |

FIG. 23

| DRUs related to the fourth 242-tone in 80 MHz PPDU | | | | | | | | | | | |
|---|---|---|---|---|---|---|---|---|---|---|---|
| 26-tone | Null | DRU1_4 | DRU2_4 | DRU3_4 | DRU4_4 | DRU5_4 | DRU6_4 | DRU7_4 | DRU8_4 | DRU9_4 | Null |
| | [-492:4:-480] | [-476:36:-44, 15:36:447] ⇔ 26-tone [DRU1_1] -> 3 | [-456:36:-24, 35:36:467] ⇔ 26-tone [DRU1_1] -> 23 | [-468:36:-36, 23:36:455] ⇔ 26-tone [DRU1_1] ->11 | [-448:36:-16, 43:36:475] ⇔ 26-tone [DRU1_1] -> 31 | [-460:36:-28, 31:36:463] ⇔ 26-tone [DRU1_1] -> 19 | [-472:36:-40, 19:36:451] ⇔ 26-tone [DRU1_1] -> 7 | [-452:36:-20, 39:36:471] ⇔ 26-tone [DRU1_1] -> 27 | [-464:36:-32, 27:36:459] ⇔ 26-tone [DRU1_1] -> 15 | [-444:36:-12, 47:36:479] ⇔ 26-tone [DRU1_1] -> 35 | [483:4:495] |
| | | | | | | | | | | | |
| 52-tone | Null | DRU1_4 | | DRU2_4 | | | DRU3_4 | | DRU4_4 | | Null |
| | [-492:4:-480] | 26-tone [DRU1, DRU2] | | 26-tone [DRU3,DRU4] | | | 26-tone [DRU6,DRU7] | | 26-tone [DRU8,DRU9] | | [483:4:495] |
| | | | | | | | | | | | |
| 106-tone | Null | DRU1_4 | | | | | DRU2_4 | | | | Null |
| | [-492,-488] | [-484, 52-tone DRU1,52-tone DRU2,483] | | | | | [-480, 52-tone DRU3,52-tone DRU4,487] | | | | [491,495] |
| | | | | | | | | | | | |
| 242-tone | DRU4 | | | | | | | | | | |
| | [-492:4:-12, 15:4:495] ⇔ [DRU_base] -> 3 | | | | | | | | | | |

FIG. 24

| | | | |
|---|---|---|---|
| 242-tone | DRU1 | DRU2 | DRU3 |
| | [0:3:243, 246:3:477, 480:3:723] ⇔ [DRU1] | [1:3:244, 247:3:478, 481:3:724] ⇔ [DRU1]+1 | [2:3:245, 248:3:479, 482:3:725] ⇔ [DRU1]+2 |

FIG. 25

| Combination of first- and second-level tone distribution for 242-tone DRU1 | | | | | | | | | | | |
|---|---|---|---|---|---|---|---|---|---|---|---|
| 26-tone | Null | DRU1_1 (9+9+8) | DRU2_1 (9+8+9) | DRU3_1 (9+9+8) | DRU4_1 (8+9+9) | DRU5_1 (9+8+9) | DRU6_1 (9+9+8) | DRU7_1 (8+9+9) | DRU8_1 (9+9+8) | DRU9_1 (8+9+9) | Null |
| | [0:3:9] | [12.27:228, 255:27:471, 498:27:687] ⇔ [DRU1_1] | [27:27:243, 270:27:,459 486:27:702] ⇔ [DRU2_1] | [18:27:234, 261:27:477, 504:27:693] ⇔ [DRU3_1] | [33:27:222, 249:27:465, 492:27:708] ⇔ [DRU4_1] | [24:27:240, 267:27:456, 483:27:699] ⇔ [DRU5_1] | [15:27:231, 258:27:474, 501:27:690] ⇔ [DRU6_1] | [30:27:219, 246:27:462, 489:27:705] ⇔ [DRU7_1] | [21:27:237, 264:27:480, 507:27:696] ⇔ [DRU8_1] | [36:27:225, 252:27:468, 495:27:711] ⇔ [DRU9_1] | [714:3:723] |
| 52-tone | Null | DRU1_1 | | DRU2_1 | | | DRU3_1 | | DRU4_1 | | Null |
| | [0:3:9] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [714:3:723] |
| | | | | | | | | | | | |
| 106-tone | Null | DRU1_1 | | | | | DRU2_1 | | | | Null |
| | [0,3] | [6, 52-tone DRU1_1,52-tone DRU2_1, 714] | | | | | [9, 52-tone DRU3_1,52-tone DRU4_1,717] | | | | [720,723] |
| | | | | | | | | | | | |
| 242-tone | DRU1 [0:3:243, 246:3:477, 480:3:723] ⇔ [DRU_base] | | | | | | | | | | |

FIG. 26

| Combination of first- and second-level tone distribution for 242-tone DRU2 | | | | | | | | | | | |
|---|---|---|---|---|---|---|---|---|---|---|---|
| 26-tone | Null | DRU1_2 (9+9+8) | DRU2_2 (8+9+9) | DRU3_2 (9+9+8) | DRU4_2 (8+9+9) | DRU5_2 (9+8+9) | DRU6_2 (9+9+8) | DRU7_2 (8+9+9) | DRU8_2 (9+9+8) | DRU9_2 (8+9+9) | Null |
| | [1:3:10] | 26-tone [DRU1_1]+1 | 26-tone [DRU2_1]+1 | 26-tone [DRU3_1]+1 | 26-tone [DRU4_1]+1 | 26-tone [DRU5_1]+1 | 26-tone [DRU6_1]+1 | 26-tone [DRU7_1]+1 | 26-tone [DRU8_1]+1 | 26-tone [DRU9_1]+1 | [715:3:724] |
| 52-tone | Null | DRU1_2 | | DRU2_2 | | | DRU3_2 | | DRU4_2 | | Null |
| | [1:3:10] | 26-tone [DRU1_2, DRU2_2] | | 26-tone [DRU3_2,DRU4_2] | | | 26-tone [DRU6_2,DRU7_2] | | 26-tone [DRU8_2,DRU9_2] | | [715:3:724] |
| | | | | | | | | | | | |
| 106-tone | Null | DRU1_2 | | | | | DRU2_2 | | | | Null |
| | [1,4] | [7, 52-tone DRU1_2,52-tone DRU2_2, 715] | | | | | [10, 52-tone DRU3_2,52-tone DRU4_2,718] | | | | [721,724] |
| | | | | | | | | | | | |
| 242-tone | DRU2 [1:3:244, 247:3:478, 481:3:724] ⇔ 242-tone [DRU_base]+1 | | | | | | | | | | |

FIG. 27

| Combination of first- and second-level tone distribution for 242-tone DRU3 | | | | | | | | | | | |
|---|---|---|---|---|---|---|---|---|---|---|---|
| 26-tone | Null | DRU1_3 (9+9+8) | DRU2_3 (8+9+9) | DRU3_3 (9+9+8) | DRU4_3 (8+9+9) | DRU5_3 (9+8+9) | DRU6_3 (9+9+8) | DRU7_3 (8+9+9) | DRU8_3 (9+9+8) | DRU9_3 (8+9+9) | Null |
| | [2:3:11] | 26-tone [DRU1_1] +2 | 26-tone [DRU2_1] +2 | 26-tone [DRU3_1] +2 | 26-tone [DRU4_1] +2 | 26-tone [DRU5_1] +2 | 26-tone [DRU6_1] +2 | 26-tone [DRU7_1] +2 | 26-tone [DRU8_1] +2 | 26-tone [DRU9_1] +2 | [716:3:725] |
| 52-tone | Null | DRU1_3 | | DRU2_3 | | | DRU3_3 | | DRU4_3 | | Null |
| | [2:3:11] | 26-tone [DRU1_3 DRU2_3] | | 26-tone [DRU3_3,DRU4_3] | | | 26-tone [DRU6_3,DRU7_3] | | 26-tone [DRU8_3,DRU9_3] | | [716:3:725] |
| | | | | | | | | | | | |
| 106-tone | Null | DRU1_3 | | | | | DRU2_3 | | | | Null |
| | [2,5] | [8, 52-tone DRU1_3, 52-tone DRU2_3, 716] | | | | | [11, 52-tone DRU3_3, 52-tone DRU4_3,719] | | | | [722,725] |
| | | | | | | | | | | | |
| 242-tone | DRU3 [2:3:239, 242:3:482, 485:3:725] ⇔ 242-tone [DRU_base]+2 | | | | | | | | | | |

FIG. 28

| | | | | |
|---|---|---|---|---|
| 242-tone | DRU1 [0:3:723] | DRU2 [1:3:724] | DRU3 [2:3:725] | |
| | [-495:3:-12, 14:3:251] ⇔ [DRU_base] | [-494:3:-14, 12:3:252] ⇔ [DRU_base] -> 1 | [-493:3:-13, 13:3:253] ⇔ [DRU_base] -> 2 | [254:495] |

| DRUs related to the 242-tone DRU1 in 80 MHz PPDU with the last subchannel unavailable | | | | | | | | | | | |
|---|---|---|---|---|---|---|---|---|---|---|---|
| 26-tone | Null | DRU1_1 | DRU2_1 | DRU3_1 | DRU4_1 | DRU5_1 | DRU6_1 | DRU7_1 | DRU8_1 | DRU9_1 | Null |
| | [-495:3:-486] | [-483:27:-24, 26:27:215] ⇔ 26-tone [DRU1_1] | [-468:27:--36, 14:27:230] ⇔ 26-tone [DRU2_1] | [-477:27:-18, 32:27:248] ⇔ 26-tone [DRU3_1] | [-462:27:-30, 20:27:236] ⇔ 26-tone [DRU4_1] | [-471:27:-12, 38:27:227] ⇔ 26-tone [DRU5_1] | [-480:27:--21, 29:27:218] ⇔ 26-tone [DRU6_1] | [-465:27:-33, 17:27:233] ⇔ 26-tone [DRU7_1] | [-474:27:-15, 35:27:251] ⇔ 26-tone [DRU8_1] | [-459:27:-27, 29:27:218] ⇔ 26-tone [DRU9_1] | [484:3:493] |
| 52-tone | Null | DRU1 | | DRU2 | | | DRU3 | | DRU4 | | Null |
| | [-495:3:-486] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [484:3:493] |
| 106-tone | Null | DRU1 | | | | | DRU2 | | | | Null |
| | [-495,-492] | [-489, 52-tone DRU1_1,52-tone DRU2_1,484] | | | | | [-486, 52-tone DRU3_1,52-tone DRU4_1,487] | | | | [490,493] |
| 242-tone | DRU1 | | | | | | | | | | |
| | [-495:3:-12, 14:3:251] ⇔ [DRU_base] | | | | | | | | | | |

FIG. 31

| DRUs related to the 242-tone DRU1 in 80 MHz PPDU with the last subchannel unavailable | | | | | | | | | | | |
|---|---|---|---|---|---|---|---|---|---|---|---|
| 26-tone | Null | DRU1_2 | DRU2_2 | DRU3_2 | DRU4_2 | DRU5_2 | DRU6_2 | DRU7_2 | DRU8_2 | DRU9_2 | Null |
| | [-495:3:-486] | 26-tone [DRU1_1] -> 1 | 26-tone [DRU2_1] -> 1 | 26-tone [DRU3_1] -> 1 | 26-tone [DRU4_1] -> 1 | 26-tone [DRU5_1] -> 1 | 26-tone [DRU6_1] -> 1 | 26-tone [DRU7_1] -> 1 | 26-tone [DRU8_1] -> 1 | 26-tone [DRU9_1] -> 1 | [484:3:493] |
| 52-tone | Null | DRU1_2 | | DRU2_2 | | | DRU3_2 | | DRU4_2 | | Null |
| | [-495:3:-486] | 26-tone [DRU1_2, DRU2_2] | | 26-tone [DRU3_2,DRU4_2] | | | 26-tone [DRU6_2,DRU7_2] | | 26-tone [DRU8_2,DRU9_2] | | [484:3:493] |
| 106-tone | Null | DRU1_2 | | | | | DRU2_2 | | | | Null |
| | [-495,-492] | [-489, 52-tone DRU1_2,52-tone DRU2_2,484] | | | | | [-486, 52-tone DRU3_2,52-tone DRU4_2,487] | | | | [490,493] |
| 242-tone | DRU2 | | | | | | | | | | |
| | [-494:3:-14, 12:3:252] ⇔ [DRU_base] -> 1 | | | | | | | | | | |

FIG. 32

| DRUs related to the 242-tone DRU1 in 80 MHz PPDU with the last subchannel unavailable | | | | | | | | | | | |
|---|---|---|---|---|---|---|---|---|---|---|---|
| 26-tone | Null | DRU1_3 | DRU2_3 | DRU3_3 | DRU4_3 | DRU5_3 | DRU6_3 | DRU7_3 | DRU8_3 | DRU9_3 | Null |
| | [-495:3:-486] | 26-tone [DRU1_1] -> 2 | 26-tone [DRU2_1] -> 2 | 26-tone [DRU3_1] -> 2 | 26-tone [DRU4_1] -> 2 | 26-tone [DRU5_1] -> 2 | 26-tone [DRU6_1] -> 2 | 26-tone [DRU7_1] -> 2 | 26-tone [DRU8_1] -> 2 | 26-tone [DRU9_1] -> 2 | [484:3:493] |
| 52-tone | Null | DRU1_3 | | DRU2_3 | | | DRU3_3 | | DRU4_3 | | Null |
| | [-495:3:-486] | 26-tone [DRU1_3, DRU2_3] | | 26-tone [DRU3_3,DRU4_3] | | | 26-tone [DRU6_3,DRU7_3] | | 26-tone [DRU8_3,DRU9_3] | | [484:3:493] |
| 106-tone | Null | DRU1_3 | | | | | DRU2_3 | | | | Null |
| | [-495,-492] | [-489, 52-tone DRU1_3,52-tone DRU2_3,484] | | | | | [-486, 52-tone DRU3_3,52-tone DRU4_3,487] | | | | [490,493] |
| 242-tone | DRU3 | | | | | | | | | | |
| | [-493:3:-13, 13:3:253] ⇔ [DRU_base] -> 2 | | | | | | | | | | |

FIG. 33

| 242-tone | DRU1 | DRU2 | | DRU3 |
|---|---|---|---|---|
| | All tones in [DRU_base] with indices larger than or equal to 12 right-shifting 242 | All tones in [DRU_base] -> 1 with indices larger than or equal to 12 right-shifting 242 | [12:253] | All tones in [DRU_base] -> 2 with indices larger than or equal to 12 right-shifting 242 |

FIG. 35

| 242-tone | DRU1 | | DRU2 | DRU3 |
|---|---|---|---|---|
| | All tones in [DRU_base] with indices larger than or equal to -253 right-shifting 242 | [-253:-12] | All tones in [DRU_base] -> 1 with indices larger than or equal to -253 right-shifting 242 | All tones in [DRU_base] -> 2 with indices larger than or equal to -253 right-shifting 242 |

FIG. 37

| 242-tone | | DRU1 | DRU2 | DRU3 |
|---|---|---|---|---|
| | [-495:-254] | All tones in [DRU_base] right-shifting 242 | All tones in [DRU_base] -> 1 right-shifting 242 | All tones in [DRU_base] -> 2 right-shifting 242 |

FIG. 39

| | DRU1 | DRU2 |
|---|---|---|
| 242-tone | [0:2:482] ⇔ [DRU1] | [1:2:483] ⇔ [DRU1]+1 |

FIG. 40

| Combination of first- and second-level tone distribution for 242-tone DRU1 | | | | | | | | | | | |
|---|---|---|---|---|---|---|---|---|---|---|---|
| 26-tone | Null | DRU1_1 | DRU2_1 | DRU3_1 | DRU4_1 | DRU5_1 | DRU6_1 | DRU7_1 | DRU8_1 | DRU9_1 | Null |
| | [0:2:6] | [8:18:458] ⇔ [DRU1_1] | [18:18:468] ⇔ [DRU1_1]+10 | [12:18:462] ⇔ [DRU1_1] +4 | [22:18:472] ⇔ [DRU1_1]+14 | [16:18:466] ⇔ [DRU1_1]+8 | [10:18:460] ⇔ [DRU1_1]+2 | [20:18:470] ⇔ [DRU1_1]+12 | [14:18:464] ⇔ [DRU1_1]+6 | [24:18:474] ⇔ [DRU1_1]+16 | [476:2:482] |
| 52-tone | Null | DRU1_1 | | DRU2_1 | | | DRU3_1 | | DRU4_1 | | Null |
| | [0:2:6] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [476:2:482] |
| | | | | | | | | | | | |
| 106-tone | Null | DRU1_1 | | | | | DRU2_1 | | | | Null |
| | [0,2] | [4, 52-tone DRU1_1,52-tone DRU2_1, 476] | | | | | [6, 52-tone DRU3_1,52-tone DRU4_1,478] | | | | [480,482] |
| | | | | | | | | | | | |
| 242-tone | DRU1 [0:2:240, 242:2:482] ⇔ [DRU_base] | | | | | | | | | | |

FIG. 41

| | | | | |
|---|---|---|---|---|
| 242-tone | DRU1 [0:2:482] | DRU2 [1:2:483] | | |
| | [-495:2:-13] ⇔ [DRU_base] | [-494:2:-12] ⇔ [DRU_base] -> 1 | [12:253] | [254:495] |

FIG. 43

| DRUs related to the 242-tone DRU1 in 80 MHz PPDU with the last two subchannels unavailable | | | | | | | | | | | |
|---|---|---|---|---|---|---|---|---|---|---|---|
| 26-tone | Null | DRU1_1 | DRU2_1 | DRU3_1 | DRU4_1 | DRU5_1 | DRU6_1 | DRU7_1 | DRU8_1 | DRU9_1 | Null |
| | [-495:2:-489] | [-487:18:-37] ⇔ 26-tone [DRU1_1] | [-477:18:-27] ⇔ 26-tone [DRU1_1] ->10 | [-483:18:-33] ⇔ 26-tone [DRU1_1] -> 4 | [-473:18:-23] ⇔ 26-tone [DRU1_1] -> 14 | [-479:18:-29] ⇔ 26-tone [DRU1_1] -> 8 | [-485:18:-35] ⇔ 26-tone [DRU1_1] -> 2 | [-475:18:-25] ⇔ 26-tone [DRU1_1] ->12 | [-481:18:-31] ⇔ 26-tone [DRU1_1] ->6 | [-471:18:-21] ⇔ 26-tone [DRU1_1] ->16 | [-19:2:13] |
| 52-tone | Null | DRU1_1 | | DRU2_1 | | | DRU3_1 | | DRU4_1 | | Null |
| | [-495:2:-489] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [-19:2:-13] |
| 106-tone | Null | DRU1_1 | | | | | DRU2_1 | | | | Null |
| | [-495,-493] | [-491, 52-tone DRU1_1,52-tone DRU2_1,-19] | | | | | [-489, 52-tone DRU3_1,52-tone DRU4_1,-17] | | | | [-15,-13] |
| 242-tone | DRU1 | | | | | | | | | | |
| | [-495:2:-13] ⇔ [DRU_base] | | | | | | | | | | |

FIG. 44

| DRUs related to the 242-tone DRU2 in 80 MHz PPDU with the last two subchannels unavailable | | | | | | | | | | | |
|---|---|---|---|---|---|---|---|---|---|---|---|
| 26-tone | Null | DRU1_2 | DRU2_2 | DRU3_2 | DRU4_2 | DRU5_2 | DRU6_2 | DRU7_2 | DRU8_2 | DRU9_2 | Null |
| | [-495:2:-489] | [-487:18:-37] ⇔ 26-tone [DRU1_1] | [-477:18:-27] ⇔ 26-tone [DRU1_1] ->10 | [-483:18:-33] ⇔ 26-tone [DRU1_1] -> 4 | [-473:18:-23] ⇔ 26-tone [DRU1_1] -> 14 | [-479:18:-29] ⇔ 26-tone [DRU1_1] -> 8 | [-485:18:-35] ⇔ 26-tone [DRU1_1] -> 2 | [-475:18:-25] ⇔ 26-tone [DRU1_1] ->12 | [-481:18:-31] ⇔ 26-tone [DRU1_1] ->6 | [-471:18:-21] ⇔ 26-tone [DRU1_1] ->16 | [-19:2:13] |
| 52-tone | Null | DRU1_2 | | DRU2_2 | | | DRU3_2 | | DRU4_2 | | Null |
| | [-495:2:-489] | 26-tone [DRU1_1, DRU2_1] | | 26-tone [DRU3_1,DRU4_1] | | | 26-tone [DRU6_1,DRU7_1] | | 26-tone [DRU8_1,DRU9_1] | | [-19:2:-13] |
| 106-tone | Null | DRU1_2 | | | | | DRU2_2 | | | | Null |
| | [-495,-493] | [-491, 52-tone DRU1_1,52-tone DRU2_1,-19] | | | | | [-489, 52-tone DRU3_1,52-tone DRU4_1,-17] | | | | [-15,-13] |
| 242-tone | DRU2 | | | | | | | | | | |
| | [-494:2:-12] ⇔ [DRU_base] -> 1 | | | | | | | | | | |

FIG.45

| | | | | |
|---|---|---|---|---|
| 242-tone | DRU1 [0:2:482] | | | DRU2 [1:2:483] |
| | All tones in [DRU_base] with indices larger than or equal to -253 right-shifting 484 | [-253:-12] | [12:253] | All tones in [DRU_base]-> 1 with indices larger than or equal to -253 right-shifting 484 |

COMMUNICATION METHOD AND DEVICE

CROSS-REFERENCE TO RELATED APPLICATION

This application claims the benefit of and priority to U.S. Provisional Patent Application No. 63/670,540, filed on Jul. 12, 2024, the content of which is hereby incorporated by reference in its entirety.

TECHNICAL FIELD

The present disclosure relates to the field of communication technologies, and in particular to a communication method and a device.

BACKGROUND

Wireless communication systems such as IEEE 802.11ac (WI-FI® 5; WI-FI is a registered trademark of Wi-Fi Alliance, Austin, TX, USA) and IEEE 802.11ax (WI-FI® 6) systems need to meet the govern-regulated power spectral density (PSD) requirements, which lays the limit in the upper bound on the transmitter (TX) power at, for example, every one (1) megahertz (MHz). The total TX power has also been regulated.

In wireless communication systems (such as IEEE 802.11ax (WI-FI® 6) systems) using orthogonal frequency division multiple access (OFDMA; which uses orthogonal frequency division multiplexing (OFDM) for multiple access), the resource unit (RU) is the OFDMA scheduling unit. In conventional wireless communication technologies, a RU usually only occupies a sub-bandwidth of consecutive subcarriers of the OFDM frame according to the size of the RU. When using OFDMA, different RUs may be used with different TX power. However, the government-regulated PSD requirements limit the TX power that can be used in RUs.

SUMMARY

In a first aspect, a communication method is provided. The method includes: determining a plurality of resource units (RUs) of a physical layer protocol data unit (PPDU) with a first bandwidth comprising an integer number of 20 MHz subchannels, wherein locations of the plurality of RUs are determined based on a first-level tone distribution and a second-level tone distribution; the first-level tone distribution is used to indicate a universal mapping relationship between distributed subcarrier indices of 26-tone RU, 52-tone RU and 106-tone RU and subcarrier indices of 242-tone RU in each 20 MHz subchannel; and the second-level tone distribution is used to indicate a distribution of subcarrier indices of 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarriers allocated between any consecutive 242-tone RUs; and transmitting a signal to a device using one or more RUs of the plurality of RUs. In the present disclosure, it is interchangeable between 'subcarrier' and 'tone'.

In the first aspect, the first-level tone distribution and the second-level tone distribution are used to determine the subcarrier locations of the RUs in order to increase the per-tone transmit power corresponding to each RU and further to improve the data transmission performance. All null subcarriers and guard subcarriers in a 20 MHz subchannel are allocated on left-most and right-most portions of the PPDU.

In a possible implementation, the first bandwidth is 80 MHz.

In a possible implementation, the plurality of RUs are distributed RUs (DRUs), and subcarrier indices corresponding to the plurality of DRUs are determined based on a number of the plurality of DRUs.

In a possible implementation, 242-tone RU subcarriers of the PPDU with the first bandwidth include a DRU1, DRU2, DRU3 and DRU4; the DRU1, DRU2, DRU3 and DRU4 are each 242-tone RUs in the PPDU of 80 MHz; indices of the DRU1 are indicated by [DRU1], indices of the DRU2 are indicated by [DRU1]+2, indices of the DRU3 are indicated by [DRU1]+1, and indices the DRU4 are indicated by [DRU1]+3; [DRU1] is [0:4:480, 484:4:964], and 4 is a tone separation; the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are indicated by [DRU1_1]+20, indices of the DRU3_1 are indicated by [DRU1_1]+8, indices of the DRU4_1 are indicated by [DRU1_1]+28, indices of the DRU5_1 are indicated by [DRU1_1]+16, indices of the DRU6_1 are indicated by [DRU1_1]+4, indices of the DRU7_1 are indicated by [DRU1_1]+24, indices of the DRU8_1 are indicated by [DRU1_1]+12, and indices of the DRU9_1 are indicated by [DRU1_1]+32; [DRU1_1] is [16:36:448, 484:36:916] before mapping, and 36 is a tone separation.

In a possible implementation, 242-tone subcarriers of the PPDU with the first bandwidth include a DRU1, DRU2, DRU3 and DRU4; the DRU1, DRU2, DRU3 and DRU4 are each 242-tone subcarriers in the PPDU of 20 MHz; indices of the DRU1 are indicated by [DRU1], indices of the DRU2 are right-shifted by 2 relative to [DRU1], indices of the DRU3 are right-shifted by 1 relative to [DRU1], and indices of the DRU4 are right-shifted by 3 relative to [DRU1]; the mapped [DRU1] is [−495:4:−15, 12:4:492], and 4 is a tone separation; the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are right-shifted by 20 relative to [DRU1_1], indices of the DRU3_1 are right-shifted by 8 relative to [DRU1_1], indices of the DRU4_1 are right-shifted by 28 relative to [DRU1_1], indices of the DRU5_1 are right-shifted by 16 relative to [DRU1_1], indices of the DRU6_1 are right-shifted by 4 relative to [DRU1_1], indices of the DRU7_1 are right-shifted by 24 relative to [DRU1_1], indices of the DRU8_1 are right-shifted by 12 relative to [DRU1_1], and indices of the DRU9_1 are right-shifted by 32 relative to [DRU1_1]; [DRU1_1] is [−479:36:−47, 12:36:444], and 36 is a tone separation.

In a possible implementation, the first bandwidth is an available DRU bandwidth.

In a possible implementation, 242-tone RU subcarriers of the PPDU with the first bandwidth include a DRU1, DRU2, and DRU3; the DRU1, DRU2, and DRU3 are each 242-tone subcarriers in the PPDU of 20 MHz; indices of the DRU1 are indicated by [DRU1], indices of the DRU2 are indicated by [DRU1]+1, and indices of the DRU3 are indicated by [DRU1]+2; [DRU1] is [0:3:243, 246:3:477, 480:3:723]

before mapping, and 3 is a tone separation; +j indicates that the indices of the DRU1 are added j, j being an positive integer.

In a possible implementation, in a case where a last 20 MHz subchannel is unavailable, 242-tone RU subcarriers of the PPDU with the first bandwidth include DRU1, DRU2, and DRU3; the indices of the DRU1 are [DRU1], the indices of the DRU2 are right-shifted by 1 relative to [DRU1], and the indices of the DRU3 are right-shifted by 2 relative to [DRU1]; and the mapped [DRU1] is [−495:3:−12, 14:3:251].

In a possible implementation, in a case where a second last 20 MHz subchannel is unavailable, 242-tone RU subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to 12 in the mapped [DRU1], by 242, wherein the mapped [DRU1] is [−495:3:−12, 14:3:251]; the indices of the DRU2 are obtained by right shifting all tones with indices, which are greater than or equal to 12 in the mapped [DRU1] that is right shifted by 1, by 242; and the indices of the DRU3 are obtained by right shifting all tones with indices, which are greater than or equal to 12 in the mapped [DRU1] that is right shifted by 2, by 242.

In a possible implementation, in a case where a second 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to −253 in the mapped [DRU1], by 242; the indices of the DRU2 are obtained by right shifting all tones with indices, which are greater than or equal to −253 in the mapped [DRU1] that is right shifted by 1, by 242; and the indices of the DRU3 are obtained by right shifting all tones with indices, which are greater than or equal to −253 in the mapped [DRU1] that is right shifted by 2, by 242.

In a possible implementation, in a case where the second-level tone distribution is mapped and a first 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices in the mapped [DRU1] by 242; the indices of the DRU2 are obtained by right shifting all tones with indices, which are in the mapped [DRU1] that is right shifted by 1, by 242; and the indices of the DRU3 are obtained by right shifting all tones with indices, which are in the mapped [DRU1] that is right shifted by 2, by 242.

In a possible implementation, in a case where a last 20 MHz subchannel and a second last 20 MHz subchannel are unavailable and the first bandwidth is 40 MHz, after the second-level tone distribution is mapped, the second-level tone distribution includes DRU1 and DRU2; indices of the DRU1 are [DRU1], and indices of the DRU2 are obtained by right shifting all tones with indices in the mapped [DRU1] by 1; the mapped [DRU1] is [−495:2:−13], and 2 is a tone separation.

In a possible implementation, in a case where a second 20 MHz subchannel and a third last 20 MHz subchannel are unavailable and the first bandwidth is 40 MHz, after the second-level tone distribution is mapped, the second-level tone distribution includes DRU1 and DRU2; indices of the DRU1 before mapping are indicated by [DRU1]; the indices of the DRU1 are obtained by right shifting all tones with indices, which are greater than or equal to −253 in the mapped [DRU1], by 484; the indices of the DRU2 are obtained by right shifting all tones with indices, which are greater than or equal to −253 in the mapped [DRU1] that is right shifted by 1, by 484.

In a second aspect, a communication method is provided. The method includes: determining a plurality of resource units (RUs) of a physical layer protocol data unit (PPDU) with a first bandwidth comprising an integer number of 20 MHz subchannels, wherein locations of the plurality of RUs are determined based on a first-level tone distribution and a second-level tone distribution; the first-level tone distribution is used to indicate a mapping relationship between distributed subcarrier indices of 26-tone RU, 52-tone RU and 106-tone RU and subcarrier indices of 242-tone RU in each 20 MHz subchannel; the second-level tone distribution is used to indicate a distribution of subcarrier indices of 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel (s) in a PPDU are allocated exclusively in left and right bands contiguous with guard subcarriers, with no null subcarrier allocated between any consecutive 242-tone RUs; and receiving a signal to a device using one or more RUs of the plurality of RUs.

In a possible implementation, the first bandwidth is 80 MHz.

In a possible implementation, the plurality of RUs are distributed RUs (DRUs), and subcarrier indices corresponding to the plurality of RUs are determined based on a number of the plurality of RUs.

In a possible implementation, 242-tone RUs of the PPDU with the first bandwidth include a DRU1, DRU2, DRU3 and DRU4; the DRU1, DRU2, DRU3 and DRU4 are each 242-tone RUs in the PPDU of 80 MHz; indices of the DRU1 are indicated by [DRU1], indices of the DRU2 are indicated by [DRU1]+2, indices of the DRU3 are indicated by [DRU1]+1, and indices the DRU4 are indicated by [DRU1]+3; [DRU1] is [0:4:480, 484:4:964], and 4 is a tone separation; the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are indicated by [DRU1_1]+20, indices of the DRU3_1 are indicated by [DRU1_1]+8, indices of the DRU4_1 are indicated by [DRU1_1]+28, indices of the DRU5_1 are indicated by [DRU1_1]+16, indices of the DRU6_1 are indicated by [DRU1_1]+4, indices of the DRU7_1 are indicated by [DRU1_1]+24, indices of the DRU8_1 are indicated by [DRU1_1]+12, and indices of the DRU9_1 are indicated by [DRU1_1]+32; [DRU1_1] is [16:36:448, 484:36:916] before mapping, and 36 is a tone separation.

In a possible implementation, 242-tone RUs of the PPDU with the first bandwidth include a DRU1, DRU2, DRU3 and DRU4; the DRU1, DRU2, DRU3 and DRU4 are each 242-tone RUs in the PPDU of 80 MHz; indices of the DRU1 are indicated by [DRU1], indices of the DRU2 are right-shifted by 2 relative to [DRU1], indices of the DRU3 are right-shifted by 1 relative to [DRU1], and indices of the DRU4 are right-shifted by 3 relative to [DRU1]; the mapped [DRU1] is [−495:4:−15, 12:4:492], and 4 is a tone separation; the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are right-shifted by 20 relative to [DRU1_1], indices of the DRU3_1 are right-shifted by 8 relative to [DRU1_1], indices of the DRU4_1 are right-shifted by 28 relative to [DRU1_1], indices of the DRU5_1 are right-shifted by 16 relative to [DRU1_1], indices of the DRU6_1 are right-shifted by 4 relative to [DRU1_1], indices of the DRU7_1 are right-shifted by 24 relative to [DRU1_1], indices of the DRU8_1 are right-shifted by 12 relative to [DRU1_1], and indices of the DRU9_1 are right-shifted by 32 relative to [DRU1_1]; [DRU1_1] is [−479:36:−47, 12:36:444], and 36 is a tone separation.

In a possible implementation, the first bandwidth is an available DRU bandwidth.

In a possible implementation, 242-tone RUs of the PPDU with the first bandwidth include a DRU1, DRU2, and DRU3; the DRU1, DRU2, and DRU3 are each 242-tone subcarriers corresponding to a 20 MHz in the PPDU; indices of the DRU1 are indicated by [DRU1], indices of the DRU2 are indicated by [DRU1]+1, and indices of the DRU3 are indicated by [DRU1]+2; [DRU1] is [0:3:243, 246:3:477, 480:3:723] before mapping, and 3 is a tone separation; +j indicates that the indices of the DRU1 are added j, j being an positive integer.

In a possible implementation, in a case that a last 20 MHz subchannel is unavailable, 242-tone RU subcarriers of the PPDU with the first bandwidth include DRU1, DRU2, and DRU3; the indices of the DRU1 are [DRU1], the indices of the DRU2 are right-shifted by 1 relative to [DRU1], and the indices of the DRU3 are right-shifted by 2 relative to [DRU1]; and the mapped [DRU1] is [−495:3:−12, 14:3:251].

In a possible implementation, in a case that a second last 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to 12 in the mapped [DRU1], by 242, wherein the mapped [DRU1] is [−495:3:−12, 14:3:251]; the indices of the DRU2 are obtained by right shifting all tones with indices, which are greater than or equal to 12 in the mapped [DRU1] that is right shifted by 1, by 242; and the indices of the DRU3 are obtained by right shifting all tones with indices, which are greater than or equal to 12 in the mapped [DRU1] that is right shifted by 2, by 242.

In a possible implementation, in a case that a second 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to −253 in the mapped [DRU1], by 242; the indices of the DRU2 are obtained by right shifting all tones with indices, which are greater than or equal to −253 in the mapped [DRU1] that is right shifted by 1, by 242; and the indices of the DRU3 are obtained by right shifting all tones with indices, which are greater than or equal to −253 in the mapped [DRU1] that is right shifted by 2, by 242.

In a possible implementation, in a case that a first 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices in the mapped [DRU1] by 242; the indices of the DRU2 are obtained by right shifting all tones with indices, which are in the mapped [DRU1] that is right shifted by 1, by 242; and the indices of the DRU3 are obtained by right shifting all tones with indices, which are in the mapped [DRU1] that is right shifted by 2, by 242.

In a possible implementation, in a case that a last 20 MHz subchannel and a second last 20 MHz subchannel are unavailable and the first bandwidth is 40 MHz, after the second-level tone distribution is mapped, the second-level tone distribution includes DRU1 and DRU2; indices of the DRU1 are [DRU1], and indices of the DRU2 are obtained by right shifting all tones with indices in the mapped [DRU1] by 1; the mapped [DRU1] is [−495:2:−13], and 2 is a tone separation.

In a possible implementation, in a case that a second 20 MHz subchannel and a third 20 MHz subchannel are unavailable and the first bandwidth is 40 MHz, after the second-level tone distribution is mapped, the second-level tone distribution includes DRU1 and DRU2; indices of the DRU1 before mapping are indicated by [DRU1]; the indices of the DRU1 are obtained by right shifting all tones with indices, which are greater than or equal to −253 in the mapped [DRU1], by 484; the indices of the DRU2 are obtained by right shifting all tones with indices, which are greater than or equal to −253 in the mapped [DRU1] that is right shifted by 1, by 484.

In a third aspect, a device is provided. The device includes: one or more processors; and a memory for storing instructions that, when executed by the one or more processors, cause the device to perform the method as described in the first aspect and any possible implementation of the first aspect or the method as described in the second aspect and any possible implementation of the second aspect.

In a fourth aspect, a non-transitory computer-readable storage medium is provided. The non-transitory computer-readable storage medium includes: instructions that, when executed by one or more circuits, cause the one or more circuits to perform the method as described in the first aspect and any possible implementation of the first aspect or the method as described in the second aspect and any possible implementation of the second aspect.

In addition, as for beneficial effects of the communication method in the second aspect, beneficial effects of the device in the third aspect, and beneficial effects of the non-transitory computer-readable storage medium in the fourth aspect, reference can be made to the beneficial effects described in the first aspect and any possible implementation of the first aspect, and details will not be repeated here.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 8 illustrates RRUs and DRUs allocated within a PPDU BW;

FIG. 9 is a schematic diagram showing RU locations related to 20 MHz;

FIG. 14 is a schematic diagram of indices of RRUs according to embodiments of the present disclosure;

FIG. 15 is a schematic diagram showing indices of DRUs in a first-level tone distribution according to embodiments of the present disclosure;

FIG. 16 is a schematic diagram of indices of DRUs in a first-level tone distribution according to other embodiments of the present disclosure;

FIG. 17 is a schematic diagram of indices of DRUs in a first-level tone distribution according to still other embodiments of the present disclosure;

FIG. 18 is a schematic diagram of indices of DRUs in a second-level tone distribution according to embodiments of the present disclosure;

FIG. 19 is a schematic diagram showing a combination of a first-level tone distribution and a second-level tone distribution of a DRU1 according to embodiments of the present disclosure;

FIG. 20 is a schematic diagram of tone distribution of an available tone distribution bandwidth of 80 MHz in an 80 MHz PPDU;

FIG. 21 is a schematic diagram of 26-, 52- and 106-tone DRUs related to 242-tone DRU1 according to embodiments of the present disclosure;

FIG. 22 is a schematic diagram of 26-, 52- and 106-tone DRUs related to 242-tone DRU2 according to embodiments of the present disclosure;

FIG. 23 is a schematic diagram of 26-, 52- and 106-tone DRUs related to 242-tone DRU3 according to embodiments of the present disclosure;

FIG. 24 is a schematic diagram of 26-, 52- and 106-tone DRUs related to 242-tone DRU4 according to embodiments of the present disclosure;

FIG. 25 is a schematic diagram of a second-level tone distribution according to other embodiments of the present disclosure;

FIG. 26 is a schematic diagram showing a combination of a first-level tone distribution and a second-level tone distribution of a 242-tone DRU1 according to other embodiments of the present disclosure;

FIG. 27 is a schematic diagram of 26-, 52- and 106-tone DRUs related to 242-tone DRU2 according to other embodiments of the present disclosure;

FIG. 28 is a schematic diagram of 26-, 52- and 106-tone DRUs related to 242-tone DRU3 according to other embodiments of the present disclosure;

FIG. 31 is a schematic diagram of tone distribution of 26-, 52- and 106-tone DRUs related to a 242-tone DRU1 (DRU_base) in an 80 MHz PPDU with a last 20 MHz being unavailable for tone distribution across 20 MHz subchannels according to embodiments of the present disclosure;

FIG. 32 is a schematic diagram of tone distribution of 26-, 52- and 106-tone DRUs related to a 242-tone DRU2 in an 80 MHz PPDU with a last 20 MHz being unavailable for tone distribution across 20 MHz subchannels according to embodiments of the present disclosure;

FIG. 33 is a schematic diagram of tone distribution of 26-, 52- and 106-tone DRUs related to a 242-tone DRU3 in an 80 MHz PPDU with a last 20 MHz being unavailable for tone distribution across 20 MHz subchannels according to embodiments of the present disclosure;

FIG. 35 is a schematic diagram of tone distribution of 242-tone DRUs with a second last 20 MHz subchannel being unavailable for tone distribution across 20 MHz subchannels in an 80 MHz PPDU according to embodiments of the present disclosure;

FIG. 37 is a schematic diagram of tone distribution of 242-tone DRUs with a second 20 MHz subchannel being unavailable for tone distribution across 20 MHz subchannels in an 80 MHz PPDU according to embodiments of the present disclosure;

FIG. 39 is a schematic diagram of tone distribution of 242-tone DRUs with a first 20 MHz subchannel being unavailable for tone distribution across 20 MHz subchannels according to embodiments of the present disclosure;

FIG. 40 is a schematic diagram of a second-level tone distribution with two consecutive 20 MHz subchannels being available for tone distribution across 20 MHz subchannels according to embodiments of the present disclosure;

FIG. 41 is a schematic diagram showing a combination of a first-level tone distribution and a second-level tone distribution of a DRU1 according to embodiments of the present disclosure;

FIG. 43 is a schematic diagram of tone distribution of 242-tone DRUs with last two 20 MHz subchannels being unavailable for tone distribution across 20 MHz subchannels according to embodiments of the present disclosure;

FIG. 44 is a schematic diagram of tone distribution of 26-, 52- and 106-tone DRUs related to a 242-tone DRU1 in an 80 MHz PPDU with last two 20 MHz being unavailable for tone distribution across 20 MHz subchannels according to embodiments of the present disclosure;

FIG. 45 is a schematic diagram of tone distribution of 26-, 52- and 106-tone DRUs related to a 242-tone DRU2 in an 80 MHz PPDU with last two 20 MHz being unavailable for tone distribution across 20 MHz subchannels according to embodiments of the present disclosure;

DETAILED DESCRIPTION OF THE EMBODIMENTS

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as open and inclusive meaning, i.e., “including, but not limited to”. In the description, the terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The term “and/or” merely describes an association of associated objects, which include three situations. For example, “A and/or B” refers to three situations: A alone, A and B, and B alone.

Hereinafter, the terms “first” and “second” are used for descriptive purposes only, and are not to be construed as indicating or implying the relative importance or implicitly indicating the number of indicated technical features. Thus, features defined with “first” and “second” may explicitly or implicitly include one or more of the features, and the terms “first” and “second” are not used to describe a specific order of the objects.

In the description of the embodiments of the present disclosure, the term “multiple”, “a plurality of” or “the plurality of” means two or more unless otherwise specified, and “multiple”, “a plurality of” or “the plurality of” may also be described as “at least two”.

In addition, the phrase “based on” used herein has an open and inclusive meaning, since a process, step, calculation or other action that is “based on” one or more of the stated conditions or values may, in practice, be based on additional conditions or values exceeding those stated.

Figure 1:
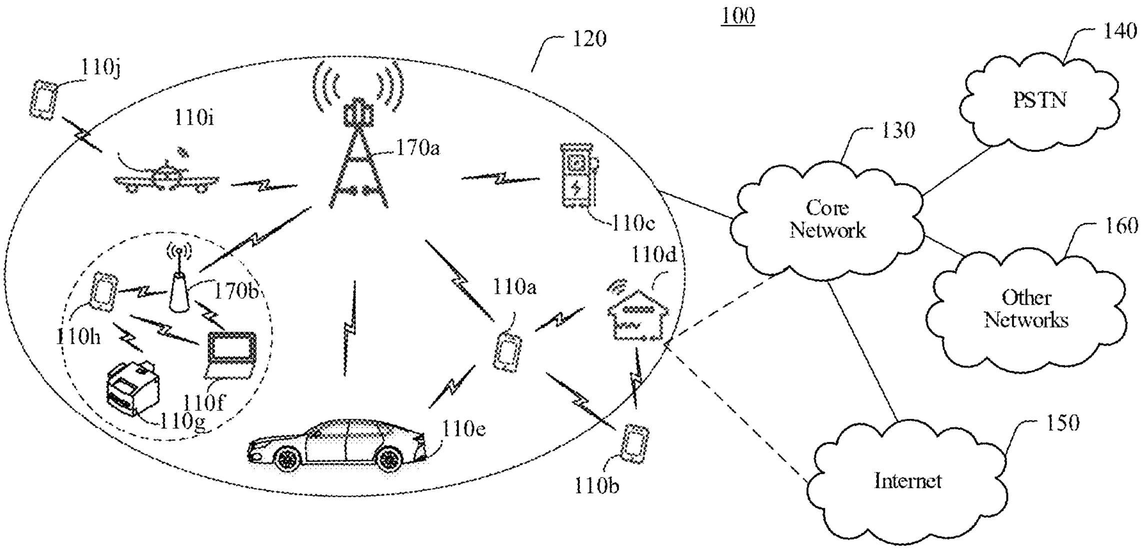
FIG. 1 is a schematic illustration of an example communication system according to an implementation of the present disclosure.

FIG. 1 is a schematic illustration of an example communication system according to an implementation of the present disclosure, there is shown a communication system 100 that includes a radio access network (RAN) 120, one or more communication electronic devices (EDs) 10*a*, 110*b*, 110*c*, 110*d*, 110*e*, 110*f*, 110*g*, 110*h*, 110*i*, 110*j* (collectively referred to as 110), a core network 130, a Public Switched Telephone Network (PSTN) 140, the Internet 150, and other networks 160. The RAN 120 may include, but is not limited to, a future generation RAN, or a legacy RAN such as, but not limited to, 5th generation (5G), 4th generation (4G), 3rd generation (3G) or 2nd generation (2G) radio access network. The RAN 120 may The RAN 120 may be, for example, an Evolved Universal Mobile Telecommunications System (UMTS) Terrestrial Radio Access Network (E-UTRAN), a NextGen RAN (NG RAN), or some other type of RAN. Examples of RAN 120 based on the evolution of telecommunications standards include, but is not limited to, GSM (Global System for Mobile Communications) and CDMA (Code Division Multiple Access) for 2G, UMTS (Universal Mobile Telecommunications System) based on WCDMA (Wideband Code Division Multiple Access) and CDMA2000 for 3G, LTE (Long-Term Evolution) and WiMAX (Worldwide Interoperability for Microwave Access) for 4G, and NR (New Radio) for 5G. In some implementations, the RAN 120 may use any radio access technology (RAT) in the wireless interface between the one or more EDs 110 and the RAN 120. In some implementations, the term “radio access” may refer to the future generation air interface standards which The core network (CN) 130 is a part of the communication system 100 and consists of network nodes (e.g., 170*a*, 170*b*) which provide support for the network features and telecommunication services. In some implementations, the CN 130 may be dependent on the RAT used in the communication system 100. In other implementations, the CN 130 may be access-agnostic, i.e., the CN 130 may be independent of the RAT used in the communication system 100. There are different types of CN 130, for different 3GPP system generations. For example, the CN 130 is the Evolved Packet Core (EPC) in 4G, also known as the Evolved Packet System (EPS). In another example, the CN 130 is the 5G Core (5GC) which was developed as part of the 5G System (5GS). The CN 130 also enables integration of different 3GPP and non-3GPP access types. In some implementations and referring to FIG. 1, the CN 130 also provides the interface towards external networks that may include the PSTN 140, the Internet 150, and other networks 160 in the communication system 100.

In general, the communication system 100 facilitates interaction between multiple wireless or wired elements. The communication system 100 may transmit different types of content, such as voice, data, video, and/or text, through different transmission methods such as, but not limited to, broadcast, multicast, groupcast, and unicast. Additionally, the communication system 100 operates by allocating and/or sharing resources, such as carrier spectrum bandwidth, among its constituent elements.

The communication system 100 may provide a wide range of communication services and applications including, but not limited to, Enhanced Mobile Broadband (eMBB) services, Ultra-Reliable Low-Latency Communication (URLLC) services, Massive Machine Type Communication (mMTC) services, Integrated Sensing And Communication (ISAC), immersive communication, Ultra-massive Machine-Type Communication (uMTC), hyper reliable and low-latency communication, ubiquitous connectivity, integrated AI and communication, and other services that can be provided by a future generation communication system. The communication system 100 may provide other services and applications such as, but not limited to, earth monitoring, remote sensing, passive sensing and positioning, navigation and tracking, autonomous delivery and mobility and the like.

The communication system 100 may include a terrestrial communication system (or network) and/or a non-terrestrial communication system (or network). The communication system 100 may provide a high degree of availability and robustness through a joint operation of the terrestrial communication system and the non-terrestrial communication system. For example, integrating a non-terrestrial communication system (or components thereof) into a terrestrial communication system can result in a heterogeneous network comprising multiple layers. The heterogeneous network may achieve better overall performance through efficient multi-link joint operation, more flexible functionality sharing, and faster physical layer link switching between terrestrial networks and non-terrestrial networks. The terrestrial communication system and the non-terrestrial communication system could be considered as sub-systems of the communication system 100.

Figure 2:
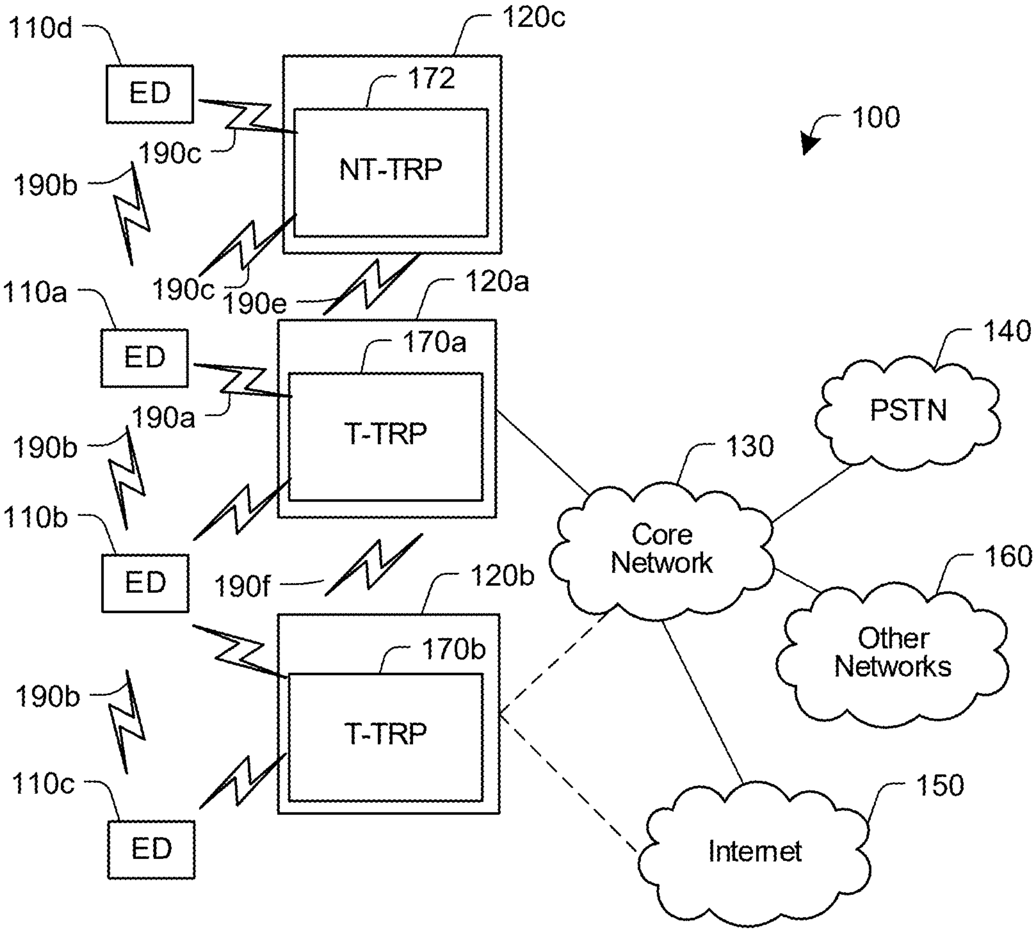
FIG. 2 illustrates another example communication system 100 according to an implementation of the present disclosure.

FIG. 2 illustrates another example communication system 100 according to an implementation of the present disclosure, there is shown the communication system 100 includes EDs 110*a*, 110*b*, 110*c*, 110*d* (collectively referred to as ED 110), RANS 120*a*, 120*b*, one or more CNs 130, a PSTN 140, the Internet 150, and other networks 160. Additionally, the communication system 100 may also include a non-terrestrial network (NTN) 120*c*. The RANs 120*a* and 120*b* may include network nodes 170*a* and 170*b* respectively. Examples of network nodes 170*a*, 170*b* include base stations, which can be generally referred to as terrestrial network (TN) devices or terrestrial transmit and receive points (T-TRPs) 170*a* and 170*b* (collectively referred to as 170). In this context, the terms "TRP" and "base station" are used interchangeably unless otherwise specified. For simplicity, this disclosure primarily refers to network nodes as base stations; however, unless explicitly stated otherwise, references to TRP are considered non-limiting and interchangeable. The T-TRPs 170*a*, 170*b* may be base stations mounted on a building or tower. In one implementation, the NTN 120*c* includes a RAN node such as a base station 172, which may be generally referred to as an NTN device, a non-terrestrial node, a non-terrestrial network device, a non-terrestrial base station, or a non-terrestrial transmit and receive point (NT-TRP) 172.

In some implementations, the NT-TRP 172 is not attached to the ground, for example, as in the case of an airborne base station. An airborne base station may be implemented using communication equipment supported or carried by a flying device. For example, a flying device may include, but is not limited to, an airborne platform (such as a blimp or an airship), balloon, drone (such as quadcopter), and other types of aerial vehicles. In some implementations, an airborne base station may be supported or carried by an unmanned aerial system (UAS) or an unmanned aerial vehicle (UAV), such as a drone. An airborne base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station. High altitude platforms are yet another example of non-terrestrial base stations, including international mobile telecommunication base stations.

As referred to herein, and unless specified otherwise, a "TRP" may also refer to a T-TRP or an NT-TRP, a "T-TRP" may also refer to a "TN TRP", and an "NT-TRP" may also refer to an "NTN TRP". The NTN 120*c* may be considered a RAN, sharing operational aspects with RANs 120*a*, 120*b*. The NTN 120*c* may include at least one NTN device and at least one corresponding terrestrial network device. The at least one NTN device may function as a transport layer device and the at least one corresponding terrestrial network device may function as a RAN node, communicating with the ED 110 via the NTN device. Additionally, there may be an NTN gateway on the ground (referred to as a terrestrial network device) that also functions as a transport layer device facilitating communication with both the NTN device and the RAN node. The RAN node may communicate with the ED 110 via the NTN device and the NTN gateway. In some implementations, the NTN gateway and the RAN node may be located within the same device.

A base station 170 (also referred to as a TRP as stated above) is a network element within a radio access network responsible for radio transmission and reception in one or more cells to or from the ED (such as a user equipment). In different implementations, the base station 170 may also be known as a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a terrestrial node, a terrestrial network device, a terrestrial base station, a non-terrestrial node, a non-terrestrial network device, a non-terrestrial base station, and a positioning node, among other possibilities. The base station 170 may be a macro base station (BS), a pico BS, The base station 170 performs (or is configured to perform) a method described herein, it may be interpreted as the base station itself, one or more modules (or units) in the base station, a circuit or chip, or a combination thereof, performing the method. For example, the circuit or chip may include a modem chip, also referred to as a baseband chip, a system on chip (SoC) including a modem core, system in package (SIP)), and the like, and may be responsible for one or more communication functions within the base station.

The EDs 110*a*-110*d* and TRPs 170*a*-170*b*, 172 are examples of communication equipment configured to implement some or all of the operations and/or implementations described herein. The T-TRP 170*a* forms part of the RAN 120*a*, which may include other TRPs, and/or other devices. Also, the TRP 170*b* forms part of the RAN 120*b*, which may include other TRPs, and/or devices. Each TRP 170*a*, 170*b* may transmit and/or receive wireless signals within a particular geographic region or area, sometimes referred to as a "cell" or a "coverage area". The TRPs 170*a*-170*b* may be responsible for allocating and/or configuring resources and transmission and/or reception in a set of cell(s). A cell is a radio network object that can be uniquely identified by a cell identification that is broadcasted over a geographical region or area from base stations associated with the cell. A cell can work in either FDD or TDD mode. A cell may be further divided into cell sectors, and a base station 170*a*-170*b* may, for example, employ one or more transceivers to provide services to one or more sectors. Some implementations, may include pico or femto cells if supported by the radio access technology. In some implementations, one or more transceivers could be used for each cell, such as with Multiple-Input Multiple-Output (MIMO) technology. The number of RANs 120a-120b shown is merely an example. Any number of RANs may be contemplated when designing the communication system 100.

In different systems, the CU (or the CU-CP and the CU-UP), the DU, or the RU may be known by different names, but their functions are understood by person skilled in the art. For example, in an open radio access network (ORAN) system, a CU may be referred to as an open CU (O-CU), a DU may be referred to as an open DU (O-DU), and a CU-CP may be referred to as an open CU-CP (O-CU-CP). The CU-UP may also be referred to as an open CU-UP (O-CU-UP), and the RU may also be referred to as an open RU (O-RU). Any one of the CU (or the CU-CP, the CU-UP), the DU, and the RU may be implemented using a software module, a hardware module, or a combination of a software module and a hardware module.

Furthermore, communication between different devices/apparatuses in various implementations of this disclosure may refer to direct communication (that is, without the need of forwarding by another device/apparatus), or may refer to communication(s) between different devices/apparatuses via another device/apparatus (that is, requiring forwarding by another device/apparatus). Alternatively, such communication(s) may involve one functional unit inside a device/apparatus using another functional unit within the device/apparatus to communicate with another device/apparatus. In other words, phrases such as "sending (or transmitting) information to . . . (an ED or a base station)" in this disclosure may be understood as a destination endpoint of the information being an ED or a base station, including, sending/transmitting information directly or indirectly to an ED or a base station. Similarly, phrases like "receiving information from . . . (an ED or a base station)" may be understood as a source endpoint of the information being an ED or a base station, including directly or indirectly receiving information from an ED or a base station. Between the source endpoint that sends the information and the destination endpoint, necessary processing such as, but not limited to, format conversion, digital-to-analog conversion, amplification, and filtering may be performed on the information. However, the destination endpoint may understand valid information from the source endpoint. A similar understanding applies to other descriptions in this disclosure without reiterating details already described. In the present disclosure, the terms "send" and "transmit" may be used interchangeably in different implementations of this disclosure.

The ED 110 is used to connect people, objects, machines, and other entities. The ED 110 may be widely used in various scenarios including, but not limited to, cellular communications, device-to-device (D2D), vehicle to everything (V2X), peer-to-peer (P2P), machine-to-machine (M2M), MTC, internet of things (IoT), virtual reality (VR), augmented reality (AR), mixed reality (MR), metaverse, digital twin, industrial control, self-driving, remote medical, smart grid, smart furniture, smart office, smart wearable, smart transportation, smart city, drones, robots, remote sensing, passive sensing, positioning, navigation and tracking, and autonomous delivery and mobility.

Each ED 110 represents any suitable end user device for wireless operation and may include such devices (or may be referred to as, but not limited to) a user equipment (UE) or a user device or a terminal device, a wireless transmit/receive unit (WTRU), a mobile station, a fixed or mobile subscriber unit, a cellular telephone, a station (STA), an MTC device, a personal digital assistant (PDA), a smartphone, a laptop, a computer, a tablet, a wireless sensor, a consumer electronics device, a smart book, a vehicle, a car, a truck, a bus, a train, or an IoT device, wearable devices (such as a watch, a pair of glasses, head mounted equipment, etc.), an industrial device, or an apparatus (such as a module, modem, or chip) in the forgoing devices, among other possibilities. Future generation EDs 110 may be referred to by other terms. When an ED 110 performs (or is configured to perform) a method described herein, it may be interpreted as the ED itself, one or more modules (or units) In the ED, a circuit or chip, or a combination thereof, performs the method. For example, the circuit or chip may include a modem chip, also referred to as a baseband chip, a system on chip (SoC) including a modem core, or system in package (SIP)), and the like, and may be responsible for one or more communication functions in the ED.

Each ED 110 connected to TRPs 170a-170b, and/or TRPs 172 can be dynamically or semi-statically turned-on (i.e., established, activated, or enabled), turned-off (i.e., released, deactivated, or disabled) and/or configured in response to one of more of: connection availability and connection necessity.

Any ED 110 may be alternatively or additionally configured to interface, access, or communicate with any of the TRPs 170a, 170b and 172, the Internet 150, the CN 130, the PSTN 140, the other networks 160, or any combination thereof. In some examples, the ED 110a may communicate an uplink (UL) and/or downlink (DL) transmission over a terrestrial air interface 190a with station-TRP 170a. In some examples, the EDs 110a, 110b, 110c, and 110d may also communicate directly with one another via one or more sidelink (SL) air interfaces 190b. In some examples, the EDs 110a, 110d may communicate using an UL and/or DL transmission over a non-terrestrial air interface 190c with NT-TRP 172.

An air interface (such as, for example, 190a, 190b, 190c) generally includes a number of components and associated parameters that collectively specify how a transmission is to be sent and/or received over a wireless communications link between two or more communicating devices such as EDs and base station(s). For example, an air interface may include one or more components defining the waveform(s), frame structure(s), multiple access scheme(s), protocol(s), coding scheme(s) and/or modulation scheme(s) for conveying information (such as, data) over a wireless communications link. The air interfaces 190a and 190b may use similar communication technology that may include any suitable radio access technology.

The non-terrestrial air interface 190c can enable communication between the EDs 110a, 110d and one or more NT-TRPs 172 via a wireless link or simply a link. For some examples, the link is a dedicated connection for unicast transmission, a connection for broadcast transmission, or a connection between a group of EDs 110 and one or more NT-TRPs 172 for multicast transmission.

The TRPs 170a-170b, 172 may communicate with one another over one or more air interfaces 190e, 190f using wireless communication links (such as radio frequency (RF), microwave, infrared (IR), etc.) or wired communication links. The air interfaces 190e, 190f may utilize any suitable radio access technology, and may be substantially similar to the air interfaces 190a, 190c over which the EDs 110a-110d communicate with one or more of the TRPs 170a-170b, 172 or they may be substantially different. For example, the communication system 100 may implement one or more channel access methods, such as Time Division Multiple Access (TDMA), Frequency Division Multiple Access (FDMA), Code Division Multiple Access (CDMA), Single Carrier Frequency Division Multiple Access (SC- FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA).

The RANs 120*a* and 120*b* are in communication with the CN 130 to provide the EDs 110*a* 110*b*, and 110*c* with various services such as voice, data, multimedia, and other services. The RANs 120*a* and 120*b* and/or the CN 130 may be in direct or indirect communication with one or more other RANs (not shown), which may or may not be directly served by the CN 130, and may employ different radio access technologies from RAN 120*a* and/or RAN 120*b*. The CN 130 may also serve as a gateway access between (i) the RANs 120*a* and 120*b* and/or the EDs 110*a* 110*b*, and 110*c*, and (ii) other networks (such as the PSTN 140, the Internet 150, and the other networks 160). In addition, some or all of The EDs 110*a* 110*b*, and 110*c* may include functionality for communicating with different wireless networks over different wireless links using different wireless technologies and/or protocols. For example, the EDs 110*a* 110*b*, and 110*c* communicate using different cellular communications protocols, such as, but not limited to, a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like. Instead of wireless communication (or in addition thereto), the EDs 110*a* 110*b*, and 110*c* may communicate using wired communication channels to a service provider or switch (not shown), and/or to the Internet 150. The PSTN 140 may include circuit switched telephone networks for providing plain old telephone service (POTS). The Internet 150 may include a network of computers and subnets (intranets) or both, and incorporate protocols, such as internet protocol (IP), transmission control protocol (TCP), user datagram protocol (UDP). EDs 110*a* 110*b*, and 110*c* may be multimode devices capable of operation according to multiple radio access technologies, and may incorporate one or multiple transceivers necessary to support such.

In addition, the communication system 100 may comprise a sensing agent (not shown) to manage the sensed data from ED 110 and/or any one of TRPs 170*a*, 170*b*, 172. In one implementation, the sensing agent may be part of any one of TRPs 170*a*, 170*b*, 172. In another implementation, the sensing agent is a separate node that can communicate with the CN 130 and/or the RAN 120 (such as any one of TRPs 170*a*, 170*b*, 172).

Figure 3:
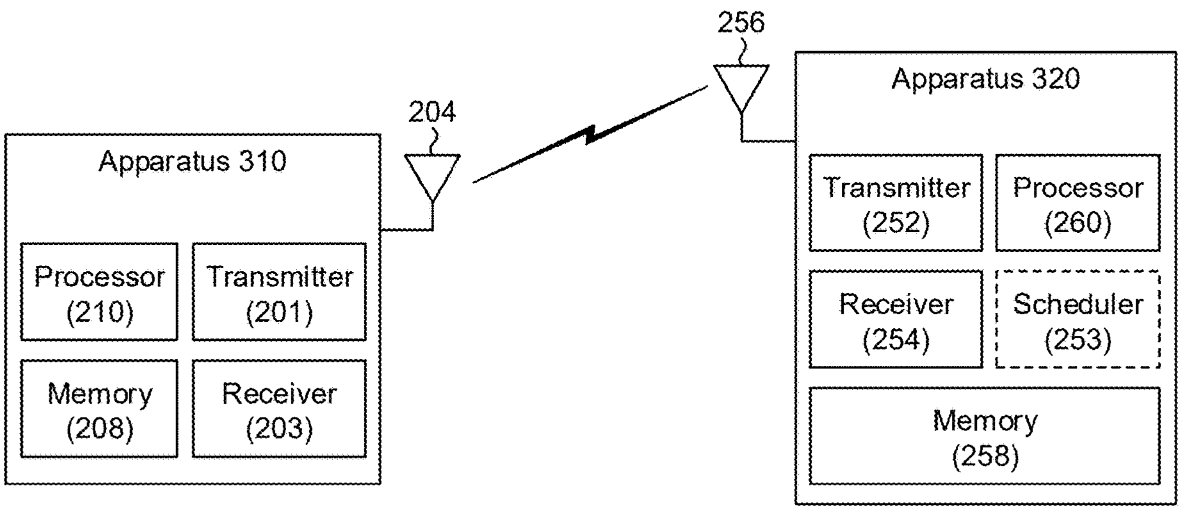
FIG. 3 is a schematic illustration showing an apparatus wirelessly communicating with another apparatus within a communication system according to an implementation of the present disclosure.

FIG. 3 is a schematic illustration showing an apparatus 310 wirelessly communicating with another apparatus 320 within a communication system (e.g., the communication system 100) according to an implementation of the present disclosure. The apparatus 310 may be an electronic device (such as ED 110). The apparatus 320 may be a network node (e.g., the network node 170) such as a T-TRP 170 or an NT-TRP 172. Although only one apparatus 310, and one apparatus 320 are shown in the figure, the number of apparatus 310 and/or the number of apparatus 320 can vary, potentially including one or more of each. For example, a single ED 110 may be served by a single T-TRP 170 (or a single NT-TRP 172), or by multiple T-TRPs 170 (or multiple NT-TRPs 172). Similarly, a single ED 110 may be served by a single T-TRP 170 (or a single NT-TRP 172), or by multiple T-TRPs 170 (or multiple NT-TRPs 172), may be served by one or more T-TRPs 170 and one or more NT-TRPs 172. Similarly, a single T-TRP 170 (or a single NT-TRP 172) may serve one or more EDs 110.

The apparatus 310 may include one or more processors 210. For clarity and to avoid overcrowding the illustration, only a single processor 210 is illustrated. The apparatus 310 may further include a transmitter 201 and a receiver 203 coupled to one or more antennas 204. For clarity, only a single antenna 204 is illustrated. One, some, or all of the antennas 204 may alternatively be panels. In some implementations, the transmitter 201 and the receiver 203 are separate from each other. In other implementations, the transmitter 201 and the receiver 203 may be integrated into a single unit, for example, as a transceiver. The transceiver is configured to modulate data or other content for transmission by the one or more antennas 204 or a network interface controller (NIC). The transceiver may also be configured to demodulate data or other content received by the one or more antennas 204. A transceiver may include any suitable structure for the apparatus 310 may include a memory 208. In some implementations, the apparatus 310 may include multiple memories 208. Only a single transmitter 201, receiver 203, processor 210, memory 208, and antenna 204 are illustrated for simplicity, but the apparatus 310 may include one or more other components. In some implementations of the present disclosure, the transceiver (or transmitter 201 and/or receiver 203) may be viewed as an interface circuit.

The memory 208 is configured to store instructions used to perform operations described herein. The memory 208 may also be configured to store data that is used, generated, or collected by the apparatus 310. For example, the memory 208 can store software instructions or modules configured to implement some or all of the functionalities and/or operations described herein and that which are executed by the one or more processors 210.

The apparatus 310 may further include one or more input/output devices (not shown) or interfaces. The input/output devices or interfaces facilitate interaction with a user or other devices in the network. Each input/output device or interface includes suitable components for facilitating transmission of information to a user and reception of information from a user, and for various network interface communications. Such components may include, but are not limited to, a speaker, microphone, keypad, keyboard, display, touch screen, and the like.

The processor 210 may be configured to perform (or control the apparatus 310 to perform) operations (or methods) described herein as being performed by the apparatus 310. For example, the processor 210 performs or controls the apparatus 310 to perform the operations of: a) receiving one or more transport blocks (TBs), b) using a resource for decoding at least one of the received TBs, c) releasing the resource for decoding another of the received TBs, and/or d) receiving configuration information configuring a resource. Specifically, the operations may include tasks related to: The apparatus 320 may be configured to prepare a transmission for UL transmission to the apparatus 320, processing DL transmissions received from the apparatus 320, and handling SL transmission to and from another apparatus 310. Processing operations related to preparing a transmission for UL transmission may include operations such as, but not limited to, encoding, modulating, transmit beamforming, and generating symbols for transmission. Processing operations related to processing DL transmissions may include operations such as, but not limited to, receive beamforming, demodulating and decoding received symbols. Processing operations related to processing SL transmissions may include operations such as, but not limited to, transmit/receive beamforming, modulating/demodulating and encoding/decoding symbols. Depending upon the implementation, a DL transmission may be received by the receiver 203, possibly using receive beamforming, and the processor 210 may extract signaling from the DL transmission (such as by detecting and/or decoding the signaling). An example of signaling may be a reference signal transmitted by the apparatus 320. In some implementations, the processor 210 implements the transmit beamforming and/or the receive beamforming based on the indication of beam direction, such as beam angle information (BAI), received from the apparatus 320. In some implementations, the processor 210 may be configured to perform operations relating to network access (such as initial access) and/or downlink synchronization, which includes operations for detecting a synchronization sequence, decoding and obtaining the system information, and the like. In some implementations, the processor 210 may perform channel estimation, such as using a reference signal received from the apparatus 320.

Although not illustrated, in some implementations, the processor 210 may either be a part of the transmitter 201 or a part of the receiver 203 or a part of both the transmitter 201 and the receiver 203. Although not illustrated, in some implementations, the memory 208 may be a part of the processor 210.

The processor 210, along with the processing components of the transmitter 201 and the receiver 203 may each be implemented by one or more processors that may be the same or different. These processors are configured to execute instructions stored in a memory (such as in the memory 208).

The apparatus 320 includes one or more processors 260 (only one processor 260 is illustrated). The apparatus 320 may further include one or more transmitters 252 and one or more receivers 254 coupled to one or more antennas 256. Only a single antenna 256 is illustrated to avoid clutter in the illustration. One, some, or all of the antennas 256 may alternatively be panels. In some implementations, the transmitter 252 and the receiver 254 are separate from each other. In other implementations, the transmitter 252 and the receiver 254 may be integrated into a single unit such as, for example, as a transceiver. The apparatus 320 may further include a memory 258. In some implementations, the apparatus 320 may include multiple memories 258. The apparatus 320 may further include a scheduler 253. Only a single transmitter 252, receiver 254, processor 260, memory 258, antenna 256 and scheduler 253 are illustrated for simplicity, however the apparatus 320 may include one or more other components. In the present disclosure, in some implementations, the transceiver (or transmitter 252 and/or receiver 254) may be viewed as an interface circuit.

6 for the apparatus 320. In some implementations, the apparatus 320 may be coupled to network-side nodes that perform processing operations such as, but not limited to, determining the location of the apparatus 310, resource allocation (scheduling), message generation, and encoding/decoding, and that which are not necessarily part of the equipment that houses the antennas 256 of the apparatus 320. The nodes may also be coupled to other apparatuses 320. In some implementations, the apparatus 320 may actually be a plurality of nodes that are The apparatus 310 can be operated together to serve the apparatus 310, such as through the use of coordinated multipoint transmissions, or through the use of an ORAN system as described above in the disclosure.

The processor 260 is configured to perform operations including those related to: preparing a transmission for DL transmission to the apparatus 310, processing an UL transmission received from the apparatus 310, preparing a transmission for backhaul transmission to another apparatus 320, and processing a transmission received over backhaul from another apparatus 320. Processing operations related to preparing a transmission for DL or backhaul transmission may include operations such as, but not limited to, encoding, modulating, precoding (such as MIMO precoding), transmit beamforming, and generating symbols for transmission. Processing operations related to processing received transmissions in the UL or over backhaul may include operations such as, but not limited to, receive beamforming, demodulating received symbols, and decoding received symbols. The processor 260 may also be configured to perform operations relating to network access (such as initial access) and/or DL synchronization, such as generating the content of synchronization signal blocks (SSBs), generating the system information, and the like. In some implementations, the processor 260 is further configured to generate an indication of beam direction, such as BAI, which may be scheduled for transmission by the scheduler 253 which will be described below. In some implementations, the processor 260 implements the transmit beamforming and/or receive beamforming based on beam direction information (such as BAI) received from another apparatus 320. The processor 260 is configured to perform other network side processing operations described herein, such as, but not limited to, determining the location of the apparatus 310, determining where to deploy another apparatus 320, and the like. In some implementations, the processor 260 may generate signaling data, to configure one or more parameters of the apparatus 310 and/or one or more parameters of another apparatus 320. Any signaling data generated by the processor 260 is sent by the transmitter 252. In some implementations, the apparatus 320 implements physical layer processing. In some implementations, the apparatus 320 may perform higher layer functions such as those at the Medium Access Control (MAC) or Radio Link Control (RLC) layers in addition to physical layer processing. In the apparatus 320, the scheduler 253 may be coupled to the processor 260 or integrated within the processor 260. In some implementations, the scheduler 253 may be integrated within the apparatus 320 or may be operated separately from the apparatus 320. The scheduler 253 may schedule UL, DL, SL, and/or backhaul transmissions, including issuing scheduling grants and/or configuring scheduling-free (such as "configured grant") resources.

The apparatus 320 may further include a memory 258 that is configured to store instructions for performing the operations described herein. The memory 258 may also store data that is used, generated, or collected by the apparatus 320. For example, the memory 258 can store software instructions or modules configured to implement some or all of the functionalities and/or implementations described herein and that which are executed by the processor 260.

Although not illustrated, the processor 260 may be implemented as part of the transmitter 252 and/or a part of the receiver 254. Although not illustrated, in some implementations, the processor 260 may implement the scheduler 253 and the memory 258 may be implemented as part of the processor 260.

The processor 260, the scheduler 253, the processing components of the transmitter 252, and the processing components of the receiver 254 may each be implemented by the same or different processors that are configured to execute instructions stored in a memory, such as in the memory 258.

The apparatus 320 and/or the apparatus 310 may include other components, not shown or described herein for the sake of clarity.

Note that the term "signaling", as used herein, may alternatively be referred to as control signaling, control message, control information, or message for simplicity. Signaling between a base station (such as the TRP 170*a*. 170*b*, 172) and a UE or sensing device (such as ED 110), or signaling between a different UE or sensing device (such as between ED 110*a* and ED 110*b*) may be carried in physical layer signaling (also called as dynamic signaling), which is transmitted in a physical layer control channel. For DL, the physical layer signaling may be known as downlink control information (DCI) which is transmitted in a physical downlink control channel (PDCCH). For UL, the physical layer signaling may be known as uplink control information (UCI) which is transmitted in a physical uplink control channel (PUCCH). For SL, signaling between different UEs or sensing devices (such as between ED 110*a* and ED 110*b*) may be known as SL control information (SCI) which is transmitted in a physical sidelink control channel (PSCCH). Signaling may be carried in a higher layer (such as higher than physical layer) signaling, which is transmitted in a physical layer data channel, such as in a physical downlink shared channel (PDSCH) for downlink signaling, in a physical uplink shared channel (PUSCH) for uplink signaling, and in a physical sidelink shared channel (PSSCH) for SL signaling. Higher layer signaling may also be called static signaling, or semi-static signaling. The higher layer signaling may include radio resource control (RRC) protocol signaling or media access control-control element (MAC-CE) signaling. Signaling may be included in a combination of physical layer signaling and higher layer signaling.

It should be noted that in the present disclosure, "information", when different from "message", may be carried within a single message, or may be carried in multiple separate messages.

Figure 4:
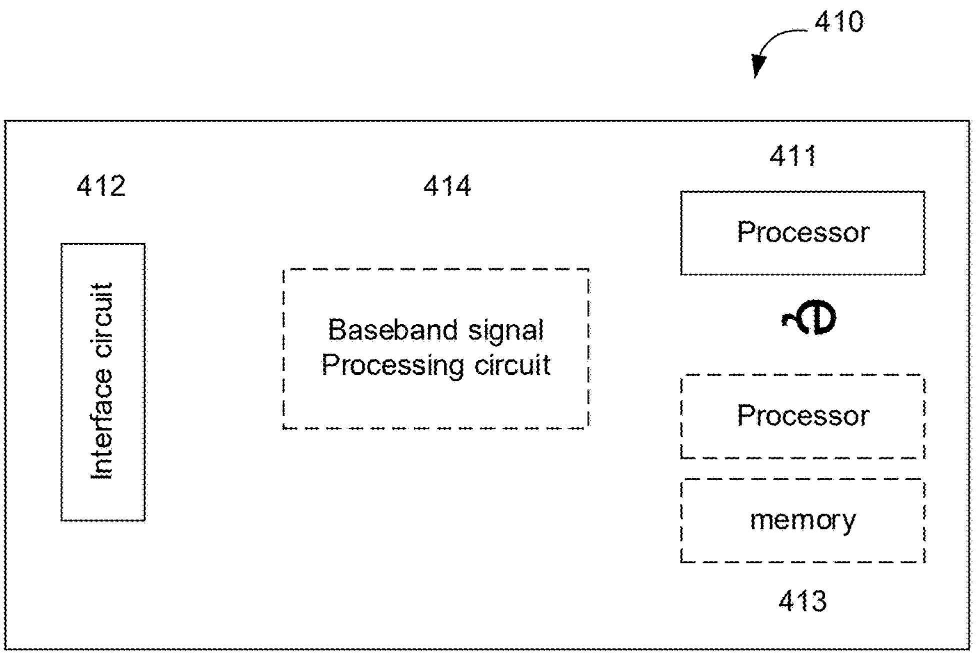
FIG. 4 illustrates an example apparatus according to an implementation of the present disclosure.

FIG. 4 illustrates an example apparatus 410 according to an implementation of the present disclosure. The apparatus 410 may be a communication device or an apparatus implemented in a communication device such as the ED 110 or the TRPs 170*a*, 170*b*, 172. For example, the apparatus 410 implemented in an ED may be an integrated circuit, which in some instances may be referred to as a chip, a modem, a modem chip, a baseband chip, or a baseband processor. In some implementations, one or more integrated circuits can be packaged into a system-on-chip, a system-in-package, or a multi-chip module. The apparatus 410 can include one or more integrated circuits and other discrete components. In some implementations, the apparatus 410 may be a module within the ED 110, or within the apparatus 310. In some implementations, the apparatus 410 may be a module within one of the TRPs 170*a*, 170*b*, 172, or the apparatus 320.

In one example, the apparatus 410 may include one or more processors 411, and an interface circuit 412. The apparatus 410 may further include a memory 413. The one or more processors 411 are configured to process signals and execute one or more communication protocols. The memory 413 is configured to store at least a part of corresponding computer program instructions and/or data. In an example, the one or more processors 411 execute the computer program instructions stored in the memory 413 to implement related operations (for example, inputting, outputting, receiving, and transmitting) in the method embodiments disclosed herein. In some implementations, the memory 413 being configured to store the corresponding computer program instructions and/or data may mean that the memory 413 is configured to store all of the corresponding computer program instructions and/or data for execution by the one or more processors 411. In some implementations, the memory 413 being configured to store the corresponding computer program instructions and/or data may mean that the memory 413 is configured to store 413 may include receiving the signal from another component or device. The signal may include outputting the signal to a component or device that is directly or indirectly coupled to the interface circuit 412. Receiving the signal may include inputting or obtaining the signal from a component or device that is directly or indirectly coupled to the interface circuit 412. Optionally, to reduce a load of the one or more processors, a baseband signal processing circuit 414 may be also disposed to implement processing of at least a part of baseband signals, including signal demodulation, modulation, encoding, decoding, or the like.

The apparatus 410 may be the processor 210 (or 260) within the apparatus 310 (or 320), in some scenarios, or may be included within the processor 210 (or 260) within the apparatus 310 (or 320) in some scenarios. The apparatus 410 may be a baseband chip or may include a baseband chip. In some implementations, the apparatus 410 may be independently packaged into a chip. In some implementations, the apparatus 310 (or 320) includes different types of chips. The apparatus 410 may be packaged into a processor chip (for example, an SoC chip or an SIP chip) with the different types of chips. In some implementations, the apparatus 410 may be packaged into a chip with some or all of circuits of a radio frequency processing system that may further be included in the apparatus 310 (or 320).

Figure 5:
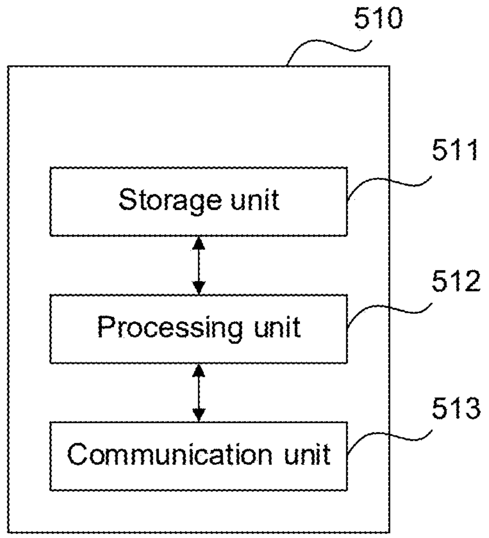
FIG. 5 illustrates example apparatus according to an implementation of the present disclosure.

FIG. 5 illustrates an example apparatus 510 according to an implementation of the present disclosure. The apparatus 510 may include corresponding modules or units configured to implement methods and/or implementations described herein. In some implementations, the apparatus 510 includes a processing unit 512 and a communication unit 513. Optionally, the apparatus 510 may further include a storage unit 511 configured to store apparatus program code (or instructions) and/or data.

The apparatus 510 may be an ED side apparatus, for example, an ED or a module in an ED, or a circuit or a chip responsible for a communication function in an ED. In some implementations, apparatus 510 may be the apparatus 310. The processing unit 512 may be the processor 210. The communication unit 513 may comprise a receiving unit and/or a transmitting unit. The receiving unit and/or the transmitting unit may be the transmitter 201 and/or the receiver 203 respectively. The storage unit 511 may be the memory 208.

The apparatus 510 may be a base station side apparatus, for example, a base station or a module in a base station, or a circuit or a chip responsible for a communication function in a base station. In some implementations, apparatus 510 may be apparatus 320. The processing unit 512 may be the processor 260 (the scheduler 253 may also be included). The communication unit 513 may comprise a receiving unit and/or a transmitting unit. The receiving unit and/or the transmitting unit may be the transmitter 252 and/or the receiver 254 respectively. The storage unit 511 may be the memory 258.

In some implementations, when the apparatus 510 is an ED 110 or a module in an ED 110, a function of the apparatus 510 may be implemented by one or more processors. Specifically, the processor may include a modem chip, or a system on chip (SoC) chip or an SIP chip that includes a modem core. A function of the communication unit 513 may be implemented by a transceiver circuit.

In some implementations, when the apparatus 510 is a circuit or a chip that is responsible for a communication function in an ED 110, such as a modem chip, a system on chip (SoC) chip or an SIP chip that includes a modem core-a function of the processing unit 512 may be implemented by a circuit system within the chip which includes one or more processors. A function of the communication unit 513 may be implemented by an interface circuit or a data transceiver circuit on the chip.

It may be understood that the units in the apparatus 510 may be logical or functional. Each function may correspond to one functional unit, or two or more functions may be integrated into a single functional unit. In actual implementation, all or some of the units may be integrated into a single physical entity, or may be distributed across different physical entities. In addition, the functional units may be implemented in the form of hardware, software, or a combination of hardware and software. Whether a function is implemented in the form of hardware or software depends on particular applications and design constraints conditions of the technical solutions. A person skilled in the art may use different methods to implement the described functions for specific applications, but it should not be considered that the implementation goes beyond the scope of this disclosure.

In an example, a functional unit in any one of the apparatuses may be configured as one or more integrated circuits for implementing the methods disclosed herein, for example, as one or more application-specific integrated circuits (application-specific integrated circuits, ASICs), one or more central processing units (CPUs), one or more microprocessors or microprocessor units (MPUs), one or more microcontrollers or microcontroller units (MCUs), one or more digital signal processors (DSPs), one or more field programmable gate arrays (FPGAs), or a combination of these.

In one example, the storage unit 511 may include a random access memory, a flash memory, a read-only memory, a programmable read-only memory, an electrically erasable programmable memory, and/or a register.

A processor may be referred to as a processor system, an application processor, a baseband processor, a processor circuit, or a processor core. The processor may include one or a combination of one or more central processing units (CPUs), one or more digital signal processors (DSPs), one or more microprocessors (microprocessor units, MPUs), one or more microcontrollers (microcontroller units, MCUs), one or more graphics processing units (GPUs), one or more field programmable gate arrays (FPGAs), one or more artificial intelligence processors (AI processors), or one or more neural network processing units (NPUs).

Memory or a storage unit may include one or more of the following storage media: a random access memory (RAM), a static random access memory (static RAM, SRAM), a dynamic random access memory (dynamic RAM, DRAM), a phase-change memory (PCM), a resistive random access memory (resistive RAM, ReRAM), a magnetoresistive random access memory (magnetoresistive RAM, MRAM), a ferroelectric random access memory (ferroelectric RAM, FRAM), a cache, a register, a read-only memory (ROM), a flash memory (flash memory), an erasable programmable read-only memory (erasable programmable ROM, EPROM), a hard disk, and the like. In an example, computer program instructions used to execute embodiments may be stored in a non-volatile memory, for example, at least a part of a memory or storage unit (for example, one or more of a ROM, a flash memory, an EPROM, or a hard disk). When a terminal runs, a part or all of the corresponding computer program instructions may be loaded to a memory that has a higher transmission speed with the processor, for example, at least a part of a memory or a storage unit (for example, one or more of a RAM, an SRAM, a DRAM, a PCM, a RERAM, an MRAM, a FRAM, a cache, or a register), so that the processor executes the computer program instructions to perform the steps in the method embodiments disclosed herein.

Figure 6:
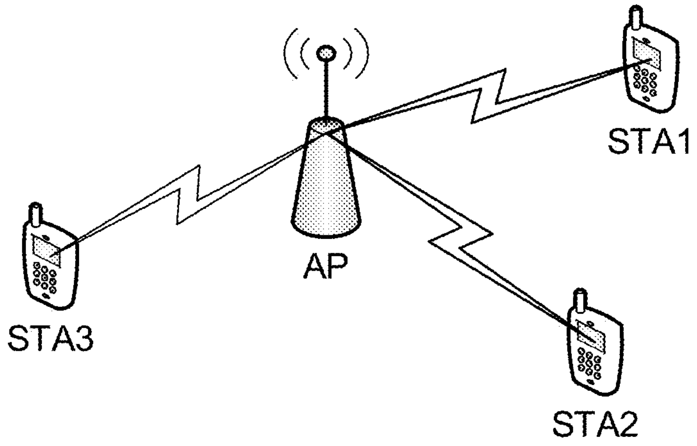
FIG. 6 is a schematic diagram of a WLAN system applicable to the method of embodiments of the present disclosure.

To facilitate understanding of the embodiments of the present disclosure, a communication system applicable to the embodiments of the present disclosure is first described by taking the WLAN system shown in FIG. 6 as an example. The WLAN system in FIG. 6 may include one or more APs and one or more STAs. FIG. 6 takes one AP and three STAs as an example. APs and STAs may communicate wirelessly using various standards. For example, the APs and the STAs may use single-user multiple-input multiple-output (SU-MIMO) technology or multi-users multiple-input multiple-output (MU-MIMO) technology for wireless communication.

Moreover, AP is also called wireless access point or hotspot. AP are the access points for mobile users to enter the wired networks. APs may mainly deployed in homes, buildings, and campuses, and may also be deployed outdoors. The AP is equivalent to a bridge connecting wired network and wireless network. Its main function is to connect various wireless network clients together and then connect the wireless network to Ethernet. For example, the AP may be a terminal device or a network device with a Wi-Fi chip. Optionally, the AP may be a device that supports multiple WLAN standards such as 802.11.

Some wireless communication systems such as IEEE 802.11be (WI-FI® 7) systems use OFDMA for multiple access. Generally, OFDMA uses orthogonal frequency division multiplexing (OFDM) for multiple users to transmit data at the same time.

For example, in an IEEE 802.11be system, a device such as an AP or a STA transmits data using physical layer protocol data units (PPDUs). A PPDU contains a preamble and a data field contained in an OFDM symbol. As those skilled in the art understand, an OFDM symbol carries data with a plurality of subcarriers (also called "tones") and uses the so-called cyclic prefix for combating inter-symbol interferences. The number of tones in an OFDM symbol depends on the PPDU bandwidth (BW) thereof. In IEEE 802.11be, the subcarrier spacing is 78.125 kilohertz (kHz), and the PPDU BW may be 20 MHz, 40 MHz, 80 MHZ, 160 MHz, and 320 MHz. Correspondingly, the number of OFDM tones (that is, the tones in an OFDM symbol; also the denoted "OFDMA tones" hereinafter when OFDMA is used) may be 256, 512, or 1024, 2048, and 4096, respectively. Some of these tones are not used for data and pilot tone transmission, which include direct-current (DC) tones (also called direct-conversion tones, which include the tone whose frequency is equal to the RF carrier frequency, and some neighboring tones thereof), guard tones, and null tones. Therefore, the usable tones are generally a subset of the total OFDM tones.

When OFDMA is used, the usable OFDMA tones or subcarriers are partitioned into a plurality of resource units (RUs) for assigning to a plurality of users for data and pilot transmission. In an OFDMA transmission, each RU in a PPDU is assigned to a specific STA so that multiple STAs data can be multiplexed within a single PPDU.

Consecutive-tone RUs (denoted "regular RUs" or "RRUs" hereinafter) are used, wherein each RU consists of a plurality of consecutive tones. The smallest number of tones of a RU is 26 tones which forms the base RU size and the larger sizes of RUs are constructed based on the 26-tone RUs.

Figure 7:
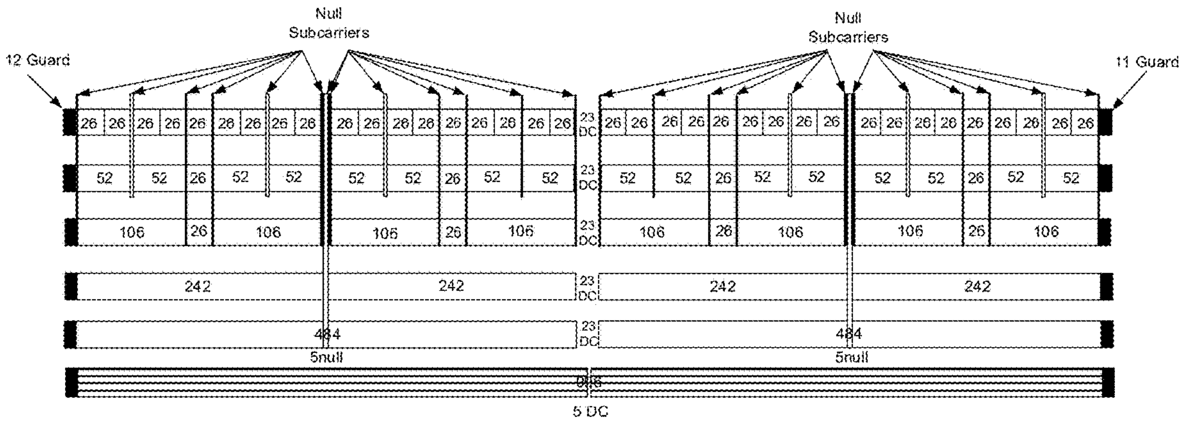
FIG. 7 shows RU locations an 80 MHz EHT PPDU.

For example, FIG. 7 shows the RU locations in an 80 MHz EHT PPDU (see subclause 36.3.2.1, IEEE P802.11be/D5.0). Some left-band subcarriers and the right-band subcarriers are located on both edges within a PPDU bandwidth to serve as guard subcarriers in order to reduce the potential impact of cross-channel interference. The DC subcarriers are located at the RF carrier frequency and around area in the center of the PPDU band. A null subcarrier is a subcarrier which does not carry any information. There is no signal to be transmitted at DC, null and guard subcarriers. The number of large RU subcarriers is the same as the combination of the number of small RUs that can be accommodated therein and the number of leftover subcarriers between small RUs.

In an OFDMA system in IEEE 802.11be, multi-user data packets are composed of RUs of various sizes. The AP allocates one RU to each user. The optional RUs that may be allocated to the user are as follows:

(1) RU consisting of 26 consecutive subcarriers, including 24 data subcarriers and 2 pilot subcarriers;

(2) RU consisting of 52 consecutive subcarriers, including 48 data subcarriers and 4 pilot subcarriers;

(3) RU consisting of 106 consecutive subcarriers, including 102 data subcarriers and 4 pilot subcarriers;

(4) RU consisting of 242 consecutive subcarriers, including: 234 data subcarriers and 8 pilot subcarriers;

(5) RU consisting of 484 consecutive subcarriers, including: 468 data subcarriers and 16 pilot subcarriers; and (6) RU consisting of 996 consecutive subcarriers, including 980 data subcarriers and 16 pilot subcarriers.

Here, 484-RU is used in multi-user transmission at 40 MHz, while 996-RU is used in multi-user transmission at 80 MHz or 160 MHz. It should be understood that the 160 MHz tone plan may be considered as consisting of two 80 MHz tone plans. The 240 MHz tone plan may be considered as consisting of three 80 MHz tone plans. The 320 MHz tone plan may be seen as consisting of four 80 MHz tone plans, which will not be repeated here.

In the 6 GHz low power indoor (LPI) bands, regulatory bodies such as Federal Communications Commission (FCC) apply stringent rules on the limit of maximum Equivalent isotropic radiated power (EIRP) power spectral density (PSD), for example, −1 decibel-milliwatts per megahertz (dBm/MHz) for non-AP STA. This limits the transmission range and/or reduces transmission rates.

IEEE 802.11bn (Ultra-high reliability (UHR)) standardization is currently under development for a next generation of WLANs. One of the most important goals for UHR is to improve the reliability. FCC allocates about the 1.2 GHz unlicensed spectrum for low power indoor applications at the 6 GHz band. FCC regulates the maximum conducted output power spectrum density (PSD) as: 5 dBm/MHz for an AP; −1 dBm/MHz for a STA. These FCC regulation rules significantly limit the transmit power of a Wi-Fi AP/STA operating in the 6 GHz LPI band compared to those operations in other unlicensed bands. This may result in much shorter communication links and/or lower reliability.

Distributed resource units (DRU) (see IEEE 802.11-23-0037r0) may also be used to distribute tones of a user in an OFDMA system across a wide portion of spectrum within the PPDU bandwidth. In other words, the concept of DRU is to distribute the contiguously allocated data/pilot tones in a regular resource unit (RRU) (currently specified in 802.11) over a broader spectrum shared with other RUs. Therefore, a separation of data/pilot tones in DRU is required to be a multiple of subcarrier spacing specified in 802.11ax/be and the transmit power of each distributed tone in a DRU can be boosted under the regulation on the output PSD. More specifically, by using DRU, the number of tones of one user within one (1) MHz is reduced and the transmit power can be boosted, which may increase the transmit distance and/or improve the reliability for the STAs operating in the LPI bands.

FIG. 8 illustrates the RRUs ((A) of FIG. 8) and the DRUs ((B) of FIG. 8) in the BW of a PPDU. The transmit power p2 of each tone in DRUs may be allowed to be greater than the transmit power p1 of each tone in RRUs because of the tone distribution.

FIG. 9 shows RU locations in a 20 MHz High Efficiency/Enhanced High Throughput (HE/EHT) PPDU, that is, the EHT data, pilot and null subcarrier indices in a 20 MHz PPDU.

Figures 10, 11:
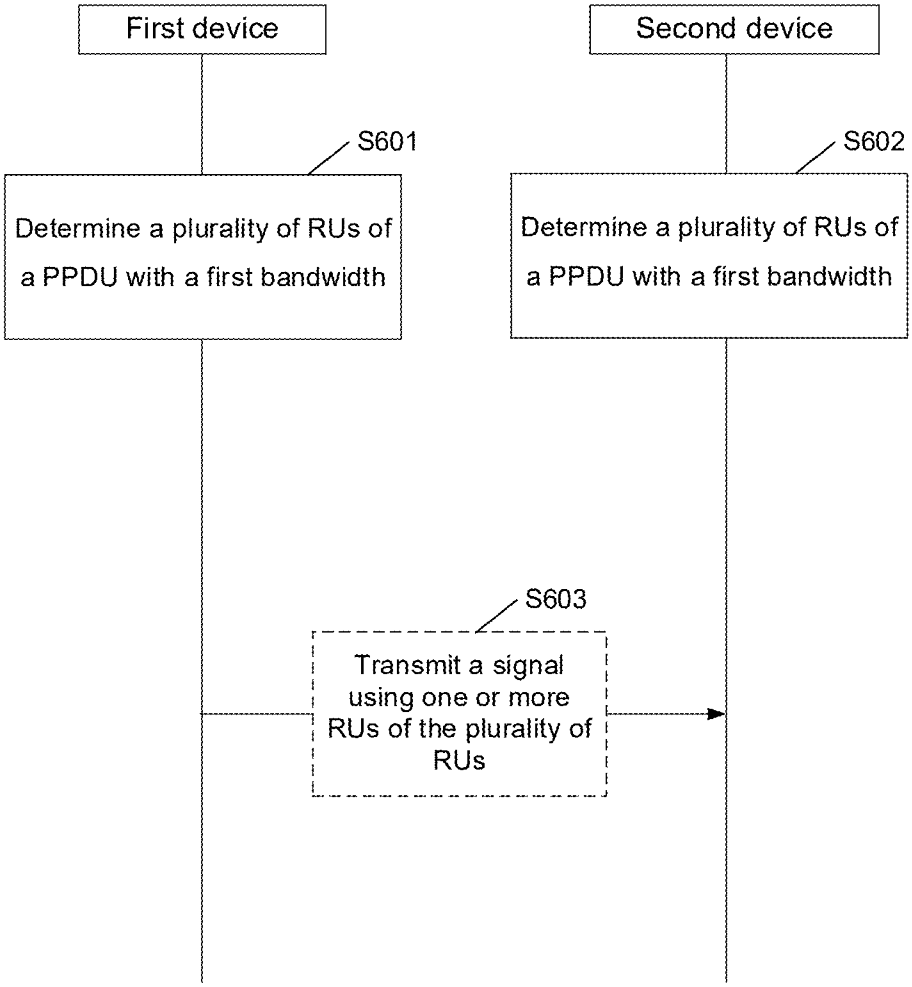
FIG. 10 is a schematic diagram showing RU locations in an 80 MHz PPDU.
FIG. 11 is a flow diagram of a communication method according to embodiments of the present disclosure.

FIG. 10 shows RU locations in an 80 MHz EHT PPDU, that is, the 242-tone indices in 80 MHz PPDU in EHT.

Referring to FIG. 11, FIG. 11 shows a flowchart of a communication method provided in the embodiments. The method can be applied to the application scenario shown in FIG. 6. If the AP serves as a signal sending end and the STA serves as a signal receiving end, the AP is equivalent to the first device described below, and the STA is equivalent to the second device described below. If the STA serves as a signal sending end and the AP serves as a signal receiving end, the STA is equivalent to the first device described below, and the AP is equivalent to the second device described below. The embodiments of the present disclosure are not limited thereto. As shown in FIG. 11, the method includes the following steps S601 to S603.

In S601, the first device determines a plurality of RUs in a PPDU with a first bandwidth. Locations of the plurality of RUs are determined based on a first-level tone distribution and a second-level tone distribution. The first-level tone distribution is used to indicate a mapping relationship between indices of 26-tone subcarriers, 52-tone subcarriers and 106-tone subcarriers and indices of 242-tone subcarriers in each 20 MHz subchannel. The second-level tone distribution is used to indicate a distribution of indices of 242-tone subcarriers in the PPDU with the first bandwidth, the first bandwidth is a multiple of 20 MHZ, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarrier allocated between any consecutive 242-tone RUs.

The null subcarriers in a 20 MHz subchannel may be evenly allocated around consecutive RUs on both sides of the subchannel, or may be allocated according to preset allocation conditions, which will not be limited herein.

In S602, the second device determines the plurality of RUs of the PPDU of the first bandwidth.

In S603, the first device transmits a signal to the second device using one or more RUs of the plurality of RUs. Correspondingly, the second device receives the signal using the one or more RUs.

The first-level tone distribution and the second-level tone distribution are used to determine the locations of the RUs, and all null subcarriers in the 20 MHz subchannel are allocated around consecutive RUs on both sides of the subchannel, thereby increasing the tone power corresponding to each RU and further improving the gain during the communication process.

Figure 12:
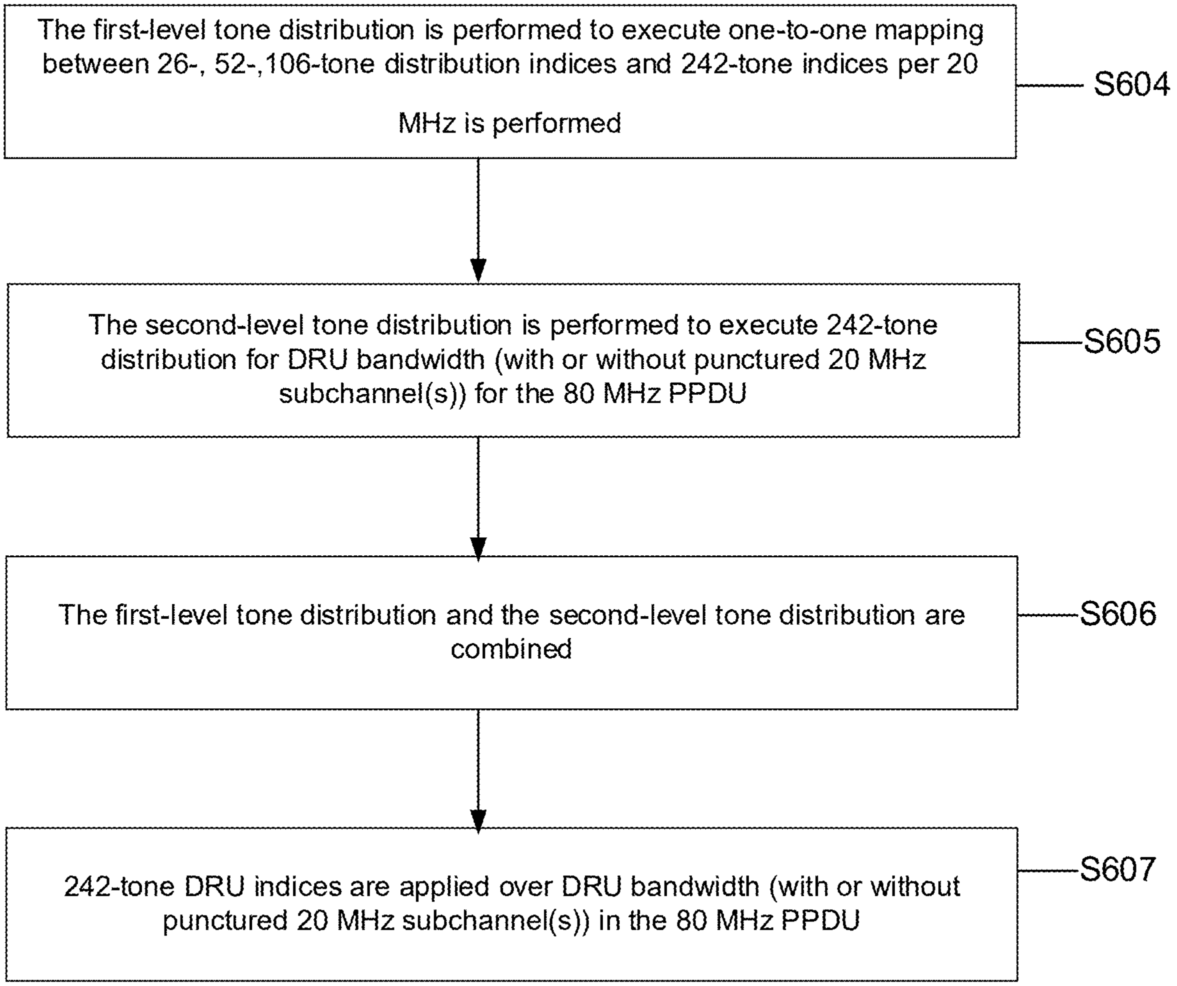
FIG. 12 is a flow diagram of a process of determining locations of a plurality of RUs according to embodiments of the present disclosure.

FIG. 12 shows a flowchart of determining locations of a plurality of RUs based on a first-level tone distribution and a second-level tone distribution provided in the embodiments of the present disclosure. The method may be executed by the first device or the second device. As shown in FIG. 12, the process of determining the locations of the plurality of RUs based on the first-level tone distribution and the second-level tone distribution includes the following steps.

In S604, the first-level tone distribution is performed to execute one-to-one mapping between 26-, 52-, 106-tone distribution indices and 242-tone indices per 20 MHz.

In S605, the second-level tone distribution is performed to execute 242-tone distribution for DRU bandwidth (with or without unavailable 20 MHz subchannel(s) (i.e., being unavailable for tone distribution across 20 MHz subchannels)) for the 80 MHz PPDU.

In S606, the first-level tone distribution and the second-level tone distribution are combined.

In S607, 242-tone DRU indices are applied over DRU bandwidth (with or without unavailable 20 MHz subchannel (s)) in the 80 MHz PPDU.

The S601 can be implemented by executing S604 to S607.

In the embodiments of the present disclosure, 26-, 52-, 106- and 242-tone DRUs over DRU bandwidth will be obtained.

Furthermore, applying 242-tone DRU indices over DRU BW in the 80 MHz PPDU with or without unavailable 20 MHz subchannel(s) results in 26-, 52-, 106- and 242-tone DRU tone indices in the 80 MHz PPDU.

In a possible implementation, the first bandwidth is a bandwidth available to all RUs. For example, when there is no unavailable 20 MHz subchannel within the PPDU bandwidth, all RUs can use it. For example, the first bandwidth is 80 MHz.

Figure 13:
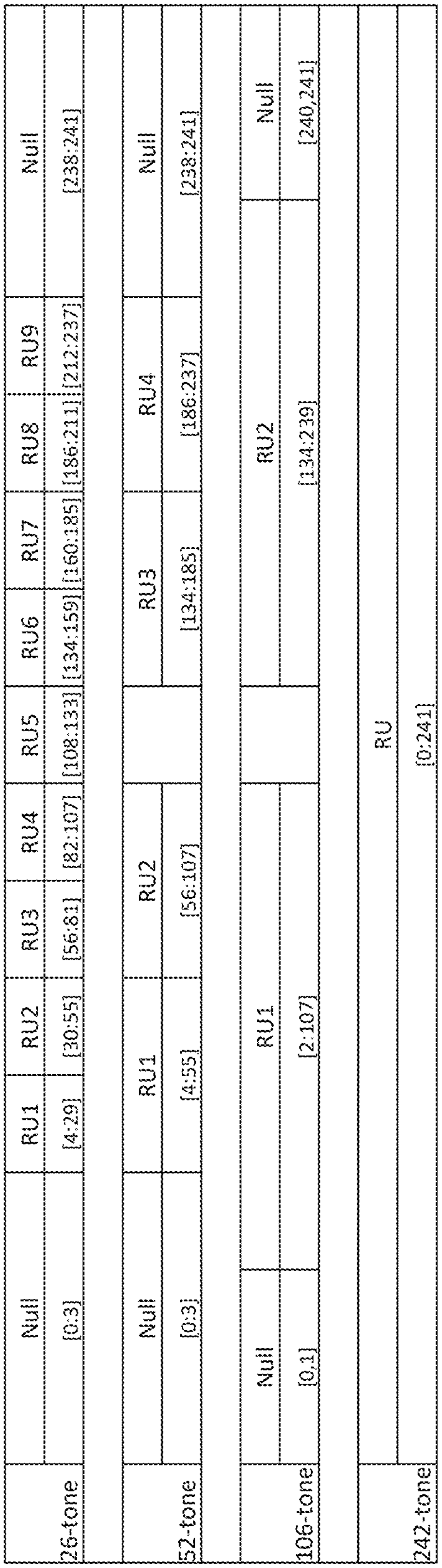
FIG. 13 is a schematic diagram of indices of RRUs according to embodiments of the present disclosure.

FIG. 13 is a schematic diagram of indices of RRUs according to embodiments of the present disclosure. As shown in FIG. 13, in the 20 MHz subchannel, null subcarriers are evenly allocated on both sides of the subchannel. For 26-tone, the indices of the null subcarriers on the left side are [0:3]; the RUs includes: RU1, RU2, RU3, RU4, RU5, RU6, RU7, RU8 and RU9; the indices of RU1 are [4:29], the indices of RU2 are [30:55], the indices of RU3 are [56:81], the indices of RU4 are [82:107], the indices of RU5 are [108:133], the indices of RU6 are [134:159], the indices of RU7 are [160:185], the indices of RU8 are [186:211], the indices of RU9 are [212:237], and the indices of the null subcarriers on the right side are [238:241]. For 52-tone, the corresponding indices of RU1, RU2, RU3 and RU4 are a combination of the corresponding indices of 26-tone. For example, the indices of the null subcarriers on the left side are [0:3], the indices of 52-tone RU1 are [4:55], the indices of 52-tone RU2 are [56:107], the indices of 52-tone RU3 are [134:185], the indices of 52-tone RU4 are [186:237], and the indices of the null subcarriers on the right side are [238:241]. For 106-tone, the corresponding indices of RU1 and RU2 are a combination of the corresponding indices of 52-tone and some additional tones, which are used as null tones when 52-tone RUs are considered. For example, the indices of the null subcarriers on the left side are [0:1], the indices of 106-tone RU1 are [2:107], the indices of 106-tone RU2 are [134:239], and the indices of the null subcarriers on the right side are [240:241]. For 242-tone, the indices of RUs are [0:241]. It should be noted that the corresponding indices of 26-tone RU5 are [108:133], which can be multiplexed with a 52-tone RU or a 106-tone RU.

FIG. 14 is a schematic diagram of indices of RRUs according to embodiments of the present disclosure. As shown in FIG. 14, the 242 tone subcarriers of the PPDU of the first bandwidth include RU1, RU2, RU3 and RU4. In the PPDU, the null subcarriers are evenly allocated on both sides of the PPDU. The indices of the null subcarriers on the left side are [−500:−496], the RU1, the RU2, the RU3 and the RU4 are each 242-tone subcarriers in the PPDU, the indices of the RU1 before mapping are [0:241], the indices of the RU1 after mapping are [−495:−254], the indices of the RU2 before mapping are [242:483], the indices of the RU2 after mapping are [−253:−12], the indices of the RU3 before mapping are [484:725], the indices of the RU3 after mapping are [12:253], the indices of the RU4 before mapping are [726:967], the indices of the RU4 after mapping are [254:495], and the indices of the null subcarriers on the right side are [496:500].

The embodiments of the present application may be applied to an RRU tone plan or a DRU tone plan. In some embodiments, the communication system uses OFDMA (denoted an "OFDMA system") for multiple access, and uses a DRU tone plan with a substantially uniform (or nearly uniform) tone separation for maintaining the same performance across different users.

In these embodiments, the tones of a DRU for a STA (including data tones and pilot tones) are substantially uniformly (or nearly uniformly, or as uniformly as possible) distributed over the BW of the DRU, so as to maximize the per tone transmit power based on the regulatory bodies' PSD limitation rules. Here, the BW of a DRU refers to the BW from the lowest-frequency tone of the DRU to the highest-frequency tone thereof. Note that, with this definition, each DRU shares its BW with one or more other DRUs.

Various methods for designing such a substantially uniform DRU tone distribution are available. Preferably, the design method is flexible for different DRU sizes (in terms of the total number of tones of each DRU) and different PPDU BWs. Practical implementation and simple signaling for tone distribution are also desirable. Moreover, it is preferable that the DRUs has the same set of RU sizes as corresponding RRUs.

In the embodiments of the present disclosure, the plurality of RUs are DRUs, and the indices of subcarriers corresponding to the plurality of RUs are determined based on the number of the plurality of RUs.

FIG. 15 is a schematic diagram showing indices of DRUs in a first-level tone distribution provided in some embodiments of the present disclosure. As shown in FIG. 15, a universal one-to-one mapping between 26-, 52-, 106-tone distribution indices and any 242-tone indices per 20 MHz, which is independent of where a 242-tone RU is located in a PPDU. For each 20 MHz, the null subcarriers are evenly allocated on both sides of the subchannel. For 26-tone, the indices of the null subcarriers on the left side are [0:3], and the DRUs include: DRU1, DRU2, DRU3, DRU4, DRU5, DRU6, DRU7, DRU8 and DRU9. The indices of the DRU1 are [4:9:229], the indices of the DRU2 are [9:9:234], the indices of the DRU3 are [6:9:231], the indices of the DRU4 are [11:9:236], the indices of the DRU5 are [8:9:233], the indices of the DRU6 are [5:9:230], the indices of the DRU7 are [10:9:235], the indices of the DRU8 are [7:9:232], the indices of the DRU9 are [12:9:237], and the indices of the null subcarriers on the right side are [238:241]. For 52-tone, indices corresponding to the DRU1, DRU2, DRU3 and DRU4 are a combination of indices corresponding to 26-tone. For example, the indices of the null subcarriers on the left side are [0:3], the indices of the 52-tone DRU1 are 26-tone [DRU1, DRU2], the indices of the 52-tone DRU2 are 26-tone [DRU3, DRU4], the indices of the 52-tone DRU3 are 26-tone [DRU6, DRU7], the indices of the 52-tone DRU4 are 26-tone [DRU8, DRU9], and the indices of the null subcarriers on the right side is [238:241]. For 106-tone, indices corresponding to DRU1 and DRU2 are a combination of indices corresponding to 52-tone. For example, the indices of the null subcarriers on the left side are [0:1], the indices of the 106-tone DRU1 are [2, 52-tone DRU1, 52-tone DRU2, 238], the indices of the 106-tone DRU2 are [3, 52-tone DRU3, 52-tone DRU4, 239], and the indices of the null subcarriers on the right side are [240:241]. For 242-tone, the indices of RUs are [0:120, 121:241]. It should be noted that the indices corresponding to 26-tone DRU5 in 52-tone and 106-tone are not shown in the figure, and the corresponding indices in 52-tone and 106-tone are [8:9:233].

FIG. 16 is a schematic diagram showing indices of rearranged DRUs in a first-level tone distribution provided in some other embodiments of the present disclosure. As shown in FIG. 16, the indices of each 26-tone DRU are divided into 2 subsets, each including 13 indices, which are correspondent to the sets of negative and positive indices of a 242-tone DRU in 80 MHz PPDU, respectively. For each 20 MHz subchannel, the null subcarriers are evenly distributed on both sides of the subchannel. For 26-tone, the indices of the null subcarriers on the left side are [0:3], and the DRUs include: DRU1, DRU2, DRU3, DRU4, DRU5, DRU6, DRU7, DRU8 and DRU9. The DRU1, DRU2, DRU3, DRU4, DRU5, DRU6, DRU7, DRU8 and DRU9 are each divided into 2 subsets, each of the 2 subsets includes 13 indices, that is, 13+13 tones shown in the figure. The indices of the DRU1 are [4:9:112, 121:9:229], the indices of the DRU2 are [9:9:117, 126:9:234], and the indices of the DRU3 are [6:9:114, 123:9:231], the indices of the DRU4 are [11:9:119, 128:9:236], the indices of the DRU5 are [8:9:116, 125:9:233], the indices of the DRU6 are [5:9:113, 122:9: 230], the indices of the DRU7 are [10:9:118, 127:9:235], and the indices of DRU8 are [7:9:115, 124:9:232], the indices of DRU9 are [12:9:120, 129:9:237], the indices of the null subcarriers on the right side are [238:241]. For 52-tone, indices corresponding to the DRU1, DRU2, DRU3 and DRU4 are a combination of indices corresponding to 26-tone. For example, the indices of the null subcarriers on the left side are [0:3], the indices of the 52-tone DRU1 are 26-tone [DRU1, DRU2], the indices of the 52-tone DRU2 are 26-tone [DRU3, DRU4], the indices of the 52-tone DRU3 are 26-tone [DRU6, DRU7], the indices of the 52-tone DRU4 are 26-tone [DRU8, DRU9], and the indices of the null subcarriers on the right side are [238:241]. For 106-tone, indices corresponding to the DRU1 and DRU2 are a combination indices corresponding to 52-tone. For example, the indices of the null subcarriers on the left side are [0:1], the indices of the 106-tone DRU1 are [2, 52-tone DRU1, 52-tone DRU2,238], the indices of the 106-tone DRU2 are [3, 52-tone DRU3, 52-tone DRU4,239], and the indices of the null subcarriers on the right side are [240:241]. For 242-tone, the indices of RUs are [0:120,121:241]. It should be noted that the indices corresponding to the DRU5 in 52-tone and 106-tone are not shown in the figure, and the corresponding indices in 52-tone and 106-tone are [8:9:233].

FIG. 17 is a schematic diagram showing indices of rearranged DRUs in a first-level tone distribution provided in still some other embodiments of the present disclosure. As shown in FIG. 17, the indices of each 26-tone DRU are divided into 3 subsets, each including 8 or 9 indices, which are correspondent to the sets of [4:81], [82:159] and [160: 237] of a 242-tone DRU for an 80 MHz PPDU, respectively.

For each 20 MHz subchannel, the null subcarriers are evenly allocated on both sides of the subchannel. For 26-tone, the indices of the null subcarriers on the left side are [0:3], and the DRUs include: DRU1, DRU2, DRU3, DRU4, DRU5, DRU6, DRU7, DRU8 and DRU9. The DRU1, DRU2, DRU3, DRU4, DRU5, DRU6, DRU7, DRU8 and DRU9 are each divided into 3 subsets. The DRU1 includes 9+9+8 tones, the DRU2 includes 9+8+9 tones, the DRU3 includes 9+9+8 tones, the DRU4 includes 8+9+9 tones, the DRU5 includes 9+8+9 tones, the DRU6 includes 9+9+8 tones, the DRU7 includes 8+9+9 tones, the DRU8 includes 9+8+9 tones, and the DRU9 includes 8+9+9 tones. The indices of the DRU1 are [4:9:76, 85:9:157, 166:9:229], the indices of the DRU2 are [9:9:81, 90:9:153, 162:9:234], the indices of the DRU3 are [6:9:78, 87:9:159, 168:9:231], the indices of the DRU4 are [11:9:74, 83:9:155, 164:9:236], the indices of the DRU5 are [8:9:80, 89:9:152, 161:9:233], the indices of the DRU6 are [5:9:77, 86:9:158, 167:9:230], and the indices of the DRU7 are [5:9:77, 86:9:158, 167:9:230], the indices of the DRU8 are [5:9:77, 86:9:158, 167:9:230], the indices of the DRU9 are [12:9:75, 84:9:156, 165:9:237], and the indices of the null subcarriers on the right side are [238:241]. For 52-tone, the indices corresponding to the DRU1, DRU2, DRU3 and DRU4 are a combination of indices corresponding to 26-tone. For example, the indices of the null subcarriers on the left side are [0:3], the indices of the 52-tone DRU1 are 26-tone [DRU1, DRU2], the indices of the 52-tone DRU2 are 26-tone [DRU3, DRU4], the indices of the DRU3 are 26-tone [DRU6, DRU7], the indices of the DRU4 are 26-tone [DRU8, DRU9], and the indices of the null subcarriers on the right side are [238:241]. For 106-tone, the corresponding indices of DRU1 and DRU2 are a combination of the corresponding indices of 52-tone. For example, the indices of the null subcarriers on the left side are [0:1], the indices of the 106-tone DRU1 are [2, 52-tone DRU1, 52-tone DRU2,238], the indices of the 106-tone DRU2 are [3, 52-tone DRU3, 52-tone DRU4, 239], and the indices of the null subcarriers on the right side are [240:241]. For 242-tone, the indices of RUs are [0:81, 82:159, 160:241]. It should be noted that the corresponding indices of the DRU5 in 52-tone and 106-tone are not shown in the figure, and the corresponding indices in 52-tone and 106-tone are [8:9:233].

FIG. 18 is a schematic diagram showing indices of DRUs in a second-level tone distribution provided in some embodiments of the present disclosure. As shown in FIG. 18, the 242 tone subcarriers in the PPDU with the first bandwidth include DRU1, DRU2, DRU3 and DRU4, which are adjacent in sequence. The [DRU1], [DRU2], [DRU3] and [DRU4] each includes 242-tone subcarriers in an 80 MHz PPDU. The indices of the DRU1 are indicated by [DRU1], the indices of the DRU2 are indicated by [DRU1]+2, the indices of the DRU3 are indicated by [DRU1]+1, and the indices of the DRU4 are indicated by [DRU1]+3; the indices of [DRU1] are [0:4:480, 484:4:964], 4 is a tone separation, and +j indicates that the indices of the DRU1 are increased by j, j being a positive integer; the indices of the DRU2 are

[2:4:482, 486:4:966], the indices of DRU3 are [1:4:481, 485:4:965], and the indices of DRU4 are [3:4:483, 487:4:967].

FIG. 19 is a schematic diagram showing a combination of a first-level tone distribution and a second-level tone distribution of a DRU1 provided in some embodiments of the present disclosure. As shown in FIG. 19, the indices of each 26-tone DRU are divided into 2 subsets, each including 13 indices, which are correspondent to the sets of negative and positive indices of a 242-tone DRU in 80 MHz PPDU, respectively. The 26-, 52- and 106-tone DRU indices corresponding to other 242-tone DRUs rather than the 242-tone DRU1 after combining the first- and second-level tone distribution can be directly derived from the related 26-, 52- and 106-tone DRU indices corresponding to the 242-tone DRU1 by following the same tone shifts as the tone different between a 242-tone DRU j (j≠1) and DRU 1. The 26-tone DRU1_1, DRU2_1, DRU3_1, DRU4_1, DRU5_1, DRU6_1, DRU7_1, DRU8_1 and DRU9_1 are corresponding 242-tone DRU1. The indices of the DRU1_1 are indicated by [DRU1_1], the indices of the DRU1_2 are indicated by [DRU1_1]+20, the indices of the DRU3_1 are indicated by [DRU1_1]+8, the indices of the DRU4_1 are indicated by [DRU1_1]+28, the indices of the DRU5_1 are indicated by [DRU1_1]+16, the indices of the DRU6_1 are indicated by [DRU1_1]+4, the indices of the DRU7_1 are indicated by [DRU1_1]+24, the indices of the DRU8_1 are indicated by [DRU1_1]+12, and the indices of the DRU9_1 are indicated by [DRU1_1]+32. [DRU1_1] before mapping is [16:36:448, 484:36:916], and 36 is a tone separation.

For example, as shown in FIG. 19, the null subcarriers are evenly allocated on both sides of a 20 MHz subchannel. For 26-tone, the indices of the null subcarriers on the left side are [0:4:12]; the indices of the null subcarriers on the right side are [952:4:964]; the indices of the DRU1_1 are [16:36:448, 484:36:916], which is equivalent to 26-tone [DRU1_1]; the indices of the DRU2_1 are [36:36:468, 504:36:936], which is equivalent to 26-tone [DRU1_1]+20; the indices of the DRU3_1 are [24:36:456, 492:36:924], which is equivalent to 26-tone [DRU1_1]+8; the indices of the DRU4_1 are [44:36:476, 512:36:944], which is equivalent to 26-tone [DRU1_1]+28; the indices of the DRU5_1 are [32:36:464, 496:36:928], which is equivalent to 26-tone [DRU1_1]+16; the indices of the DRU6_1 are [20:36:452, 488:36:920], which is equivalent to 26-tone [DRU1_1]+4; the indices of the DRU7_1 are [40:36:472, 508:36:940], which is equivalent to 26-tone [DRU1_1]+24; the indices of the DRU8_1 are [28:36:460, 496:36:928], which is equivalent to 26-tone [DRU1_1]+12; and the indices of the DRU9_1 are [48:36:480, 516:36:948], which is equivalent to 26-tone [DRU1_1]+3.

As shown in FIG. 19, for 52-tone, the corresponding indices of the DRU1_1, DRU2_1, DRU3_1 and DRU4_1 are a combination of the corresponding indices of 26-tone DRUs. For example, the indices of the null subcarriers on the left side are [0:4:12], and the indices of the null subcarriers on the right side are [952:4:964]. The indices of the 52-tone DRU1_1 are 26-tone [DRU1_1, DRU2_1], the indices of the 52-tone DRU2_1 are 26-tone [DRU3_1, DRU4_1], the indices of the 52-tone DRU3_1 are 26-tone [DRU6_1, DRU7_1], and the indices of the 52-tone DRU4_1 are 26-tone [DRU8_1, DRU9_1]. For 106-tone, the corresponding indices of the DRU1 and DRU2 are a combination of the corresponding indices of 52-tone. For example, the indices of the null subcarriers on the left side are [0:4], the indices of the 106-tone DRU1 are [8, 52-tone DRU1, 52-tone DRU2,452], the indices of the 106-tone DRU2 are [12, 52-tone DRU3, 52-tone DRU4, 456], and the indices of the null subcarriers on the right side are [960,964]. For 242-tone, the indices of DRUs are [0:4:480, 484:4:964]. It should be noted that the corresponding indices of the DRU5_1 in 52-tone and 106-tone is not shown in the figure, and the corresponding indices in 52-tone and 106-tone are [32:36:464, 496:36:928], which is equivalent to 26-tone [DRU1_1]+16.

FIG. 20 is a schematic diagram of tone distribution of an available bandwidth. The 242-tone DRUs in the PPDU with the first bandwidth include DRU1, DRU2, DRU3 and DRU4, and the DRU1, the DRU2, the DRU3 and the DRU4 each includes 242 tone subcarriers in an 80 MHz PPDU. As shown in FIG. 20, the 242 tone subcarriers of the PPDU with the first bandwidth include DRU1, DRU2, DRU3 and DRU4; before mapping, the indices of [DRU1] are [0:4:480, 484:4:964], the indices of DRU2 are [2:4:482, 486:4:966], the indices of DRU3 are [1:4:481, 485:4:965], and the indices of DRU4 are [3:4:483, 487:4:967]; after mapping, the indices of DRU1 are indicated by [DRU1], the indices of DRU2 is right-shifted by 2 relative to the indices of [DRU1], the indices of DRU3 are right-shifted by 1 relative to the indices of [DRU1], and the indices of DRU4 are right-shifted by 3 relative to the indices of [DRU1]; [DRU1] after mapping is [−495:4:−15, 12:4:492], and 4 is a tone separation. For each 242-tone DRU, there are 121 negative tone indices and 121 positive tone indices and each of the corresponding 26-, 52- and 106-tone DRUs has negative and positive tone indices in an 80 MHz PPDU; '→j' denotes the index is right-shifted j positions in FIG. 20; index right-shifting is counted one when it is from [−12] to [12].

In the embodiments of the present disclosure, tone separation in any 26-tone DURs equals 36 (=9 (in first-level)×4 (in second-level) in an 80 MHz PPDU with DRU BW 80 MHz.

The least significant negative tone index of a 26-tone DRU corresponding to a 242-tone DRU in an 80 MHz PPDU may be obtained by adding the least significant tone index of a 26-tone DRU after combining the first- and second-level distribution with the least negative tone index of a 242-tone DRU in an 80 MHz PPDU.

For example, the least significant negative tone index of the first 26-tone DRU corresponding to the first 242-tone DRU equals: 16+(−495)=−479

Denote the least significant positive tone index of a 26-tone DRU corresponding to a 242-tone DRU in an 80 MHz PPDU to be Z; the least significant index in the second set of a 26-tone DRU and a 242-tone DRU after combining the first- and second-level distribution to be x and y, respectively; the least significant positive index in a 242-tone DRU to be K. Therefore, Z=(x−y)+K.

For example, the least significant positive tone index of the first 26-tone DRU corresponding to the first 242-tone DRU, Z, equals: Z=(484−484)+12=12.

The tone indices of the 26-tone DRUs rather than 26-tone DRU1 corresponding to a 242-tone DRU in an 80 MHz PPDU can be derived from the tone indices of 26-tone DRU1 with tone shifts by referring to the tone index differences after combining the first- and second-level tone distribution.

As shown in the combined first- and second-level tone distribution, tone indices of a 52-tone DRU can be obtained based on the combining of the corresponding 26-tone DRUs; tone indices of a 106-tone DRU corresponding the 242-tone DRU can be obtained based on the combining of the corresponding 52-tone DRUs.

26-, 52- and 106-tone DRU indices corresponding to other than the first 242-tone DRU in an 80 MHz PPDU can be derived from those corresponding to the first 242-tone DRU with tone index shifts.

In the embodiments of the present disclosure, FIG. 21 is a schematic diagram of 26-, 52- and 106-tone DRUs related to 242-tone DRU1 according to embodiments of the present disclosure. The 242-tone DRU1 relates: 26-tone DRU1_1, DRU2_1, DRU3_1, DRU4_1, DRU5_1, DRU6_1, DRU7_1, DRU8_1 and DRU9_1. The indices of the 26-tone DRU1_1 are indicated by 26-tone [DRU1_1], the indices of the 26-tone DRU1_2 are right-shifted by 20 relative to the indices of 26-tone [DRU1_1], the indices of the 26-tone DRU3_1 are right-shifted by 8 relative to the indices of 26-tone [DRU1_1], the indices of the 26-tone DRU4_1 are right-shifted by 28 relative to the indices of 26-tone [DRU1_1], the indices of the 26-tone DRU5_1 are right-shifted by 16 relative to the indices of 26-tone [DRU1_1], the indices of the 26-tone DRU6_1 are right-shifted by 4 relative to the indices of 26-tone [DRU1_1], the indices of the 26-tone DRU7_1 are right-shifted by 24 relative to the indices of 26-tone [DRU1_1], the indices of the 26-tone DRU8_1 are right-shifted by 12 relative to the indices of [DRU1_1], and the indices of the DRU9_1 are right-shifted by 32 relative to the indices of 26-tone [DRU1_1]. 26-tone [DRU1_1] is [−479:36:-47, 12:36:444], and 36 is a tone separation.

For example, as shown in FIG. 21, the null subcarriers are evenly allocated on both sides related to the 242-tone DRU1. For 26-tone, the indices of the null subcarrier on the left side are [−495:4:−483]; the indices of the null subcarrier on the right side are [480:4:492]; the indices of 26-tone DRU1_1 are [−479:36:-47, 12:36:444], which is equivalent to 26-tone [DRU1_1]; the indices of 26-tone DRU2_1 are [−459:36:−27, 32:36:464], which is equivalent to 26-tone [DRU1_1]→20; the indices of 26-tone DRU3_1 are [−471:36:−39, 20:36:452], which is equivalent to 26-tone [DRU1_1]→8; the indices of 26-tone DRU4_1 are [−451:36:−19, 40:36:472], which is equivalent to 26-tone [DRU1_1]→28; the indices of 26-tone DRU5_1 are [−451:36:−19, 40:36:472], which is equivalent to 26-tone [DRU1_1]→16; the indices of 26-tone DRU6_1 are [−475:36:−43, 16:36:448], which is equivalent to 26-tone [DRU1_1]→4; the indices of 26-tone DRU7_1 are [−455:36:−23, 36:36:468], which is equivalent to 26-tone [DRU1_1]→24; the indices of 26-tone DRU8_1 are [−467:36:−35, 24:36:456], which is equivalent to 26-tone [DRU1_1]→12; and the indices of 26-tone DRU9_1 are [−447:36:-15, 44:36:476], which is equivalent to 26-tone [DRU1_1]→32. Here, the notation "→" means right shift.

As shown in FIG. 21, for 52-tone DRUs, the corresponding indices of DRU1_1, DRU2_1, DRU3_1 and DRU4_1 are a combination of the corresponding indices of 26-tone DRUs. For example, the indices of the null subcarriers on the left side are [−495:4:−483], and the indices of the null subcarriers on the right side are [−495:4:−483]. The indices of 52-tone DRU1_1 are 26-tone [DRU1_1, DRU2_1], the indices of 52-tone DRU2_1 are 26-tone [DRU3_1, DRU4_1], the indices of 52-tone DRU3_1 are 26-tone [DRU6_1, DRU7_1], and the indices of 52-tone DRU4_1 are 26-tone [DRU8_1, DRU9_1]. For 106-tone DRUs, the corresponding indices of DRU1_1 and DRU2_1 are a combination of the corresponding indices of 52-tone. For example, the indices of the null subcarriers on the left side are [−495,−491], the indices of the 106-tone DRU1_1 are [−487, 52-tone DRU1_1, 52-tone DRU2_1, 480], the indices of the 106-tone DRU2_1 are [−483, 52-tone DRU3_1, 52-tone DRU4_1, 484], and the indices of the null subcarriers on the right side are [488, 492]. For 242-tone, the indices of DRU1 are [−495:4:−15, 12:4:492], and the indices of 242-tone DRU1 may be equivalently expressed as [DRU_base]. It should be noted that the corresponding indices of 26-tone DRU5_1 in 52-tone and 106-tone tone plans are not shown in figure. The corresponding indices of 26-tone DRU5_1 in 52-tone and 106-tone plans are [−463:36:−31, 28:36:460], which is equivalent to 26-tone [DRU1_1]→16.

FIG. 22 is a schematic diagram of 26-, 52- and 106-tone DRUs related to 242-tone DRU2 according to embodiments of the present disclosure. For the 242-tone DRU2, after combining the mapped second-level tone distribution and first-level tone distribution, the 26-tone DRUs related to 242-tone DRU_2 in the 80 MHz PPDU include: DRU1_2, DRU2_2, DRU3_2, DRU4_2, DRU5_2, DRU6_2, DRU7_2, DRU8_2 and DRU9_2;

For example, as shown in FIG. 22, the null subcarriers are evenly allocated on both sides related to the 242-tone DRU2. For 26-tone, the indices of the null subcarriers on the left side are [−493:4:−481]; the indices of the null subcarriers on the right side are [−493:4:−481]; the indices of the 26-tone DRU1_2 are [−477:36:−45 14:36:446], which is equivalent to 26-tone [DRU1_1]→2; the indices of the 26-tone DRU2_2 are [−457:36:−25, 34:36:466], which is equivalent to 26-tone [DRU1_1]→22; the indices of the 26-tone DRU3_2 are [−457:36:−25, 34:36:466], which is equivalent to 26-tone [DRU1_1]→10; the indices of the 26-tone DRU4_2 are [−449:36:−17, 42:36:474], which is equivalent to 26-tone [DRU1_1]→30; the indices of 26-tone DRU5_2 are [−461:36:−29, 30:36:462], which is equivalent to 26-tone [DRU1_1]→18; the indices of 26-tone DRU6_2 are [−473:36:−41, 18:36:450], which is equivalent to 26-tone [DRU1_1]→6; the indices of 26-tone DRU7_2 are [−453:36:−21, 38:36:470], which is equivalent to 26-tone [DRU1_1]→26; the indices of 26-tone DRU8_2 are [−453:36:−21, 38:36:470], which is equivalent to 26-tone [DRU1_1]→14; the indices of 26-tone DRU9_1 are [−445:36:−13, 46:36:478], which is equivalent to 26-tone [DRU1_1]→34. Here, the notation "→" means right shift.

As shown in FIG. 22, for 52-tone DRUs, the corresponding indices of DRU1_2, DRU2_2, DRU3_2 and DRU4_2 are a combination of the corresponding indices of 26-tone DRUs. For example, the indices of the null subcarriers on the left side are [−493:4:−481], and the indices of the null subcarriers on the right side are [−493:4:−481]. The indices of 52-tone DRU1_2 are 26-tone [DRU1_2, DRU2_2], the indices of 52-tone DRU2_2 are 26-tone [DRU3_2, DRU4_2], the indices of 52-tone DRU3_2 are 26-tone [DRU6_2, DRU7_2], and the indices of 52-tone DRU4_2 are 26-tone [DRU8_2, DRU9_2]. For 106-tone, the corresponding indices of DRU1_2 and DRU2_2 are a combination of the corresponding indices of 52-tone. For example, the indices of the null subcarriers on the left side are [−493,−489], the indices of the 106-tone DRU1_2 are [−487, 52-tone DRU1_2, 52-tone DRU2_2, 480], the indices of the 106-tone DRU2_2 are [−487, 52-tone DRU3_2, 52-tone DRU4_2, 480], and the indices of the null subcarriers on the right side are [490, 494]. For 242-tone, the indices of DRU2 are [−493:4:−13, 14:4:494], and the indices of DRU2 may be equivalently expressed as [DRU_base]→2. It should be noted that the corresponding indices of 26-tone DRU5_2 in 52-tone and 106-tone plans are not shown in the figure. The corresponding indices in 52-tone and 106-tone are [−461:36:−29, 30:36:462], which is equivalent to 26-tone [DRU1_1]→18.

FIG. 23 is a schematic diagram of 26-, 52- and 106-tone DRUs related to 242-tone DRU3 according to embodiments of the present disclosure. After combining the mapped second-level tone distribution and first-level tone distribution, the 26-tone DRUs related to 242-tone DRU_3 in the 80 MHz PPDU include: DRU1_3, DRU2_3, DRU3_3, DRU4_3, DRU5_3, DRU6_3, DRU7_3, DRU8_3 and DRU9_3.

For example, as shown in FIG. 23, the null subcarriers are evenly allocated on both sides related to the 242-tone DRU3. For 26-tone, the indices of the null subcarriers on the left side are [−494:4:−482]; the indices of the null subcarriers on the right side are [481:4:493]; the indices of the 26-tone DRU1_3 are [−478:36:−46 13:36:445], which is equivalent to 26-tone [DRU1_1]→1; the indices of the 26-tone DRU2_3 are [−458:36:−26, 33:36:465], which is equivalent to 26-tone [DRU1_1]→21; the indices of the 26-tone DRU3_3 are [−470:36:−38, 21:36:453], which is equivalent to 26-tone [DRU1_1]→9; the indices of the 26-tone DRU4_3 are [−450:36:−18, 41:36:473], which is equivalent to 26-tone [DRU1_1]→29; the indices of 26-tone DRU5_3 are [−462:36:−30, 29:36:461], which is equivalent to 26-tone [DRU1_1]→17; the indices of 26-tone DRU6_3 are [−474:36:−42, 17:36:449], which is equivalent to 26-tone [DRU1_1]→5; the indices of 26-tone DRU7_3 are [−454:36:−22, 37:36:469], which is equivalent to 26-tone [DRU1_1]→25; the indices of 26-tone DRU8_3 are [−466:36:−34, 25:36:457], which is equivalent to 26-tone [DRU1_1]→13; and the indices of 26-tone DRU9_3 are [−446:36:−14, 45:36:477], which is equivalent to 26-tone [DRU1_1]→33. Here, the notation "→" means right shift.

As shown in FIG. 23, for 52-tone DRUs, the corresponding indices of DRU1_3, DRU2_3, DRU3_3 and DRU4_3 are a combination of the corresponding indices of 26-tone DRUs. For example, the indices of the null subcarriers on the left side are [−494:4:−482], and the indices of the null subcarriers on the right side are [481:4:493]. The indices of 52-tone DRU1_3 are 26-tone [DRU1_3, DRU2_3], the indices of 52-tone DRU2_3 are 26-tone [DRU3_3, DRU4_3], the indices of 52-tone DRU3_3 are 26-tone [DRU6_3, DRU7_3], and the indices of 52-tone DRU4_3 are 26-tone [DRU8_3, DRU9_3]. For 106-tone, the corresponding indices of DRU1_3 and DRU2_3 are a combination of the corresponding indices of 52-tone DRUs. For example, the indices of the null subcarriers on the left side are [−494, −490], the indices of the 106-tone DRU1_3 are [−486, 52-tone DRU1_3, 52-tone DRU2_3, 481], the indices of the 106-tone DRU2_3 are [−482, 52-tone DRU3_3, 52-tone DRU4_3, 485], and the indices of the null subcarriers on the right side are [489, 493]. For 242-tone, the indices of DRU3 are [−494:4:−14, 13:4:493], and the indices of 242-tone DRU3 may be equivalently expressed as [DRU_base]→1. It should be noted that the corresponding indices of 26-tone DRU5_3 in 52-tone and 106-tone plans are not shown in the figure. The corresponding indices in 52-tone and 106-tone plans are [−462:36:−30, 29:36:461], which is equivalent to 26-tone [DRU1_1]→17.

FIG. 24 is a schematic diagram of 26-, 52- and 106-tone DRUs related to 242-tone DRU4 according to embodiments of the present disclosure. After combining the mapped second-level tone distribution and first-level tone distribution, the 26-tone DRUs related to 242-tone DRU_3 in the 80 MHz PPDU include: DRU1_4, DRU2_4, DRU3_4, DRU4_4, DRU5_4, DRU6_4, DRU7_4, DRU8_4 and DRU9_4.

For example, as shown in FIG. 24, the null subcarriers are evenly allocated on both sides related to the 242-tone DRU4. For 26-tone, the indices of the null subcarriers on the left side are [−492:4:−480]; the indices of the null subcarriers on the right side are [483:4:495]; the indices of 26-tone DRU1_4 are [−476:36:−44, 15:36:447], which is equivalent to 26-tone [DRU1_1]→3; the indices of 26-tone DRU2_4 are [−456:36:−24, 35:36:467], which is equivalent to 26-tone [DRU1_1]→23; the indices of 26-tone DRU3_4 are [−468:36:−36, 23:36:455], which is equivalent to 26-tone [DRU1_1]→11; the indices of 26-tone DRU4_4 are [−448:36:−16, 43:36:475], which is equivalent to 26-tone [DRU1_1]→31; the indices of 26-tone DRU5_4 are [−460:36:−28, 31:36:463], which is equivalent to 26-tone [DRU1_1]→19; the indices of 26-tone DRU6_4 are [−472:36:−40, 19:36:451], which is equivalent to 26-tone [DRU1_1]→7; the indices of 26-tone DRU7_4 are [−452:36:−20, 39:36:471], which is equivalent to 26-tone [DRU1_1]→27; the indices of 26-tone DRU8_4 are [−464:36:−32, 27:36:459], which is equivalent to 26-tone [DRU1_1]→15; and the indices of 26-tone DRU9_4 are [−444:36:−12, 47:36:479], which is equivalent to 26-tone [DRU1_1]→35. Here, the notation "→" means right shift.

As shown in FIG. 24, for 52-tone DRUs, the corresponding indices of DRU1_4, DRU2_4, DRU3_4 and DRU4_4 are a combination of the corresponding indices of 26-tone DRUs. For example, the indices of the null subcarriers on the left side are [−492:4:−480], and the indices of the null subcarriers on the right side are [483:4:495]. The indices of 52-tone DRU1_4 are 26-tone [DRU1, DRU2], the indices of 52-tone DRU2_4 re 26-tone [DRU3, DRU4], the indices of 52-tone DRU3_4 are 26-tone [DRU6, DRU7], and the indices of 52-tone DRU4_4 are 26-tone [DRU8, DRU9]. For 106-tone, the corresponding indices of DRU1_4 and DRU2_4 are a combination of the corresponding indices of 52-tone DRUs. For example, the indices of the null subcarriers on the left side are [−492,−488], the indices of 106-tone DRU1_4 are [−484, 52-tone DRU1, 52-tone DRU2, 483], the indices of 106-tone DRU2_4 are [−480, 52-tone DRU3, 52-tone DRU4, 487], and the indices of the null subcarriers on the right side are [491, 495]. For 242-tone, the indices of DRU4 are [−492:4:−12, 15:4:495], and the indices of DRU3 may be equivalently expressed as [DRU_base]→3. It should be noted that the corresponding indices of 26-tone DRU5_4 in 52-tone and 106-tone plan is not shown in the figure, and the corresponding indices in 52-tone and 106-tone plan are [−460:36:−28, 31:36:463], which is equivalent to 26-tone [DRU1_1]→19.

In a possible implementation, in a case of unavailable bandwidth(s) (or subchannel(s)) for tone distribution across multiple subchannels (e.g., in a case of punctured bandwidth (s) (or subchannel(s)), a second bandwidth is punctured to obtain an available bandwidth, which is the first bandwidth. It can be understood that, puncturing the second bandwidth means that a part of the second bandwidth is unavailable for tone distribution across multiple subchannels, and the remaining part of the second bandwidth is used as the available bandwidth for signal transmission. In the case that the second bandwidth is 80 MHz, if the punctured spectrum is 20 MHz, then the remaining bandwidth is 60 MHz (that is, the first bandwidth is 60 MHz); if the punctured spectrum is 40 MHz, then the remaining bandwidth is 40 MHz (that is, the first bandwidth is 40 MHz). For example, the first bandwidth is an available DRU bandwidth excluding any unavailable subchannels for DRU larger than 20 MHz.

In some embodiments of the present disclosure, FIG. 25 is a schematic diagram of a second-level tone distribution according to other embodiments of the present disclosure. The 242-tone subcarriers of the PPDU with the first bandwidth include DRU1, DRU2 and DRU3, and the DRU1, the DRU2 and the DRU3 each includes 242-tone subcarriers corresponding to a 20 MHz subchannel. The indices of the 242-tone DRU1 are indicated by [DRU1], the indices of the 242-tone DRU2 are indicated by [DRU1]+1, and the indices of the 242-tone DRU3 are indicated by [DRU1]+2. The 242-tone [DRU1] before mapping is [0:3:243,246:3:477, 480:3:723], 3 is a tone separation, and the notation +j indicates that the indices of the DRU1 are increased by j, j being a positive integer. The indices of the 242-tone DRU2 are [0:3:243, 246:3:477, 480:3:723], which is equivalent to [DRU1]+1. The indices of the 242-tone DRU3 are [2:3:245, 248:3:479, 482:3:725], which is equivalent to [DRU1]+2.

FIG. 26 is a schematic diagram showing a combination of a first-level tone distribution and a second-level tone distribution of a 242-tone DRU1 according to other embodiments of the present disclosure. The indices of each 26-tone DRU are divided into 3 subsets, each including either 8 or 9 indices, which are correspondent to 3 subsets of each 242-tone DRU, respectively, in 80 MHz PPDU. The 26-, 52- and 106-tone DRU indices corresponding to other 242-tone DRUs rather than the 242-tone DRU1 after combining the first- and second-level tone distribution can be directly derived from the related 26-, 52- and 106-tone DRU indices corresponding to the 242-tone DRU1 by following the same tone shifts as the tone different between the 242-tone DRU j (j+1) and the 242-tone DRU1.

For example, as shown in FIG. 26, in the PPDU, the null subcarriers are evenly allocated on both sides related to a 242-tone DRU1. For 26-tone, the indices of the null subcarriers on the left side are [0:3:9], and the DRUs include: DRU1_1, DRU2_1, DRU3_1, DRU4_1, DRU5_1, DRU6_1, DRU7_1, DRU8_1 and DRU9_1. The DRU1_1, DRU2_1, DRU3_1, DRU4_1, DRU5_1, DRU6_1, DRU7_1, DRU8_1 and DRU9_1 are each divided into 3 subsets; DRU1_1 includes 9+9+8 tones, DRU2_1 includes 9+8+9 tones, DRU3_1 includes 9+9+8 tones, DRU4_1 includes 8+9+9 tones, DRU5_1 includes 9+8+9 tones, DRU6_1 includes 9+9+8 tones, DRU7_1 includes 8+9+9 tones, DRU8_1 includes 9+8+9 tones, and DRU9_1 includes 8+9+9 tones. The indices of the 26-tone DRU1_1 are [12:27:228, 255:27:471, 498:27:687], the indices of the 26-tone DRU2_1 are [27:27:243, 270:27:459 486:27:702], the indices of the 26-tone DRU3_1 are [18:27:234, 261:27: 477, 504:27:693], the indices of the 26-tone DRU4_1 are [33:27:222, 249:27:465, 492:27:708], the indices of the 26-tone DRU5_1 are [24:27:240, 267:27:456, 483:27:699], the indices of the 26-tone DRU6_1 are [15:27:231, 258:27: 474, 501:27:690], the indices of the 26-tone DRU7_1 are [30:27:219, 246:27:462, 489:27:705], the indices of the 26-tone DRU8_1 are [21:27:237, 264:27:480, 507:27:696], the indices of the 26-tone DRU9_1 are [36:27:225, 252:27: 468, 495:27:711], and the indices of the null subcarriers on the right side are [714:3:723]. For 52-tone, the corresponding indices of DRU1_1, DRU2_1, DRU3_1 and DRU4_1 are a combination of the corresponding indices of 26-tone DRUs. For example, the indices of the null subcarriers on the left side are [0:3:9], the indices of the 52-tone DRU1_1 are 26-tone [DRU1_1, DRU2_1], the indices of the 52-tone DRU2_1 are 26-tone [DRU3_1, DRU4_1], the indices of the 52-tone DRU3_1 are 26-tone [DRU6_1, DRU7_1], the indices of the 52-tone DRU4_1 are 26-tone [DRU8_1, DRU9_1], and the indices of the null subcarriers on the right side are [714:3:723]. For 106-tone, the corresponding indices of DRU1 and DRU2 are a combination of the corresponding indices of 52-tone. For example, the indices of the null subcarriers on the left side are [0, 3], the indices of the DRU1_1 are [6, 52-tone DRU1_1, 52-tone DRU2_1, 714], the indices of the DRU2_1 are [9, 52-tone DRU3_1, 52-tone DRU4_1,717], and the indices of the null subcarriers on the right side are [720, 723]. For 242-tone, the indices of DRU1 are [0:3:243, 246:3:477, 480:3:723], which is equivalent to [DRU_base]. It should be noted that the corresponding indices of DRU5_1 in 52-tone and 106-tone is not shown in the figure. The corresponding indices in 52-tone and 106-tone are [24:27:240, 267:27:456, 483:27:699].

FIG. 27 is a schematic diagram of 26-, 52- and 106-tone DRUs related to 242-tone DRU2 according to other embodiments of the present disclosure For the 242-tone DRU2, after combining the mapped second-level tone distribution and first-level tone distribution, the 26-tone DRUs related to 242-tone DRU_2 include: 26-tone DRU1_2, DRU2_2, DRU3_2, DRU4_2, DRU5_2, DRU6_2, DRU7_2, DRU8_2 and DRU9_2. The DRU1_2, DRU2_2, DRU3_2, DRU4_2, DRU5_2, DRU6_2, DRU7_2, DRU8_2 and DRU9_2 are each divided into 3 subsets; DRU1_2 includes 9+9+8 tones, DRU2_2 includes 8+9+9 tones, DRU3_2 includes 9+9+8 tones, DRU4_2 includes 8+9+9 tones, DRU5_2 includes 9+8+9 tones, DRU6_2 includes 9+9+8 tones, DRU7_2 includes 8+9+9 tones, DRU8_2 includes 9+9+8 tones, and DRU9_2 includes 8+9+9 tones. The indices of 26-tone DRU1_2 are 26-tone [DRU1_1]+1, the indices of 26-tone DRU2_2 are 26-tone [DRU2_1]+1, the indices of 26-tone DRU3_2 are 26-tone [DRU3_1]+1, the indices of 26-tone DRU4_2 are 26-tone [DRU4_1]+1, the indices of 26-tone DRU5_2 are 26-tone [DRU5_1]+1, the indices of 26-tone DRU6_2 are 26-tone [DRU6_1]+1, the indices of 26-tone DRU7_2 are 26-tone [DRU7_1]+1, the indices of 26-tone DRU8_2 are 26-tone [DRU8_1]+1, and the indices of 26-tone DRU9_2 are 26-tone [DRU9_1]+1.

For example, as shown in FIG. 27, the null subcarriers are evenly allocated on both sides related to the 242-tone DRU2. For 26-tone, the indices of the null subcarriers on the left side are [1:3:10], and the indices of the null subcarriers on the right side are [715:3:724]. For 52-tone DRUs, the corresponding indices of DRU1_2, DRU2_2, DRU3_2 and DRU4_2 are a combination of the corresponding indices of 26-tone DRUs. For example, the indices of the null subcarriers on the left side are [1:3:10], and the indices of the null subcarriers on the right side are [715:3:724]. The indices of 52-tone DRU1_2 are 26-tone [DRU1_2, DRU2_2], the indices of 52-tone DRU2_2 are 26-tone [DRU3_2, DRU4_2], the indices of 52-tone DRU3_2 are 26-tone [DRU6_2, DRU7_2], and the indices of 52-tone DRU4_2 are 26-tone [DRU8_2, DRU9_2]. For 106-tone DRUs, the corresponding indices of DRU1_2 and DRU2_2 are a combination of the corresponding indices of 52-tone. For example, the indices of the null subcarriers on the left side are [1, 4], the indices of the 106-tone DRU1_2 are [7, 52-tone DRU1_2, 52-tone DRU2_2, 715], the indices of the 106-tone DRU2_2 are [10, 52-tone DRU3_2, 52-tone DRU4_2,718], and the indices of the null subcarriers on the right side are [721,724]. For 242-tone, the indices of DRU2 are [1:3:244, 247:3:478, 481:3:724], and the indices of 242-tone DRU2 can be equivalently expressed as [DRU_base]+1. It should be noted that the corresponding indices of 26-tone DRU5_2 in 52-tone and 106-tone is not shown in the figure, and the corresponding indices in 52-tone and 106-tone are 26-tone [DRU5_1]+1.

FIG. 28 is a schematic diagram of 26-, 52- and 106-tone DRUs related to 242-tone DRU3 according to other embodiments of the present disclosure. For the 242-tone DRU3, after combining the mapped second-level tone distribution and first-level tone distribution, 26-tone DRUs related to 242-tone DRU_3 include: DRU1_3, DRU2_3, DRU3_3, DRU4_3, DRU5_3, DRU6_3, DRU7_3, DRU8_3 and DRU9_3. The DRU1_3, DRU2_3, DRU3_3, DRU4_3, DRU5_3, DRU6_3, DRU7_3, DRU8_3 and DRU9_3 are each divided into 3 subsets; DRU1_3 includes 9+9+8 tones, DRU2_3 includes 9+8+9 tones, DRU3_3 includes 9+9+8 tones, DRU4_3 includes 8+9+9 tones, DRU5_3 includes 9+8+9 tones, DRU6_3 includes 9+9+8 tones, DRU7_3 includes 8+9+9 tones, DRU8_3 includes 9+8+9 tones, and DRU9_3 includes 8+9+9 tones. The indices of DRU1_3 are [DRU1_1]+2, the indices of DRU2_3 are [DRU2_1]+2, the indices of DRU3_3 are [DRU3_1]+2, the indices of DRU4_3 are [DRU4_1]+2, the indices of DRU5_3 are [DRU5_1]+2, the indices of DRU6_3 are [DRU6_1]+2, the indices of DRU7_3 are [DRU7_1]+2, the indices of DRU8_3 are [DRU8_1]+2, and the indices of DRU9_3 are [DRU9_1]+2.

For example, as shown in FIG. 28, the null subcarriers are evenly allocated on both sides related to 242-tone DRU3. For 26-tone, the indices of the null subcarriers on the left side are [2:3:11], and the indices of the null subcarriers on the right side are [716:3:725]. For 52-tone DRUs, the corresponding indices of DRU1_2, DRU2_2, DRU3_2 and DRU4_2 are a combination of the corresponding indices of 26-tone DRUs. For example, the indices of the null subcarriers on the left side are [2:3:11], and the indices of the null subcarriers on the right side are [716:3:725]. The indices of 52-tone DRU1_3 are 26-tone [DRU1_3, DRU2_3], the indices of 52-tone DRU2_3 are 26-tone [DRU3_3, DRU4_3], the indices of 52-tone DRU3_3 are 26-tone [DRU6_3, DRU7_3], and the indices of 52-tone DRU4_3 are 26-tone [DRU8_3, DRU9_3]. For 106-tone DRUs, the corresponding indices of DRU1_2 and DRU2_2 are a combination of the corresponding indices of 52-tone DRUs. For example, the indices of the null subcarriers on the left side are [2, 5], the indices of the 106-tone DRU1_3 are [8, 52-tone DRU1_3, 52-tone DRU2_3, 716], the indices of the 106-tone DRU2_3 are [11, 52-tone DRU3_3, 52-tone DRU4_3,719], and the indices of the null subcarriers on the right side are [722,725]. For 242-tone, the indices of DRU3 are [2:3:239, 242:3:482, 485:3:725], and the indices of DRU3 may be equivalently expressed as 242-tone [DRU_base]+2. It should be noted that the corresponding indices of DRU5_3 in 52-tone and 106-tone are not shown in the figure, and the corresponding indices in 52-tone and 106-tone are 26-tone [DRU5_1]+2.

Figures 29, 30:
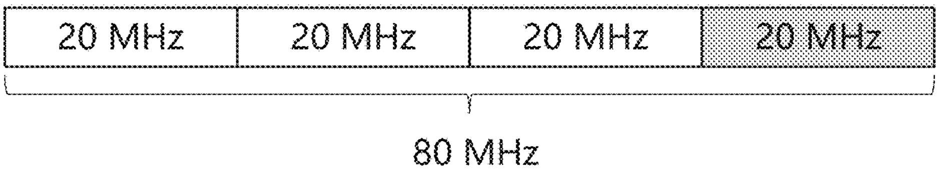
FIG. 29 is a schematic diagram of a last 20 MHz subchannel being unavailable for tone distribution across 20 MHz subchannels in an 80 MHz PPDU according to embodiments of the present disclosure.
FIG. 30 is a schematic diagram of tone distribution of a last 20 MHz subchannel being unavailable for tone distribution across 20 MHz subchannels according to embodiments of the present disclosure.

FIG. 29 is a schematic diagram of tone distribution of a last 20 MHz subchannel being unavailable for tone distribution across 20 MHz subchannels in an 80 MHz PPDU according to embodiments of the present disclosure. In the case shown in FIG. 29, FIG. 30 shows a schematic diagram of the second-level tone distribution after mapping corresponding to the last 20 MHz being unavailable for tone distribution across 20 MHz subchannels. As shown in FIG. 29, the notation '→j' denotes the index is right-shifted j positions; index right-shifting is counted one when it is from [−12] to [12]; the notation '⇔' means an equivalent notation. When the last 20 MHz subchannel is punctured, the indices of DRU1 is [DRU1], the indices of DRU2 are right-shifted by 1 relative to the indices of [DRU1], and the indices of DRU3 are right-shifted by 2 relative to the indices of [DRU1]; here, [DRU1] is [−495:3:−12,14:3:251] after mapping.

For example, the 242-tone DRUs of the PPDU with the first bandwidth include DRU1, DRU2 and DRU3, and the DRU1, the DRU2 and the DRU3 each include 242-tone subcarriers. The indices of the 242-tone DRU1 is expressed as [DRU1], the indices of the 242-tone DRU2 are indicated by 242-tone [DRU1]→1, and the indices of the 242-tone DRU3 are indicated by 242-tone [DRU1]→2. The 242-tone [DRU1] before mapping is [0:3:723], the indices of the 242-tone DRU1 after mapping are [−495:3:−12, 14:3:251], the indices of the 242-tone DRU2 before mapping are [1:3:724], the indices of the 242-tone DRU2 after mapping are [−494:3:−14, 12:3:252], equivalent to [DRU_base]→1, and the indices of the 242-tone DRU3 before mapping are [2:3:725], the indices of 242-tone DRU3 after mapping are [−493:3:−13, 13:3:253], equivalent to [DRI_base]→2.

FIG. 31 is a schematic diagram of tone distribution of a 242-tone DRU1 in an 80 MHz PPDU after mapping corresponding to a last 20 MHz being unavailable according to embodiments of the present disclosure. Here, '=>' means an equivalent notation. The 26-tone DRU1_1, DRU2_1, DRU3_1, DRU4_1, DRU5_1, DRU6_1, DRU7_1, DRU8_1 and DRU9_1 are related to 242-tone DRU1. The indices of the DRU1_1 are [−483:27:−24, 26:27:215]=>26-tone [DRU1_1], the indices of the DRU1_2 are [−468:27:−36, 14:27:230]⇔26-tone [DRU2_1], the indices of DRU3_1 are [−477:27:−18, 32:27:248]⇔26-tone [DRU3_1], the indices of DRU4_1 are [−462:27:−30, 20:27:236]⇔26-tone [DRU4_1], the indices of DRU5_1 are [−471:27:−12, 38:27:227]⇔26-tone [DRU5_1], the indices of DRU6_1 are [−480:27:−21, 29:27:218]⇔26-tone [DRU6_1], the indices of DRU7_1 are [−465:27:−33, 17:27:233]⇔26-tone, the indices of [DRU7_1] and DRU8_1 are relative to [−474:27:−15, 35:27:251]⇔26-tone [DRU8_1], and the indices of DRU9_1 are [−459:27:−27, 29:27:218]⇔26-tone [DRU9_1], where 27 is a tone separation.

For example, as shown in FIG. 31, the null subcarriers are evenly allocated on both sides related to 242-tone DRU1. For 26-tone and 52-tone DRUs, the indices of the null subcarriers on the left side are [−495:3:−486], and the indices of the null subcarriers on the right side are [484:3:493]. For 52-tone DRUs, the corresponding indices of DRU1, DRU2 and DRU3 are a combination of the corresponding indices of 26-tone DRUs. For example, the indices of 52-tone DRU1 are 26-tone [DRU1_1, DRU2_1], the indices of 52-tone DRU2 are 26-tone [DRU3_1, DRU4_1], the indices of 52-tone DRU3 are 26-tone [DRU6_1, DRU7_1], and the indices of 52-tone DRU4 are 26-tone [DRU8_1, DRU9_1]. For 106-tone, the corresponding indices of DRU1 and DRU2 are a combination of the corresponding indices of 52-tone. For example, the indices of the null subcarriers on the left side are [−495,−492], the indices of 106-tone DRU1 are [−489, 52-tone DRU1_1, 52-tone DRU2_1, 484], the indices of 106-tone DRU2 are [−486, 52-tone DRU3_1, 52-tone DRU4_1, 487], and the indices of the null subcarriers on the right side are [490, 493]. For 242-tone, the indices of DRU1 are [−495:3:−12, 14:3:251], which may be equivalently expressed as [DRU_base]. It should be noted that the corresponding indices of DRU5_1 in 52-tone and 106-tone are not shown the figure, and the corresponding indices in 52-tone and 106-tone plan are [−471:27:−12, 38:27:227], which is equivalent to 26-tone [DRU5_1].

FIG. 32 is a schematic diagram of tone distribution of a 242-tone DRU2 in an 80 MHz PPDU after mapping corresponding to a last 20 MHz being unavailable for tone distribution across 20 MHz subchannels according to embodiments of the present disclosure. For the 242-tone DRU2, after combining the mapped second-level tone distribution and first-level tone distribution, 26-tone DRUs related to DRU_2 in the 80 MHz PPDU i include: DRU1_2, DRU2_2, DRU3_2, DRU4_2, DRU5_2, DRU6_2, DRU7_2, DRU8_2 and DRU9_2. The indices of the 26-tone DRU1_2 are 26-tone [DRU1_1]→1, the indices of the 26-tone DRU2_2 are 26-tone [DRU2_1]→1, the indices of the 26-tone DRU3_2 are 26-tone [DRU3_1]→1, the indices of the 26-tone DRU4_2 are 26-tone [DRU4_1]→1, the indices of the 26-tone DRU5_2 are 26-tone [DRU5_1]→1, the indices of the 26-tone DRU6_2 are 26-tone [DRU6_1]→1, the indices of the 26-tone DRU7_2 are 26-tone [DRU7_1]→1, the indices of the 26-tone DRU8_2 are 26-tone [DRU8_1]→1, and the indices of the 26-tone DRU9_2 are 26-tone [DRU9_1]→1; here, the notation "→" means right shift.

For example, as shown in FIG. 32, the null subcarriers are evenly allocated on both sides related to 242-tone DRU2. For 26-tone, the indices of the null subcarriers on the left side are [−495:3:−486], and the indices of the null subcarriers on the right side are [484:3:493]. For 52-tone, the corresponding indices of DRU1_2, DRU2_2, DRU3_2 and DRU4_2 are a combination of the corresponding indices of 26-tone. For example, the indices of the null subcarriers on the left side are [−495:3:−486], and the indices of the null subcarriers on the right side are [484:3:493]. The indices of 52-tone DRU1_2 are 26-tone [DRU1_2, DRU2_2], the indices of 52-tone DRU2_2 are 26-tone [DRU3_2, DRU4_2], and the indices of 52-tone DRU3_2 are 26-tone [DRU6_2, DRU7_2], the indices of 52-tone DRU4_2 are 26-tone [DRU8_2, DRU9_2]. For 106-tone, the corresponding indices of DRU1_2 and DRU2_2 are a combination of the corresponding indices of 52-tone. For example, the indices of the null subcarriers on the left side are [−495,−492], the indices of the 106-tone DRU1_2 are [−489, 52-tone DRU1_2, 52-tone DRU2_2, 484], the indices of the 106-tone DRU2_2 are [−486, 52-tone DRU3_2, 52-tone DRU4_2, 487], and the indices of the null subcarriers on the right side are [490, 493]. For 242-tone, the indices of DRU2 are [−494:3:−14, 12:3:252], and the indices of DRU2 may be equivalently expressed as [DRU_base]→1. It should be noted that the corresponding indices of DRU5_2 in 52-tone and 106-tone is not shown the figure, and the corresponding indices in 52-tone and 106-tone are 26-tone [DRU5_1]→1.

FIG. 33 is a schematic diagram of tone distribution of a 242-tone DRU3 in an 80 MHz PPDU after mapping corresponding to a last 20 MHz being unavailable for tone distribution across 20 MHz subchannels according to embodiments of the present disclosure. For the 242-tone DRU3, after combining the mapped second-level tone distribution and first-level tone distribution, 26-tone DRUs related to 242-tone DRU_3 in the 80 MHz PPDU include: DRU1_3, DRU2_3, DRU3_3, DRU4_3, DRU5_3, DRU6_3, DRU7_3, DRU8_3 and DRU9_3. The indices of 26-tone DRU1_3 are 26-tone [DRU1_1]→2, the indices of 26-tone DRU2_3 are 26-tone [DRU2_1]→2, the indices of 26-tone DRU3_3 are 26-tone [DRU3_1]→2, the indices of 26-tone DRU4_3 are 26-tone [DRU4_1]→2, the indices of 26-tone DRU5_3 are 26-tone [DRU5_1]→2, the indices of 26-tone DRU6_3 are 26-tone [DRU6_1]→2, the indices of 26-tone DRU7_3 are 26-tone [DRU7_1]→2, the indices of 26-tone DRU8_3 are 26-tone [DRU8_1]→2, and the indices of 26-tone DRU9_3 are 26-tone [DRU9_1]→2; here, the notation "→" means right shift.

For example, as shown in FIG. 33, the null subcarriers are evenly allocated on both sides related to 242-tone DRU3. For 26-tone, the indices of the null subcarriers on the left side are [−495:3:−486], and the indices of the null subcarriers on the right side are [484:3:493]. For 52-tone, the corresponding indices of DRU1_2, DRU2_2, DRU3_2 and DRU4_2 are a combination of the corresponding indices of 26-tone. For example, the indices of the null subcarriers on the left side are [−495:3:−486], and the indices of the null subcarriers on the right side are [484:3:493]. The indices of 52-tone DRU1_3 are 26-tone [DRU1_3, DRU2_3], the indices of 52-tone DRU2_3 are 26-tone [DRU3_3, DRU4_3], the indices of DRU3_3 are 26-tone [DRU6_3, DRU7_3], the indices of 52-tone DRU4_3 are 26-tone [DRU8_3, DRU9_3]. For 106-tone, the corresponding indices of DRU1_3 and DRU2_3 are a combination of the corresponding indices of 52-tone. For example, the indices of the null subcarriers on the left side are [−495,−492], the indices of the 106-tone DRU1_3 are [−489, 52-tone DRU1_3, 52-tone DRU2_3, 484], the indices of the 106-tone DRU2_3 is [−486, 52-tone DRU3_3, 52-tone DRU4_3, 487], and the indices of the null subcarriers on the right side are [490, 493]. For 242-tone, the indices of DRU2 are [−493:3:−13, 13:3:253], and the indices of DRU2 may be equivalently expressed as [DRU_base]→2. It should be noted that the corresponding indices of 26-tone DRU5_3 in 52-tone and 106-tone are not shown the figure, and the corresponding indices in 52-tone and 106-tone are 26-tone [DRU5_1]→2.

Figure 34:
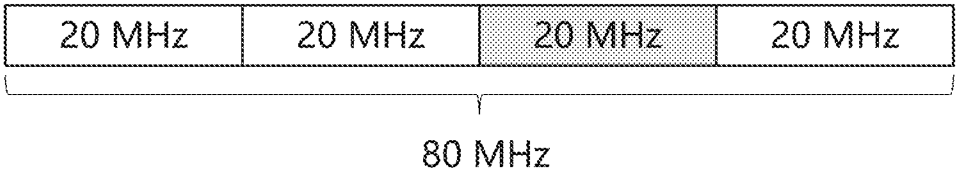
FIG. 34 is a schematic diagram of a second last 20 MHz subchannel being unavailable for tone distribution across 20 MHz subchannels in an 80 MHz PPDU according to embodiments of the present disclosure.

FIG. 34 is a schematic diagram of tone distribution of a second last 20 MHz subchannel being unavailable for tone distribution across 20 MHz subchannels in an 80 MHz PPDU according to embodiments of the present disclosure. As shown in FIG. 35, when the second last 20 MHz subchannel is unavailable, 242-tone DRUs include DRU1, DRU2 and DRU3; the indices of 242-tone DRU1 are obtained by right-shifting all tones with indices, which are greater than or equal to 12 in the mapped [DRU1], by 242, and the mapped [DRU1] is [−495:3:−12, 14:3:251]; the indices of the 242-tone DRU2 are obtained by right shifting all tones with indices, which are greater than or equal to 12 in the mapped indices of 242-tone [DRU1] right shifted by 1, by 242; and the indices of the 242-tone DRU3 are obtained by right shifting all tones with indices, which are greater than or equal to 12 in the mapped indices of 242-tone [DRU1] right shifted by 2, by 242.

Figure 36:
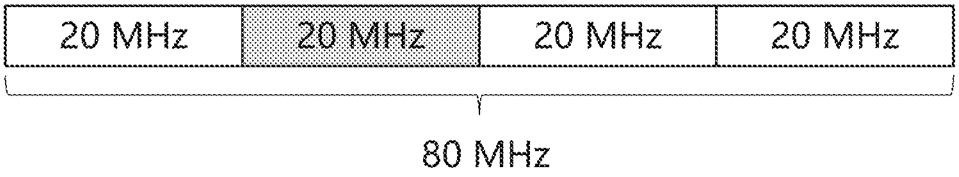
FIG. 36 is a schematic diagram of a second 20 MHz subchannel being unavailable for tone distribution across 20 MHz subchannels in an 80 MHz PPDU according to embodiments of the present disclosure.

FIG. 36 is a schematic diagram of tone distribution of a second 20 MHz subchannel being unavailable for tone distribution across 20 MHz subchannels in an 80 MHz PPDU according to embodiments of the present disclosure. In the case shown in FIG. 36, FIG. 37 is a schematic diagram of tone distribution of a second 20 MHz subchannel being unavailable across 20 MHz subchannels according to embodiments of the present disclosure. As shown in FIG. 37, for example, when the second 20 MHz subchannel is unavailable, the 242-tone DRUs include DRU1, DRU2 and DRU3; the indices of 242-tone DRU1 are obtained by right shifting all tones with indices, which are greater than or equal to −253 in the mapped indices of 242-tone [DRU1], by 242; the indices of 242-tone DRU2 are obtained by right shifting all tones with indices, which are greater than or equal to −253 in the mapped indices of 242-tone [DRU1] right shifted by 1, by 242; and the indices of 242-tone DRU3 are obtained by right shifting all tones with indices, which are greater than or equal to −253 in the mapped 242-tone [DRU1] that is right shifted by 2, by 242.

Figure 38:
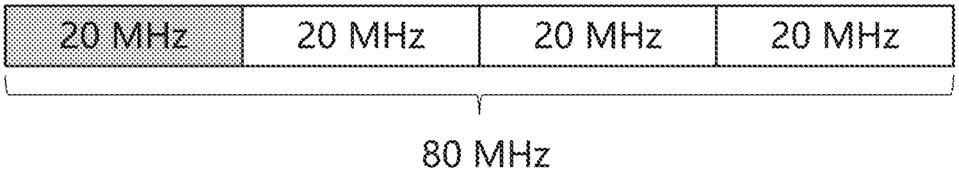
FIG. 38 is a schematic diagram of a first 20 MHz subchannel being unavailable for tone distribution across 20 MHz subchannels in an 80 MHz PPDU according to embodiments of the present disclosure.

FIG. 38 is a schematic diagram of tone distribution of a first 20 MHz subchannel being unavailable for tone distribution across 20 MHz subchannels in an 80 MHz PPDU according to embodiments of the present disclosure. In the case shown in FIG. 38, FIG. 39 is a schematic diagram of tone distribution of a first 20 MHz subchannel being unavailable across 20 MHz subchannels according to embodiments of the present disclosure. As shown in FIG. 39, for example, when the first 20 MHz bandwidth is unavailable, the 242-tone DRUs include DRU1, DRU2 and DRU3; the indices of 242-tone DRU1 is obtained by right shifting all tones with indices in the mapped indices of 242-tone [DRU1] by 242; the indices of 242-tone DRU2 is obtained by right shifting all tones with indices, which are in the mapped indices of 242-tone [DRU1] right shifted by 1, by 242; and the indices of 242-tone DRU3 is obtained by right shifting all tones with indices, which are in the mapped indices of 242-tone [DRU1] right shifted by 2, by 242.

In some embodiments of the present disclosure, FIG. 40 is a schematic diagram of a second-level tone distribution with two 20 MHz subchannels being unavailable for tone distribution across 20 MHz subchannels according to embodiments of the present disclosure. The 242-tone DRUs include DRU1 and DRU2, and the DRU1 and DRU2 each include 242-tone subcarriers in the 80 MHz PPDU. The indices of the 242-tone DRU1 are indicated by 242-tone [DRU1], and the indices of the 242-tone DRU2 are indicated by 242-tone [DRU1]+1; the 242-tone [DRU1] before mapping is [0:2:482], and 2 is a tone separation; and the indices of the 242-tone DRU2 are [1:2:483], which is equivalent to the 242-tone [DRU1]+1.

FIG. 41 is a schematic diagram showing a combination of a first-level tone distribution and a second-level tone distribution of a 242-tone DRU1 according to embodiments of the present disclosure. The 26-, 52- and 106-tone DRU indices corresponding to 242-tone DRU1 after combining the first- and second-level tone distribution can be directly derived.

For example, as shown in FIG. 41, in the PPDU, the null subcarriers are evenly allocated on both sides related to 242-tone DRU1. For 26-tone, the indices of the null subcarriers on the left side are [0:2:6], and the DRUs include: DRU1_1, DRU2_1, DRU3_1, DRU4_1, DRU5_1, DRU6_1, DRU7_1, DRU8_1 and DRU9_1; the indices of 26-tone DRU1_1 are indicated by 26-tone [DRU1_1], the indices of 26-tone DRU1_2 are indicated by 26-tone [DRU1_1]+10, and the indices of 26-tone DRU3_1 are indicated by 26-tone [DRU1_1]+10. The indices of 26-tone DRU4_1 are indicated by 26-tone [DRU1_1]+4, the indices of 26-tone DRU4_1 are indicated by 26-tone [DRU1_1]+14, the indices of 26-tone DRU5_1 are indicated by 26-tone [DRU1_1]+8, the indices of 26-tone DRU6_1 are indicated by 26-tone [DRU1_1]+2, the indices of 26-tone DRU7_1 are indicated by 26-tone [DRU1_1]+12, the indices of 26-tone DRU8_1 are indicated by 26-tone [DRU1_1]+6, and the indices of 26-tone DRU9_1 are indicated by 26-tone [DRU1_1]+16.

As shown in FIG. 41, the indices of the 26-tone DRU1_1 are [8:18:458], the indices of the 26-tone DRU2_1 are [18:18:468], the indices of the 26-tone DRU3_1 are [12:18:462], the indices of the 26-tone DRU4_1 are [22:18:472], the indices of the 26-tone DRU5_1 are [16:18:466], the indices of the 26-tone DRU6_1 are [10:18:460], the indices of the 26-tone DRU7_1 are [20:18:470], the indices of the 26-tone DRU8_1 are [14:18:464], the indices of the 26-tone DRU9_1 are [24:18:474], and the indices of the null subcarriers on the right side are [476:2:482]. For 52-tone DRUs, the corresponding indices of DRU1_1, DRU2_1, DRU3_1 and DRU4_1 are a combination of the corresponding indices of 26-tone DRUs, the indices of 52-tone DRU1_1 are 26-tone [DRU1_1, DRU2_1], the indices of 52-tone DRU2_1 are 26-tone [DRU3_1, DRU4_1], the indices of 52-tone DRU3_1 are 26-tone [DRU6_1, DRU7_1], the indices of 52-tone DRU4_1 are 26-tone [DRU8_1, DRU9_1], and the indices of the null subcarriers on the right side are [714:3:723]. For 106-tone DRUs, the corresponding indices of 106-tone DRU1_1 and 106-tone DRU2_1 are a combination of the corresponding indices of 52-tone DRUs. For example, the indices of the null subcarriers on the left side are [0, 2], the indices of the 106-tone DRU1_1 are [4, 52-tone DRU1_1, 52-tone DRU2_1, 476], the indices of the 106-tone DRU2_1 are [6, 52-tone DRU3_1, 52-tone DRU4_1,478], and the indices of the null subcarriers on the right side are [480, 482]. For 242-tone, the indices of DRU1 are [0:2:240, 242:2:482] which is equivalent to [DRU_base]. It should be noted that the corresponding indices of DRU5_1 in 52-tone and 106-tone are not shown in the figure, and the corresponding indices in 52-tone and 106-tone are [16:18:466].

Figure 42:
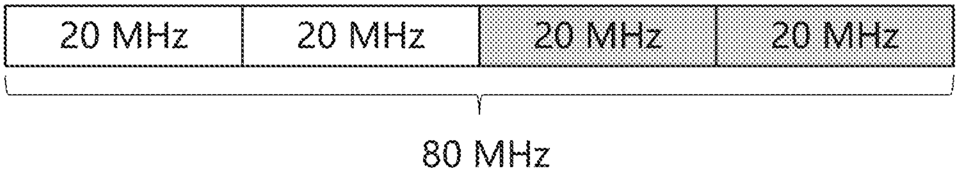
FIG. 42 is a schematic diagram of last two 20 MHz subchannels being unavailable for tone distribution across 20 MHz subchannels in an 80 MHz PPDU according to embodiments of the present disclosure.

FIG. 42 is a schematic diagram of tone distribution of last two 20 MHz subchannels being unavailable for tone distribution across 20 MHz subchannels in an 80 MHz PPDU according to embodiments of the present disclosure. Since the last two 20 MHz are unavailable, the first bandwidth is 40 MHz. In the case shown in FIG. 42, FIG. 43 is a schematic diagram of tone distribution of last two 20 MHz subchannels being unavailable across 20 MHz subchannels according to embodiments of the present disclosure. As shown in FIG. 43, the notation '→j' denotes the index is right-shifted j positions; index right-shifting is counted one when it is from [−12] to [12], '⇔' means an equivalent notation. When the last two 20 MHz bandwidths are unavailable, the indices of 242-tone DRU1 are 242-tone [DRU1], and the indices of 242-tone DRU2 are right-shifted by 1 relative to the indices of 242-tone [DRU1], and the 242-tone [DRU1] is [−495:3:−13] after mapping.

For example, the 242-tone subcarriers of the PPDU with the first bandwidth include 242-tone DRU1 and 242-tone DRU2, and the 242-tone DRU1 and the 242-tone DRU2 each includes the 242-tone subcarriers in the 80 MHz PPDU. The indices of the 242-tone DRU1 are indicated by [DRU_base], and the indices of the 242-tone DRU2 are indicated by [DRU_base]→1. The 242-tone [DRU1] before mapping are [0:2:482], and the indices of 242-tone DRU1 after mapping are [−495:2:−13]. The indices of 242-tone DRU2 before mapping are [1:2:483], and the indices of 242-tone DRU2 after mapping are [−494:2:−12].

FIG. 44 is a schematic diagram showing a combination of a combination of a first-level tone distribution and a second-level tone distribution of a mapped 242-tone DRU1 according to embodiments of the present disclosure. The 26-, 52- and 106-tone DRU indices corresponding to 242-tone DRU2 after combining the first- and second-level tone distribution may be directly derived from the related 26-, 52- and 106-tone DRU indices corresponding to the 242-tone DRU1 by right-shifting the indices in 242-tone DRU1 by one.

For example, as shown in FIG. 44, in the PPDU, the null subcarriers are evenly allocated on both sides related to 242-tone DRU1. For 26-tone, the indices of the null subcarriers on the left side are [−495:2:−489], and the DRUs include: DRU1_1, DRU2_1, DRU3_1, DRU4_1, DRU5_1, DRU6_1, DRU7_1, DRU8_1 and DRU9_1; the indices of the 26-tone DRU1_1 are indicated by 26-tone [DRU1_1], the indices of the 26-tone DRU1_2 are indicated by 26-tone [DRU1_1]→10, the indices of the 26-tone DRU3_1 are indicated by 26-tone [DRU1_1]→4, the indices of the 26-tone DRU4_1 are indicated by 26-tone [DRU1_1]→14, the indices of the 26-tone DRU5_1 are indicated by 26-tone [DRU1_1]→8, the indices of the 26-tone DRU6_1 are indicated by 26-tone [DRU1_1]→2, and the indices of the 26-tone DRU7_1 are indicated by 26-tone [DRU1_1]→12, the indices of 26-tone DRU8_1 are indicated by 26-tone

[DRU1_1]→6, and the indices of 26-tone DRU9_1 are indicated by 26-tone [DRU1_1]→16; here, the notation "→" means right shift.

As shown in FIG. 44, the indices of the 26-tone DRU1_1 are [−487:18:−37], the indices of the 26-tone DRU2_1 are [−477:18:−27], the indices of the 26-tone DRU3_1 are [−483:18:−33], the indices of the 26-tone DRU4_1 are [−473:18:−23], the indices of the 26-tone DRU5_1 are [−479:18:−29], the indices of the 26-tone DRU6_1 are [−485:18:−35], the indices of the 26-tone DRU7_1 are [−475:18:−25], the indices of the 26-tone DRU8_1 are [−481:18:−31], the indices of the 26-tone DRU9_1 are [−471:18:−21], and the indices of the null subcarriers on the right side are [−19:2:13]. For 52-tone, the corresponding indices of DRU1_1, DRU2_1, DRU3_1 and DRU4_1 are a combination of the corresponding indices of 26-tone, the indices of 52-tone DRU1_1 are 26-tone [DRU1_1, DRU2_1], the indices of 52-tone DRU2_1 are 26-tone [DRU3_1, DRU4_1], the indices of 52-tone DRU3_1 are 26-tone [DRU6_1, DRU7_1], the indices of 52-tone DRU4_1 are 26-tone [DRU8_1, DRU9_1], and the indices of the null subcarriers on the right side are [714:3:723]. For 106-tone, the corresponding indices of DRU1_1 and DRU2_1 are a combination of the corresponding indices of 52-tone. For example, the indices of the null subcarriers on the left side are [−495,−493], the indices of the 106-tone DRU1_1 are [−491, 52-tone DRU1_1, 52-tone DRU2_1, −19], the indices of the 106-tone DRU2_1 are [−489, 52-tone DRU3_1, 52-tone DRU4_1, −17], and the indices of the null subcarriers on the right side are [−15, −13]. For 242-tone, the indices of DRU1 are [−495:2:−13], which is equivalent to [DRU_base]. It should be noted that the corresponding indices of 26-tone DRU5_1 in 52-tone and 106-tone are not shown in the figure, and the corresponding indices in 52-tone and 106-tone are [−479:18:−29].

FIG. 45 is a schematic diagram showing a combination of a combination of a first-level tone distribution and a second-level tone distribution of a mapped DRU2 according to embodiments of the present disclosure. The 26-, 52- and 106-tone DRU indices corresponding to 242-tone DRU2 after combining the first- and second-level tone distribution can be directly derived from the related 26-, 52- and 106-tone DRU indices corresponding to the 242-tone DRU1 by right-shifting the indices in 242-tone DRU1 by one.

For example, as shown in FIG. 45, in the PPDU, the null subcarriers are evenly allocated on both sides related to 242-tone DRU2. For 26-tone, the indices of the null subcarriers on the left side are [−495:2:−489]; the 242-tone DRU2 relates 26-tone DRU1_2, DRU2_2, DRU3_2, DRU4_2, DRU5_2, DRU6_2, DRU7_2, DRU8_2 and DRU9_2; for 242-tone; and the indices of DRU1 are [−494:2:−12], which is equivalent to [DRU_base]→1. As for the indices of the indices of 26-tone DRU1_2, DRU2_2, DRU3_2, DRU4_2, DRU5_2, DRU6_2, DRU7_2, DRU8_2 and DRU9_2 shown in FIG. 44, details can be made to the above description, which will not be repeated here. It should be noted that the corresponding indices of 26-tone DRU5_2 in 52-tone and 106-tone plans are not shown in the figure, and the corresponding indices in 52-tone and 106-tone plans are [−479:18:−29].

Figures 46, 47:
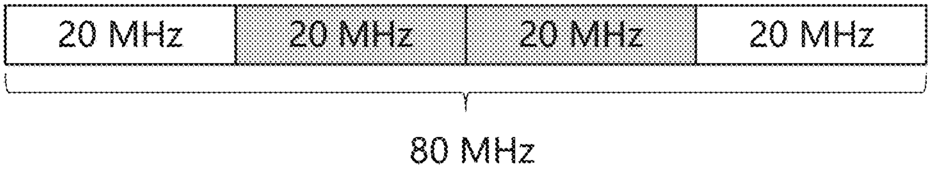
FIG. 46 is a schematic diagram of second and third 20 MHz subchannels being unavailable for tone distribution across 20 MHz subchannels in an 80 MHz PPDU according to embodiments of the present disclosure.
FIG. 47 is a schematic diagram of tone distribution of 242-tone DRUs with second and third 20 MHz subchannels being unavailable for tone distribution across 20 MHz subchannels in an 80 MHz PPDU according to embodiments of the present disclosure.

FIG. 46 is a schematic diagram of tone distribution of second and third 20 MHz subchannels being unavailable for tone distribution across 20 MHz subchannels in an 80 MHz PPDU according to embodiments of the present disclosure. In the case shown in FIG. 46, FIG. 47 is a schematic diagram of tone distribution of second and third 20 MHz subchannels being unavailable across 20 MHz subchannels according to embodiments of the present disclosure. As shown in FIG. 47, when the second and third 20 MHz bandwidths are unavailable and the first bandwidth is 40 MHz, after the second-level tone distribution is mapped, the second-level tone distribution includes 242-tone DRU1 and 242-tone DRU2; the indices of the 242-tone DRU1 are obtained by right shifting all tones with indices, which are greater than or equal to −253 in the mapped 242-tone [DRU1], by 484; and the indices of the 242-tone DRU2 are obtained by right shifting all tones with indices, which are greater than or equal to −253 in [DRU1]→1 (i.e., the mapped [DRU1] that is right shifted by 1), by 484.

In summary, in the scenarios where unavailable bandwidth(s) exist, all subcarriers allocated within the DRU BW are distributed with equal tone separation or almost equal tone separation. In the case where one 20 MHz subchannel in an 80 MHz PPDU is punctured, it allows the subcarriers to be allocated over an available 60 MHz subchannel to maximize the per-tone transmission power boosting gain. Similarly, in the case where two 20 MHz subchannels in an 80 MHz PPDU are punctured, it allows the subcarriers to be allocated over an available 40 MHz subchannel to maximize the per-tone transmit power boosting gain.

In some embodiments, a DRU plan determined as described above may be stored in both an AP and an STA such as storing in one non-transitory computer-readable storage device or media thereof as a DRU table. Then, the AP and STA may find a DRU for data and/or pilot transmission therebetween by looking up the DRU table.

In some embodiments, instead of using a DRU table, the AP and STA may calculate the DRU plan as described above, and select a DRU from the calculated DRU plan for data and/or pilot transmission therebetween without looking up a DRU table.

The communication method disclosed herein and the resulting DRU plans may be related to the standardization of next generation of IEEE 802.11be for operation on the unlicensed millimeter bands.

The DRU-design methods disclosed herein and the resulting DRU plans may be used in WI-FI APs and STAs with operating capability in both sub-7 GHz and millimeter bands.

Some embodiment of the present disclosure provides a device. The device includes: one or more processors and a memory. The memory stores instructions that, when executed by the one or more processors, cause the device to perform one or more of steps in the communication method as described in the embodiments of the present disclosure. The device may be the apparatus 410 as shown in FIG. 4. The processor may be the processor 411 as shown in FIG. 4. The memory may be the memory 413 as shown in FIG. 4.

Some embodiments of the present disclosure provide a computer-readable storage medium (for example, a non-transitory computer-readable storage medium), the computer-readable storage medium has stored computer program instructions, and the computer program instructions, when executed by one or more circuits, cause the one or more circuits to perform one or more of steps in the communication method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD) or a digital versatile disk (DVD)), a smart card and a flash memory device (e.g., an erasable programmable read-only memory (EPROM), a card, a stick or a key driver). Various computer-readable storage media described in the embodiments of the present disclosure may represent one or more devices and/or other machine-readable storage media, which are used for storing information. The term "machine-readable storage medium" may include, but is not limited to, wireless channels and various other media capable of storing, containing, and/or carrying instructions and/or data.

Some embodiments of the present disclosure provide a computer program product. The computer program product includes computer program instructions carried on a non-transitory computer-readable storage medium. When the computer program instructions are executed on a computer, the computer program instructions cause the computer to perform one or more of steps in the communication method as described in any one of the above embodiments.

Beneficial effects of the computer-readable storage medium and the computer program product are the same as beneficial effects of the communication method as described in the above embodiments, which will not be repeated here.

The foregoing descriptions are merely specific implementations of the present disclosure, but the protection scope of the present disclosure is not limited thereto. Any changes or replacements within the technical scope of the present disclosure shall be included in the protection scope of the present disclosure. Therefore, the protection scope of the present disclosure shall be subject to the protection scope of the claims.

What is claimed is:

1. A communication method, comprising:

determining a plurality of resource units (RUs) of a physical layer protocol data unit (PPDU) with a first bandwidth comprising an integer number of 20 MHz subchannels, wherein:

locations of the plurality of RUs are determined based on a first-level tone distribution and a second-level tone distribution;

the first-level tone distribution is used to indicate a mapping relationship between distributed subcarrier indices of 26-tone RU, 52-tone RU and 106-tone RU and subcarrier indices of 242-tone RU in each 20 MHz subchannel; and the second-level tone distribution is used to indicate a distribution of subcarrier indices of 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarrier allocated between any consecutive 242-tone RUs; and transmitting a signal to a device using one or more RUs of the plurality of RUs.

2. The method of claim 1, wherein the first bandwidth is 80 MHz.

3. The method of claim 2, wherein the plurality of RUs are distributed RUs (DRUs), and subcarrier indices corresponding to the plurality of DRUs are determined based on a number of the plurality of DRUs.

4. The method of claim 3, wherein 242-tone RU subcarriers of the PPDU with the first bandwidth include a DRU1, DRU2, DRU3 and DRU4; the DRU1, DRU2, DRU3 and DRU4 are each 242-tone RUs in the PPDU of 80 MHz; indices of the DRU1 are indicated by [DRU1], indices of the DRU2 are right-shifted by 2 relative to [DRU1], indices of the DRU3 are right-shifted by 1 relative to [DRU1], and indices of the DRU4 are right-shifted by 3 relative to [DRU1]; and the mapped [DRU1] is [−495:4:−15, 12:4:492], and 4 is a tone separation; and the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are right-shifted by 20 relative to [DRU1_1], indices of the DRU3_1 are right-shifted by 8 relative to [DRU1_1], indices of the DRU4_1 are right-shifted by 28 relative to [DRU1_1], indices of the DRU5_1 are right-shifted by 16 relative to [DRU1_1], indices of the DRU6_1 are right-shifted by 4 relative to [DRU1_1], indices of the DRU7_1 are right-shifted by 24 relative to [DRU1_1], indices of the DRU8_1 are right-shifted by 12 relative to [DRU1_1], and indices of the DRU9_1 are right-shifted by 32 relative to [DRU1_1]; and [DRU1_1] is [−479:36:−47, 12:36:444], and 36 is a tone separation.

5. The method of claim 1, wherein the first bandwidth is an available DRU bandwidth.

6. The method of claim 5, wherein in a case where a last 20 MHz subchannel is unavailable, 242-tone RU subcarriers of the PPDU with the first bandwidth include DRU1, DRU2, and DRU3; the indices of the DRU1 are [DRU1], the indices of the DRU2 are right-shifted by 1 relative to [DRU1], and the indices of the DRU3 are right-shifted by 2 relative to [DRU1]; and the mapped [DRU1] is [−495:3:−12, 14:3:251].

7. The method of claim 5, wherein in a case where a second last 20 MHz subchannel is unavailable, 242-tone RU subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to 12 in the mapped [DRU1], by 242, wherein the mapped [DRU1] is [−495:3:−12, 14:3:251];

the indices of the DRU2 are obtained by right shifting all tones with indices, which are greater than or equal to 12 in the mapped [DRU1] that is right shifted by 1, by 242; and the indices of the DRU3 are obtained by right shifting all tones with indices, which are greater than or equal to 12 in the mapped [DRU1] that is right shifted by 2, by 242.

8. The method of claim 5, wherein in a case where a second 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to −253 in the mapped [DRU1], by 242;

the indices of the DRU2 are obtained by right shifting all tones with indices, which are greater than or equal to −253 in the mapped [DRU1] that is right shifted by 1, by 242; and the indices of the DRU3 are obtained by right shifting all tones with indices, which are greater than or equal to −253 in the mapped [DRU1] that is right shifted by 2, by 242.

9. The method of claim 5, wherein in a case where the second-level tone distribution is mapped and a first 20 MHz subchannel is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices in the mapped [DRU1] by 242; the indices of the DRU2 are obtained by right shifting all tones with indices, which are in the mapped [DRU1] that is right shifted by 1, by 242; and the indices of the DRU3 are obtained by right shifting all tones with indices, which are in the mapped [DRU1] that is right shifted by 2, by 242.

10. The method of claim 5, wherein in a case where a last 20 MHz bandwidth and a second last 20 MHz bandwidth are unavailable and the first bandwidth is 40 MHz, after the second-level tone distribution is mapped, the second-level tone distribution includes DRU1 and DRU2; indices of the DRU1 are [DRU1], and indices of the DRU2 are obtained by right shifting all tones with indices in the mapped [DRU1] by 1; the mapped [DRU1] is [−495:2:−13], and 2 is a tone separation.

11. The method of claim 5, wherein in a case where a second 20 MHz bandwidth and a third 20 MHz bandwidth are unavailable and the first bandwidth is 40 MHz, after the second-level tone distribution is mapped, the second-level tone distribution includes DRU1 and DRU2; indices of the DRU1 before mapping are indicated by [DRU1];

the indices of the DRU1 are obtained by right shifting all tones with indices, which are greater than or equal to −253 in the mapped [DRU1], by 484; and the indices of the DRU2 are obtained by right shifting all tones with indices, which are greater than or equal to −253 in the mapped [DRU1] that is right shifted by 1, by 484.

12. A device, comprising:

one or more processors; and a memory for storing instructions that, when executed by the one or more processors, cause the device to perform:

determining a plurality of resource units (RUs) of a physical layer protocol data unit (PPDU) with a first bandwidth comprising an integer number of 20 MHz subchannels, wherein:

locations of the plurality of RUs are determined based on a first-level tone distribution and a second-level tone distribution;

the first-level tone distribution is used to indicate a mapping relationship between distributed subcarrier indices of a 26-tone RU, a 52-tone RU and a 106-tone RU and subcarrier indices of a 242-tone RU in each 20 MHz subchannel; and the second-level tone distribution is used to indicate a distribution of subcarrier indices of a 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarrier allocated between any consecutive 242-tone RUs; and transmitting a signal to a device using one or more RUs of the plurality of RUs.

13. A non-transitory computer-readable storage medium, comprising instructions that, when executed by one or more circuits, cause the one or more circuits to perform:

determining a plurality of resource units (RUs) of a physical layer protocol data unit (PPDU) with a first bandwidth comprising an integer number of 20 MHz subchannels, wherein:

locations of the plurality of RUs are determined based on a first-level tone distribution and a second-level tone distribution;

the first-level tone distribution is used to indicate a mapping relationship between distributed subcarrier indices of a 26-tone RU, a 52-tone RU and a 106-tone RU and subcarrier indices of a 242-tone RU in each 20 MHz subchannel; and the second-level tone distribution is used to indicate a distribution of subcarrier indices of a 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarrier allocated between any consecutive 242-tone RUs; and transmitting a signal to a device using one or more RUs of the plurality of RUs.

14. A communication method, comprising:

determining a plurality of resource units (RUs) of a physical layer protocol data unit (PPDU) with a first bandwidth comprising an integer number of 20 MHz subchannels, wherein:

locations of the plurality of RUs are determined based on a first-level tone distribution and a second-level tone distribution;

the first-level tone distribution is used to indicate a mapping relationship between distributed subcarrier indices of a 26-tone RU, a 52-tone RU and a 106-tone RU and subcarrier indices of a 242-tone RU in each 20 MHz subchannel; and the second-level tone distribution is used to indicate a distribution of subcarrier indices of 242-tone RU in the PPDU with the first bandwidth, all null subcarriers in a 20 MHz subchannel are allocated exclusively in left and right bands, with no null subcarrier allocated between any consecutive RUs in a 20 MHz subchannel, and all null subcarriers outside 20 MHz subchannel(s) in a PPDU are allocated exclusively in left and right bands contiguous with guard subcarriers, with no null subcarrier allocated between any consecutive 242-tone RUs; and receiving a signal from a device using one or more RUs of the plurality of RUs.

15. The method of claim 12, wherein the first bandwidth is 80 MHz.

16. The method of claim 15, wherein the plurality of RUs are distributed RUs (DRUs), and subcarrier indices corresponding to the plurality of RUs are determined based on a number of the plurality of RUs.

17. The method of claim 16, wherein 242-tone RU subcarriers of the PPDU with the first bandwidth include a DRU1, DRU2, DRU3 and DRU4; the DRU1, DRU2, DRU3 and DRU4 are each 242-tone RUs in the PPDU of 80 MHz; indices of the DRU1 are indicated by [DRU1], indices of the DRU2 are right-shifted by 2 relative to [DRU1], indices of the DRU3 are right-shifted by 1 relative to [DRU1], and indices of the DRU4 are right-shifted by 3 relative to [DRU1]; and the mapped [DRU1] is [−495:4:−15, 12:4:492], and 4 is a tone separation; and the 242-tone DRU1 relates 26-tone DRUs including: DRU1_1, DRU2_1, DRU3_1, DRU4_1, DRU5_1, DRU6_1, DRU7_1, DRU8_1, and DRU9_1; indices of the DRU1_1 are indicated by [DRU1_1], indices of the DRU2_1 are right-shifted by 20 relative to [DRU1_1], indices of the DRU3_1 are right-shifted by 8 relative to [DRU1_1], indices of the DRU4_1 are right-shifted by 28 relative to [DRU1_1], indices of the DRU5_1 are right-shifted by 16 relative to [DRU1_1], indices of the DRU6_1 are right-shifted by 4 relative to [DRU1_1], indices of the DRU7_1 are right-shifted by 24 relative to [DRU1_1], indices of the DRU8_1 are right-shifted by 12 relative to [DRU1_1], and indices of the DRU9_1 are right-shifted by 32 relative to [DRU1_1]; and [DRU1_1] is [−479:36:−47, 12:36:444], and 36 is a tone separation.

18. The method of claim 14, wherein the first bandwidth is an available DRU bandwidth.

19. The method of claim 18, wherein in a case where a last 20 MHz bandwidth is unavailable, 242-tone subcarriers of the PPDU with the first bandwidth include DRU1, DRU2, and DRU3; the indices of the DRU1 are [DRU1], the indices of the DRU2 are right-shifted by 1 relative to [DRU1], and the indices of the DRU3 are right-shifted by 2 relative to [DRU1]; and the mapped [DRU1] is [−495:3:−12, 14:3:251].

20. The method of claim 19, wherein in a case where a second last 20 MHz bandwidth is unavailable, 242-tone subcarriers of the PPDU with the first bandwidth include DRU1, DRU2, and DRU3; indices of the DRU1 before mapping are indicated by [DRU1]; the indices of the DRU1 are obtained by right shifting all tones with indices, which are greater than or equal to 12 in the mapped [DRU1], by 242, wherein the mapped [DRU1] is [−495:3:−12, 14:3:251];

the indices of the DRU2 are obtained by right shifting all tones with indices, which are greater than or equal to 12 in the mapped [DRU1] that is right shifted by 1, by 242; and the indices of the DRU3 are obtained by right shifting all tones with indices, which are greater than or equal to 12 in the mapped [DRU1] that is right shifted by 2, by 242.

* * * * *